(12) United States Patent
Sueoka et al.

(10) Patent No.: US 7,596,961 B2
(45) Date of Patent: Oct. 6, 2009

(54) DEHUMIDIFICATION ELEMENT

(75) Inventors: Takahisa Sueoka, Osaka (JP); Guannan Xi, Osaka (JP); Akira Kamino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 580 days.

(21) Appl. No.: 10/521,959

(22) PCT Filed: Jul. 24, 2002

(86) PCT No.: PCT/JP02/07509

§ 371 (c)(1),
(2), (4) Date: Jan. 21, 2005

(87) PCT Pub. No.: WO2004/010056

PCT Pub. Date: Jan. 29, 2004

(65) Prior Publication Data

US 2005/0235673 A1    Oct. 27, 2005

(51) Int. Cl.
 *F25D 23/00* (2006.01)
(52) U.S. Cl. .............................. 62/271; 62/94
(58) Field of Classification Search .............. 62/3.4, 62/284, 309, 325, 93, 94, 95, 271, 314, 121, 62/91, 304; 165/4, 111, 909
See application file for complete search history.

(56) References Cited

U.S. PATENT DOCUMENTS 4,854,129 A * 8/1989 Hickley et al. ............. 62/304
5,226,298 A * 7/1993 Yamamoto et al. ......... 62/3.4
5,547,019 A * 8/1996 Iacullo ...................... 165/51
2003/0145609 A1 * 8/2003 Maisotsenko et al. ...... 62/121

FOREIGN PATENT DOCUMENTS

JP   8-313186 A   11/1996

OTHER PUBLICATIONS

Microfilm of the specification and drawings annexed to the request of Japanese Utility Model Application No. 030488/1980 (Laid-open No. 132471/1981) (Mitsubishi Electric Corp.), Oct. 7, 1981.
Microfilm of the specification and drawings annexed to the request of Japanese Utility Model Application No. 122361/1978 (Laid-open No. 39434/1980) (Mitsubishi Electric Corp.), Mar. 13, 1980.

* cited by examiner

*Primary Examiner*—Melvin Jones
(74) *Attorney, Agent, or Firm*—Birch, Stewart, Kolasch & Birch, LLP

(57) ABSTRACT

Disclosed is a dehumidification unit which comprises alternate laminations of an adsorption element (1) provided with a plurality of first air ventilation passages (3) and a cooling element (2) provided with a plurality of second air ventilation passages (4). In the dehumidification unit, the cooling element (2) is provided, at a planewise inner area thereof, with an opening (24), thereby being shaped like a frame. Cooling air (Ab) is passed through the opening (24). With such configuration, the length of the second air ventilation passages (4) becomes shorter by an amount corresponding to the formation of the opening (24). Consequently, the pressure loss of the cooling air (Ab) is reduced and its flow rate increases accordingly. In addition, at the opening's (24) area, the cooling air (Ab) is brought into direct contact with the adsorption element's (1) side, and the efficiency of heat transfer therebetween is improved. Hereby, as a synergistic effect of the increased flow rate of the cooling air (Ab) and the improved heat transfer efficiency, the heat-liberation action of heat of adsorption is accelerated and the dehumidification capability of the dehumidification unit is maintained at high levels over a long period of time.

18 Claims, 36 Drawing Sheets

DEHUMIDIFICATION ELEMENT

TECHNICAL FIELD

The present invention relates to a dehumidification unit for the dehumidification of humid air by making utilization of the adsorptive action of an adsorbent.

BACKGROUND ART

Dehumidification units employing an adsorbent have been known in the prior art. Referring to FIGS. 35 and 36, there is illustrated, by way of example, a structure of such a conventional dehumidification unit.

The conventional dehumidification unit $Z_0$ is formed by sequentially laminating an adsorption element 31 having a large number of air ventilation passages 35, 35, . . . each supporting on its interior surface an adsorbent, and a cooling element 41 having a large number of air ventilation passages 45, 45, . . . . in a 90-degree plane phase so that the air ventilation passages 35, 35, . . . are approximately orthogonal to the air ventilation passages 45, 45, . . . .

And, in the dehumidification unit $Z_0$, humid air (Aa) which is a stream of air to be processed is passed through the air ventilation passages 35, 35, . . . of each adsorption element 31. On the other hand, cooling air (Ab) is passed through the air ventilation passages 45, 45, . . . of each cooling element 41. On the side of each adsorption element 31, the moisture contained in the humid air is adsorbed by the adsorbent supported on the wall surface of the air ventilation passage 35, and the humid air is changed into a stream of low-humidity air. Meanwhile, heat of adsorption, generated by such moisture adsorption taking place on the side of the adsorption element 31, is liberated by heat-exchange with the cooling air (Ab) flowing through the air ventilation passage 45 of the cooling element 41. Hereby, the adsorption capability of the adsorbent will be maintained at satisfactory levels over a long period of time, and the dehumidification unit $Z_0$ will demonstrate its dehumidification capability at high level.

The conventional dehumidification unit $Z_0$ is made up of the adsorption elements 31 and the cooling elements 41, wherein each adsorption element 31, composed of an air ventilation passage forming member 32 bent in the shape of a corrugated plate and a pair of tabular side-plate members 33, 33 respectively firmly attached to one surface and to the other surface of the air ventilation passage forming member 32, is shaped like a double-sided cardboard. Each of the air ventilation passage forming member 32 and the side-plate members 33, 33 is formed of fiber paper made of ceramic fibers, and supports, on its surface, an adsorbent such as silica gel etcetera.

On the other hand, each cooling element 41, composed of an air ventilation passage forming member 42 bent in the shape of a corrugated plate and a pair of tabular side-plate members 43, 43 respectively firmly attached to one surface and to the other surface of the air ventilation passage forming member 42, is shaped like a double-sided cardboard. Each of the air ventilation passage forming member 42 and the side-plate members 43, 43 is formed from a sheet metal (thin metallic plate) made of aluminum etcetera.

Problems to be Solved

In the conventional dehumidification unit $Z_0$ as described above, each adsorption element 31 is formed from the air ventilation passage forming member 32 in the form of a bending plate member and the first air ventilation passages 35, 35, . . . have a triangular cross-sectional shape. On the other hand, each cooling element 41 is formed from the air ventilation passage forming member 42 in the form of a bending plate member and the second air ventilation passages 45, 45, . . . have a triangular cross-sectional shape.

In the above case, the first air ventilation passage 35 of the adsorption element 31 is designed to have a triangular cross-sectional shape, with a view to increasing the capability of adsorption by enlarging, to the maximum extent possible, the area of contact between the to-be-processed air (Aa) flowing in the inside of the first air ventilation passage 35 and the absorbent supported on the interior surface of the first air ventilation passage 35. There is no problem with such arrangement.

In the cooling element 41, however, there is no need to increase the area of contact between the interior surface of the second air ventilation passage 45 and the cooling air (Ab) flowing through the second air ventilation passage 45, unlike the adsorption element 31, but there is the request for the efficiency of heat liberation, in other words it is required that the resistance against the flow of the cooling air (Ab) be restricted thereby to reduce the loss of pressure, and that the flow rate of the cooling air (Ab) be increased so as to increase the capacity of absorption of heat.

Despite of the above-described requirements, in the cooling element 41 the cross-sectional shape of the second air ventilation passage 45 is in the shape of a triangle, therefore being unfavorable not only in view of accomplishing improvement in the efficiency of heat liberation but also in view of accomplishing improvement in the dehumidification capability of the dehumidification unit $Z_0$.

To sum up, the flow resistance of a flow path is often affected by its cross-sectional shape. The contact resistance of a wall surface against a stream of air is high at a sharp-angled corner, and the area in the vicinity of such a corner is a region where substantially no air flows. Because of this, in the case where the cross-sectional shape of the second air ventilation passage 45 is triangular, the ratio of effective passage area to total passage area is small. For example, when compared with an air ventilation passage which is identical in passage area with the second air ventilation passage 45 but has a rectangular cross-sectional shape, the second air ventilation passage 45 whose cross-sectional shape is triangular becomes greater in flow resistance by an amount corresponding to the difference in effective passage area between the passages. As a result, the pressure loss of the cooling air (Ab) flowing through the second air ventilation passage 45 increases. Accordingly, from the aspect of accomplishing improvement in the efficiency of heat liberation in the cooling element 41, means capable of reduction in pressure loss in the cooling element 41 should be implemented.

Bearing in mind the above, the present invention was made. Accordingly, an object of the present invention is to maintain the dehumidification capability of a dehumidification unit at high levels over a long period of time by pressure-loss reduction.

SUMMARY OF THE INVENTION

The present invention employs the following constructions as specific means for providing solutions to the above-described problems with the prior art techniques.

Firstly, a first invention of the present application discloses a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the first invention is characterized in that: the cooling element 2 is provided, at a planewise inner area thereof, with an opening 24, thereby being shaped like a frame; and each of the second air ventilation passages 4, 4, . . . is divided by the opening 24 into an entry opening 4a and an exit opening 4b situated respectively on one passagewise side and on the other passagewise side thereof.

A second invention of the present application discloses a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the second invention is characterized in that each of the second air ventilation passages 4, 4, . . . of the cooling element 2 has an approximately rectangular cross-sectional shape.

In a third invention of the present application, there is disclosed a dehumidification unit according to the first invention. The dehumidification unit of the third invention is characterized in that each of the second air ventilation passages 4, 4, . . . of the cooling element 2 has an approximately rectangular cross-sectional shape.

In a fourth invention of the present application, there is disclosed a dehumidification unit according to the first invention. The dehumidification unit of the fourth invention is characterized in that each of the second air ventilation passages 4, 4, . . . of the cooling element 2 has an approximately triangular cross-sectional shape.

In a fifth invention of the present application, there is disclosed a dehumidification unit according to any one of the first, third, and fourth inventions. The dehumidification unit of the fifth invention is characterized in that an air stream regulating means X, configured to inhibit the flow of the cooling air (Ab) from deviating in the inside of the opening part 24, is disposed in the opening 24 of the cooling element 2.

In a sixth invention of the present application, there is disclosed a dehumidification unit according to any one of the first, third, and fourth inventions. The dehumidification unit of the sixth invention is characterized in that it further comprises a flow rate regulating means Y disposed on the side of the entry openings 4a, 4a, . . . of the second air ventilation passages 4, 4, . . . , whereby the flow rate of the cooling air (Ab) entering the inside of the opening 24 through each of the entry openings 4a, 4a, . . . is so regulated as to become higher the nearer to the downstream side of the first air ventilation passages 3, 3, . . . of the adsorption element 1.

In a seventh invention of the present application, there is disclosed a dehumidification unit according to the sixth invention. The dehumidification unit of the seventh invention is characterized in that the flow rate regulating means Y is formed by setting the passage length of the entry openings 4a, 4a, . . . of the second air ventilation passages 4, 4, . . . to become shorter the nearer to the downstream end of the first air ventilation passages 3, 3, . . . .

An eighth invention of the present application discloses a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the eighth invention is characterized in that: the cooling element 2 is provided with openings 24A and 24B which overlap with the second air ventilation passages 4, 4, . . . such that the second air ventilation passages 4, 4, . . . are each divided passagewise; and the passage resistance of the second air ventilation passages 4, 4, . . . on the downstream side of the openings 24A and 24B is set such that the passage resistance of second air ventilation passages nearer to an area 2c of the cooling element 2 corresponding to the upstream side of the first air ventilation passages 3, 3, . . . of the adsorption element 1 is greater than the passage resistance of second air ventilation passages nearer to an area 2d of the cooling element 2 corresponding to the downstream side of the first air ventilation passages 3, 3, . . . of the adsorption element 1.

In a ninth invention of the present application, there is disclosed a dehumidification unit according to the eighth invention. The dehumidification unit of the ninth invention is characterized in that the passage length of the second air ventilation passages 4, 4, . . . on the downstream side of the openings 24A and 24B is set such that the passage length of second air ventilation passages nearer to the area 2c corresponding to the upstream side of the first air ventilation passages 3, 3, . . . of the adsorption element 1 is greater than the passage length of second air ventilation passages nearer to the area 2d corresponding to the downstream side of the first air ventilation passages 3, 3, . . . of the adsorption element 1.

In a tenth invention of the present application, there is disclosed a dehumidification unit according to the ninth invention. The dehumidification unit of the tenth invention is characterized in that the passage length of the second air ventilation passages 4, 4, . . . is set so as to become gradually shorter from the side nearer to the area 2c corresponding to the upstream side of the first air ventilation passages 3, 3, . . . of the adsorption element 1 towards the side nearer to the area 2d corresponding to the downstream side of the first air ventilation passages 3, 3, . . . of the adsorption element 1.

In an eleventh invention of the present application, there is disclosed a dehumidification unit according to the ninth invention. The dehumidification unit of the eleventh invention is characterized in that the passage length of the second air ventilation passages 4, 4, . . . is set so as to become linearly shorter from the side nearer to the area 2c corresponding to the upstream side of the first air ventilation passages 3, 3, . . . of the adsorption element 1 towards the side nearer to the area 2d corresponding to the downstream side of the first air ventilation passages 3, 3, . . . of the adsorption element 1.

In a twelfth invention of the present application, there is disclosed a dehumidification unit according to the ninth invention. The dehumidification unit of the twelfth invention is characterized in that the passage length of the second air ventilation passages 4, 4, . . . is set so as to become curvedly shorter from the side nearer to the area 2c corresponding to the upstream side of the first air ventilation passages 3, 3, . . . of the adsorption element 1 towards the side nearer to the area 2d corresponding to the downstream side of the first air ventilation passages (3, 3, . . . ) of the adsorption element 1.

In a thirteenth invention of the present application, there is disclosed a dehumidification unit according to the eighth invention. The dehumidification unit of the thirteenth invention is characterized in that the passage cross-sectional area of the second air ventilation passages 4, 4, . . . on the downstream side of the openings 24A and 24B is set such that the passage cross-sectional area of second air ventilation passages nearer to the area 2c corresponding to the upstream side of the first air ventilation passages 3, 3, . . . of the adsorption element 1 is smaller than the passage cross-sectional area of second air ventilation passages 4 nearer to the area 2d corresponding to the downstream side of the first air ventilation passages 3, 3, . . . of the adsorption element 1.

In a fourteenth invention of the present application, there is disclosed a dehumidification unit according to the ninth invention. The dehumidification unit of the fourteenth invention is characterized in that the passage cross-sectional area of the second air ventilation passages 4, 4, . . . on the downstream side of the openings 24A and 24B is set such that the passage cross-sectional area of second air ventilation passages nearer to the area 2c corresponding to the upstream side of the first air ventilation passages 3, 3, . . . of the adsorption element 1 is smaller than the passage cross-sectional area of second air ventilation passages 4 nearer to the area 2d corresponding to the downstream side of the first air ventilation passages 3, 3, . . . of the adsorption element 1.

A fifteenth invention of the present application discloses a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the fifteenth invention is characterized in that: the cooling element 2 is provided with openings 24A and 24B which overlap with the second air ventilation passages 4, 4, . . . such that the second air ventilation passages 4, 4, . . . are each divided passagewise; and the passage direction of the second air ventilation passages 4, 4, . . . on the downstream side of the openings 24A and 24B as viewed in plane view is inclined so as to get closer to an area 2d of the cooling element 2 corresponding to the downstream side of the first air ventilation passages 3, 3, . . . of the adsorption element 1 with approach towards the downstream side.

In a sixteenth invention of the present application, there is disclosed a dehumidification unit according to any one of the eighth, ninth, thirteenth, and fourteenth inventions. The dehumidification unit of the sixteenth invention is characterized in that the passage direction of the second air ventilation passages 4, 4, . . . on the downstream side of the openings 24A and 24B as viewed in plane view is inclined so as to get closer to the area 2d of the cooling element 2 corresponding to the downstream side of the first air ventilation passages 3, 3, . . . of the adsorption element 1 with approach towards the downstream side.

Finally, in a seventeenth invention of the present application, there is disclosed a dehumidification unit according to any one of the eighth, ninth, thirteenth, fourteenth, and fifteenth inventions. The dehumidification unit of the seventeenth invention is characterized in that a plurality of sets of the openings 24A and 24B and the second air ventilation passages 4, 4, . . . situated downstream of the openings 24A and 24B are provided in a back-and-forth arrangement relative to the flow direction of the cooling air (Ab) in the cooling element 2.

EFFECTS

The following effects are attained by the constructions of the above-described inventions.

(a) Firstly, the first invention of the present application relates to a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the first invention is characterized in that: the cooling element 2 is provided, at a planewise inner area thereof, with an opening 24, thereby being shaped like a frame; and each of the second air ventilation passages 4, 4, . . . is divided by the opening 24 into an entry opening 4a and an exit opening 4b situated respectively on one passagewise side and on the other passagewise side thereof.

Therefore, in accordance with the dehumidification unit of the first invention, when the air (Aa) to be processed is being passed through the first air ventilation passages 3, 3, . . . of the adsorption element 1, the moisture contained in the air (Aa) is sequentially adsorbed by the adsorbent supported on each of the first air ventilation passages 3, 3, . . . , whereby the dehumidification of the air (Aa) is conducted. Meanwhile, heat of adsorption generated by such moisture adsorption is liberated towards the cooling air (Ab) by heat-exchange with the cooling air (Ab) flowing through the second air ventilation passages 4, 4, . . . of the cooling element 2. Hereby, the adsorption capability of the adsorbent will be maintained at satisfactory levels over a long period of time. These produce a synergistic effect that the dehumidification capability of the dehumidification unit of the first invention will be maintained at high levels over long periods.

In addition to these basic effects, the following specific effects are provided.

More specifically, in accordance with the dehumidification unit of the present invention, the cooling element 2 is provided with the opening 24, being in the shape of a frame, and each of the second air ventilation passages 4, 4, . . . is divided by the opening 24 into an entry opening 4a and an exit opening 4b situated respectively on one passagewise side and on the other passagewise side thereof, and the passage length of each of the second air ventilation passages 4, 4, . . . becomes shorter by the length of a portion corresponding to the opening 24. As a result of such arrangement, when compared, for example, with the case where each of the second air ventilation passages 4, 4, . . . is a continuous passage extending the full length of the cooling element 2, the pressure loss of the cooling air (Ab) flowing therethrough is lowered by an amount corresponding to the reduction in passage length. And, the flow rate of the cooling air (Ab) flowing though the cooling element 2 is increased by an amount corresponding to the reduction in pressure loss, and the heat-liberation action of heat of adsorption by the cooling air (Ab) is accelerated.

Because of the formation of the opening 24 in the cooling element 2, the cooling air (Ab) flowing in the opening 24 is brought into direct contact with the adsorption element 1. For example, when compared with the case where the opening 24 is not provided and the cooling air (Ab) flowing through the second air ventilation passages 4, 4, . . . is constantly brought into indirect contact with the adsorption element 1 with a passage wall lying therebetween, the efficiency of heat transfer between the adsorption element 1 and the cooling element 2 is improved, and the heat-liberation action of heat of adsorption by the cooling air (Ab) is accelerated correspondingly.

By a synergistic action of the effect of accelerating the action of heat liberation by increasing the flow rate of the cooling air (Ab) and the effect of accelerating the action of heat liberation by improvement in the heat transfer, further improvement in the dehumidification capability of the dehumidification unit of the present invention is accomplished.

Furthermore, the fact that the liberating of heat of adsorption is promoted by the formation of the opening 24 in the cooling element 2 (as described above) means that, if the amount of heat liberation required on the cooling element's 2 side is the same, it is possible to reduce the flow rate of the cooling air (Ab) flowing through the cooling element 2, in other words it is possible to set the thickness dimension of the cooling element 2 to a smaller value. Accordingly, in the dehumidification unit of the present invention, it is possible to achieve downsizing in the height direction of the dehumidification unit by reduction in the thickness dimension of the cooling element 2. In the case where the height dimension remains unchanged, it becomes possible to increase the capability to remove moisture by increasing the number of laminations of the adsorption element 1 and the cooling element 2.

In addition, in the dehumidification unit of the present invention, the entry and exit portions 4a, 4a, . . . and 4b, 4b, . . . of the second air ventilation passages 4, 4, . . . are arranged respectively on one end side and on the other end side of the opening 24 of the cooling element 2. As a result of such arrangement, on the side of the entry portions 4a, 4a, . . . , the cooling air (Ab) flowing thereinto undergoes flow rectifying actions and flow-deviation inhibiting actions by the entry portions 4a, 4a, . . . . Consequently, the flow of the cooling air (Ab) is stabilized and further reduction in the pressure loss can be expected. Furthermore, on the side of the exit portions 4b, 4b, . . . , the cooling air (Ab) flows outwardly while undergoing flow rectifying actions by the exit portions 4b, 4b, . . . , and the level of noise generated by the outflow of the cooling air (Ab) is held as low as possible, thereby providing effects such as improvement in the quietness of the dehumidification unit.

(b) The second invention of the present application relates to a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the second invention is characterized in that each of the second air ventilation passages 4, 4, . . . of the cooling element 2 has an approximately rectangular cross-sectional shape.

Therefore, in accordance with the dehumidification unit of the second invention, when the air (Aa) to be processed is being passed through the first air ventilation passages 3, 3, . . . of the adsorption element 1, the moisture contained in the air (Aa) is sequentially adsorbed by the adsorbent supported on each of the first air ventilation passages 3, 3, . . . , whereby the dehumidification of the air (Aa) is conducted. Meanwhile, heat of adsorption generated by such moisture adsorption is liberated towards the cooling air (Ab) by heat-exchange with the cooling air (Ab) flowing through the second air ventilation passages 4, 4, . . . of the cooling element 2. Hereby, the adsorption capability of the adsorbent will be maintained at satisfactory levels over a long period of time. These produce a synergistic effect that the dehumidification capability of the dehumidification unit of the second invention will be maintained at high levels over long periods.

In addition to these basic effects, the following specific effects are provided. More specifically, in accordance with the dehumidification unit of the present invention, each of the second air ventilation passages 4, 4, . . . has an approximately rectangular cross-sectional shape. Accordingly, for example when compared with the case where each of the second air ventilation passages 4, 4, . . . has an approximately triangular cross-sectional shape as in the prior art technique, the effective cross-sectional area of the second air ventilation passages 4, 4, . . . increases, thereby correspondingly reducing the pressure loss of the cooling air (Ab) flowing though the second air ventilation passages 4, 4, . . . . As the result of this, the flow rate of the cooling air (Ab) in the cooling element 2 increases, thereby accelerating the heat-liberation action of heat of adsorption by the cooling air (Ab). Correspondingly further improvement in the dehumidification capability of the dehumidification unit is accomplished.

(c) In the dehumidification unit of the third invention of the present application according to the first invention, it is arranged such that each of the second air ventilation passages 4, 4, . . . of the cooling element 2 is formed so as to have an approximately rectangular cross-sectional shape. As a result of such arrangement, for example when compared with the case where each of the second air ventilation passages 4, 4, . . . has an approximately triangular cross-sectional shape as in the prior art technique, the effective cross-sectional area of the second air ventilation passages 4, 4, . . . increases, thereby correspondingly reducing the pressure loss of the cooling air (Ab) flowing though the second air ventilation passages 4, 4, . . . . In addition, the effect of reducing the pressure loss of the cooling air (Ab) based on the cross-sectional shape of the second air ventilation passages 4, 4, . . . is added to the effect of reducing the pressure loss of the cooling air (Ab) by the formation of the opening 24 in the cooling element 2, as a result of which the total pressure loss in the cooling element 2 is reduced to a further extent. Consequently, further improvement in the dehumidification capability of the dehumidification unit will be expected.

(d) In the dehumidification unit of the fourth invention of the present application according to the first invention, it is arranged such that each of the second air ventilation passages 4, 4, . . . of the cooling element 2 is formed so as to have an approximately triangular cross-sectional shape. The second air ventilation passages 4, 4, . . . have a shape disadvantage resulting from their approximately triangular cross-sectional shape, in other words the effective cross-sectional area is small and the pressure loss is great, for their total cross-sectional area. However, such a drawback is compensated for by the effect of pressure-loss reduction accomplished by the formation of the opening 24 in the cooling element 2. Consequently, the total pressure loss of the cooling element 2 is held low and, as a result, the same effects as set forth in the above paragraph (a) are obtained.

(e) In the dehumidification unit of the fifth invention of the present application according to any one of the first, third, and fourth inventions, it is arranged such that the air stream regulating means X, configured to inhibit the flow of the cooling air (Ab) from deviating in the inside of the opening part 24, is disposed in the opening 24 of the cooling element 2. As a result of such arrangement, the flow of the cooling air (Ab) is inhibited from deviating in the opening 24, and the action of heat-exchange taking place between the cooling air (Ab) and the adsorption element 1 is conducted as uniformly as possible throughout the opening 24. The heat-liberation action of heat of adsorption is further accelerated and further improvement in the dehumidification capability of the dehumidification unit will be expected.

(f) In the dehumidification unit of the sixth invention of the present application according to any one of the first, third, and fourth inventions, it is arranged such that the flow rate regulating means Y disposed on the side of the entry openings 4a, 4a, . . . of the second air ventilation passages 4, 4, . . . , whereby the flow rate of the cooling air (Ab) entering the inside of the opening 24 through each of the entry openings 4a, 4a, . . . is so regulated as to become higher the nearer to the downstream side of the first air ventilation passages 3, 3, . . . of the adsorption element 1.

Here, the temperature distribution of heat of adsorption on the side of the adsorption element 1 corresponds to the degree of moisture adsorption action, and is high on the upstream side of the first air ventilation passages 3, 3, . . . which is the inflow side of the to-be-processed air (Aa) to the adsorption element 1 but low on the downstream side of the first air ventilation passages 3, 3, . . . . Accordingly, when the cooling air (Ab) enters the opening 24 through the second air ventilation passages 4, 4, . . . of the cooling element 2 extending in a direction orthogonal to the first air ventilation passages 3, 3, . . . and then flows freely in the opening 24 without undergoing any restriction, inevitably heat-exchange is conducted intensively at an area with a wide range of temperature (i.e., an area corresponding to the upstream side of the first air ventilation passages 3, 3, . . . ). On the other hand, little or no heat-exchange is conducted in a corresponding area to the downstream side of the first air ventilation passages 3, 3, . . . . As the result of this, the ratio of the effective heat-exchange region to the whole region of the opening 24 decreases and there is a fall in the efficiency of heat-exchange. Stated another way, there is a fall in the heat-liberation efficiency of heat of adsorption.

To cope with the above, the flow rate regulating means Y is disposed in the opening 24 in the present invention, and the flow rate of the cooling air (Ab) flowing in the opening 24 is regulated as follows: the nearer an area is to the downstream side of the first air ventilation passages 3, 3, . . . of the adsorption element 1, the greater is its flow rate. The effective heat-exchange area is enlarged extensively in the opening 24, thereby accomplishing improvement in the efficiency of heat transfer. The heat-liberation efficiency of heat of adsorption is improved. Accordingly, further improvement in the dehumidification capability of the dehumidification unit will be expected.

(g) In the dehumidification unit of the seventh invention of the present application according to the sixth invention, it is arranged such that the flow rate regulating means Y is formed by setting the passage length of the entry openings 4a, 4a, . . . of the second air ventilation passages 4, 4, . . . to become shorter the nearer to the downstream end of the first air ventilation passages 3, 3, . . . . As a result of such arrangement, the flow rate regulating means Y is implemented easily by the shape setting of the opening 24. As the result of this, the effects as set forth in the above paragraph (f) are achieved inexpensively.

(h) The eighth invention of the present application relates to a dehumidification unit comprising alternate laminations of an adsorption element 1 which supports an adsorbent and in which a plurality of first air ventilation passages 3, 3, . . . through which air (Aa) to be processed flows are formed planewise in rows, and a cooling element 2 in which a plurality of second air ventilation passages 4, 4, . . . through which cooling air (Ab) flows are formed planewise in rows. The dehumidification unit of the eighth invention is characterized in that: the cooling element 2 is provided with openings 24A and 24B which overlap with the second air ventilation passages 4, 4, . . . such that the second air ventilation passages 4, 4, . . . are each divided passagewise; and the passage resistance of the second air ventilation passages 4, 4, . . . on the downstream side of the openings 24A and 24B is set such that the passage resistance of second air ventilation passages nearer to an area 2c of the cooling element 2 corresponding to the upstream side of the first air ventilation passages 3, 3, . . . of the adsorption element 1 is greater than the passage resistance of second air ventilation passages nearer to an area 2d of the cooling element 2 corresponding to the downstream side of the first air ventilation passages 3, 3, . . . of the adsorption element 1.

In the dehumidification unit of the present invention, the cooling element 2 is provided with the openings 24A and 24B. When compared with the case where the openings 24A and 24B are not provided and the second air ventilation passages 4, 4, . . . are continuous passages extending the full length of the cooling element 2, the passage length of the second air ventilation passages 4, 4, . . . is made shorter by an amount corresponding to the area occupied by the openings 24A and 24B, and the pressure loss of the cooling air (Ab) flowing through the second air ventilation passages 4, 4, . . . is reduced correspondingly. Consequently, the flow rate of the cooling air (Ab) flowing on the side of the cooling element 2 becomes greater by an amount corresponding to such a fall in pressure loss. The heat-liberation action of heat of adsorption by the cooling air (Ab) is accelerated.

Furthermore, because of the formation of the openings 24A and 24B in the cooling element 2, the cooling air (Ab) flowing in the openings 24A and 24B is brought into direct contact with the adsorption element 1. For example, when compared with the case where the openings 24A and 24B are not provided and the cooling air (Ab) flowing through the second air ventilation passages 4, 4, . . . is constantly brought into indirect contact with the adsorption element 1 with a passage wall lying therebetween, the efficiency of heat transfer between the adsorption element 1 and the cooling element 2 is improved, and the heat-liberation action of heat of adsorption by the cooling air (Ab) is accelerated correspondingly.

By a synergistic action of the effect of accelerating the action of heat liberation by increasing the flow rate of the cooling air (Ab) and the effect of accelerating the action of heat liberation by improvement in the heat transfer in the cooling element 2, further improvement in the dehumidification capability of the dehumidification unit of the present invention is accomplished.

On the other hand, at the time when the cooling air (Ab) flows into the openings 24A and 24B from upstream of the openings 24A and 24B, there is created a temperature gradient between a first portion of the cooling air (Ab) flowing through a first area corresponding to the upstream side of the first air ventilation passages 3, 3, . . . of the adsorption element 1 and a second portion of the cooling air (Ab) flowing through a second area corresponding to the downstream side of the first air ventilation passages 3, 3, . . . of the adsorption element 1, corresponding to the degree of deviation in the temperature distribution of heat of adsorption on the side of the adsorption element 1; however, the cooling air (Ab) with such a temperature gradient enters the inside of the opening 24A and 24B and the first and second portions are mixed together there. As a result, the temperature gradient is eliminated possibly and the cooling power of the cooling air (Ab) is equalized.

Furthermore, in accordance with the present invention, it is arranged such that the passage resistance of the second air ventilation passages 4, 4, . . . continuously extending on the downstream side of the openings 24A and 24B is set such that the passage resistance of second air ventilation passages nearer to an area 2c of the cooling element 2 corresponding to the upstream side of the first air ventilation passages 3, 3, . . . of the adsorption element 1 is greater than the passage resistance of second air ventilation passages nearer to an area 2d of the cooling element 2 corresponding to the downstream side of the first air ventilation passages 3, 3, . . . of the adsorption element 1. As a result of such arrangement, when the cooling air (Ab) flows towards the second air ventilation passages 4, 4, ... from the openings 24A and 24B, the cooling air (Ab) is forced to flow through second air ventilation passages of the second air ventilation passages 4, 4, ... that are situated nearer to the area 2d corresponding to the downstream side of the first air ventilation passages 3, 3, ... of the adsorption element 1 (i.e., those situated nearer to an area with a correspondingly small temperature difference from the to-be-processed air (Aa) with respect to the temperature gradient of the air (Aa) on the adsorption element's 1 side and with a less degree of contribution to the exchange of heat). The action of heat-exchange in the area is accelerated and the effective heat-exchange region in the cooling element 2 is extended.

As a synergistic effect resulting from the above, the dehumidification capability of the dehumidification unit is improved to a further extent.

(i) In the dehumidification unit of the ninth invention of the present application according to the eighth invention, it is arranged such that the passage length of the second air ventilation passages 4, 4, ... on the downstream side of the openings 24A and 24B is set such that the passage length of second air ventilation passages nearer to the area 2c corresponding to the upstream side of the first air ventilation passages 3, 3, ... of the adsorption element 1 is greater than the passage length of second air ventilation passages nearer to the area 2d corresponding to the downstream side of the first air ventilation passages 3, 3, ... of the adsorption element 1, thereby to regulate the passage resistance of the second air ventilation passages 4, 4, .... As a result of such arrangement, the effects as set forth in the above paragraph (h) are obtained by a simple means, i.e., by regulating the passage length of the second air ventilation passages 4, 4, ....

(j) In accordance with the dehumidification unit configured according to the tenth invention of the present application, the following specific effects are obtained in addition to the effects as set forth in the above paragraph (i). More specifically, in the present invention it is arranged such that the passage length of the second air ventilation passages 4, 4, ... is set so as to become gradually shorter from the side nearer to the area 2c corresponding to the upstream side of the first air ventilation passages 3, 3, ... of the adsorption element 1 towards the side nearer to the area 2d corresponding to the downstream side of the first air ventilation passages 3, 3, ... of the adsorption element 1. Such arrangement facilitates setting the length of the second air ventilation passages 4, 4, ... during the manufacture thereof. Cost savings are provided accordingly.

(k) In accordance with the dehumidification unit configured according to the eleventh invention of the present application, the following specific effects are obtained in addition to the effects as set forth in the above paragraph (i). More specifically, it is arranged such that the passage length of the second air ventilation passages 4, 4, ... is set so as to become linearly shorter from the side nearer to the area 2c corresponding to the upstream side of the first air ventilation passages 3, 3, ... of the adsorption element 1 towards the side nearer to the area 2d corresponding to the downstream side of the first air ventilation passages 3, 3, ... of the adsorption element 1. With this, the flow rate of the cooling air (Ab) among the second air ventilation passages 4, 4, ..., i.e., the cooling capability of the cooling air (Ab) with respect to the adsorption heat on the adsorption element's 1 side, varies continuously, and the total cooling performance of the cooling element 2 is stabilized.

(l) In accordance with the dehumidification unit configured according to the twelfth invention of the present application, the following specific effects are obtained in addition to the effects as set forth in the above paragraph (i). More specifically, it is arranged such that the passage length of the second air ventilation passages 4, 4, ... is set so as to become curvedly shorter from the side nearer to the area 2c corresponding to the upstream side of the first air ventilation passages 3, 3, ... of the adsorption element 1 towards the side nearer to the area 2d corresponding to the downstream side of the first air ventilation passages 3, 3, ... of the adsorption element 1. With this, the flow rate of the cooling air (Ab) among the second air ventilation passages 4, 4, ..., i.e., the cooling capability of the cooling air (Ab) with respect to the adsorption heat on the adsorption element's 1 side, varies smoothly continuously, and the total cooling performance of the cooling element 2 is stabilized.

(m) In the dehumidification unit of the thirteenth invention of the present application according to the eighth invention, it is arranged such that the passage cross-sectional area of the second air ventilation passages 4, 4, ... on the downstream side of the openings 24A and 24B is set such that the passage cross-sectional area of second air ventilation passages nearer to the area 2c corresponding to the upstream side of the first air ventilation passages 3, 3, ... of the adsorption element 1 is smaller than the passage cross-sectional area of second air ventilation passages 4 nearer to the area 2d corresponding to the downstream side of the first air ventilation passages 3, 3, ... of the adsorption element 1. By such a simple configuration, the passage resistance of the second air ventilation passages 4, 4, ... is changed. The effects as set forth in the above paragraph (h) are obtained more inexpensively.

(n) In the dehumidification unit of the fourteenth invention of the present application according to the ninth invention, it is arranged such that the passage cross-sectional area of the second air ventilation passages 4, 4, ... on the downstream side of the openings 24A and 24B is set such that the passage cross-sectional area of second air ventilation passages nearer to the area 2c corresponding to the upstream side of the first air ventilation passages 3, 3, ... of the adsorption element 1 is smaller than the passage cross-sectional area of second air ventilation passages 4 nearer to the area 2d corresponding to the downstream side of the first air ventilation passages 3, 3, ... of the adsorption element 1. By such a simple configuration, the passage resistance of the second air ventilation passages 4, 4, ... is changed. The effects as set forth in the above paragraph (i) are obtained more inexpensively.

(o) The fifteenth invention of the present application relates to a dehumidification unit comprising alternate laminations of an adsorption element 1 which supports an adsorbent and in which a plurality of first air ventilation passages 3, 3, ... through which air (Aa) to be processed flows are formed planewise in rows, and a cooling element 2 in which a plurality of second air ventilation passages 4, 4, ... through which cooling air (Ab) flows are formed planewise in rows. The dehumidification unit of the fifteenth invention is characterized in that: the cooling element 2 is provided with openings 24A and 24B which overlap with the second air ventilation passages 4, 4, ... such that the second air ventilation passages 4, 4, ... are each divided passagewise; and the passage direction of the second air ventilation passages 4, 4, ... on the downstream side of the openings 24A and 24B as viewed in plane view is inclined so as to get closer to an area 2d of the cooling element 2 corresponding to the downstream side of the first air ventilation passages 3, 3, ... of the adsorption element 1 with approach towards the downstream side.

In the dehumidification unit of the present invention, the cooling element 2 is provided with the openings 24A and 24B. When compared with the case where the openings 24A and 24B are not provided and the second air ventilation passages 4, 4, ... are continuous passages extending the full length of the cooling element 2, the passage length of the second air ventilation passages 4, 4, ... is made shorter by an amount corresponding to the area occupied by the openings 24A and 24B, and the pressure loss of the cooling air (Ab) flowing through the second air ventilation passages 4, 4, ... is reduced correspondingly. Consequently, the flow rate of the cooling air (Ab) flowing on the side of the cooling element 2 becomes greater by an amount corresponding to such a fall in pressure loss. The heat-liberation action of heat of adsorption by the cooling air (Ab) is accelerated.

Furthermore, because of the formation of the openings 24A and 24B in the cooling element 2, the cooling air (Ab) flowing in the openings 24A and 24B is brought into direct contact with the adsorption element 1. For example, when compared with the case where the openings 24A and 24B are not provided and the cooling air (Ab) flowing through the second air ventilation passages 4, 4, ... is constantly brought into indirect contact with the adsorption element 1 with a passage wall lying therebetween, the efficiency of heat transfer between the adsorption element 1 and the cooling element 2 is improved, and the heat-liberation action of heat of adsorption by the cooling air (Ab) is accelerated correspondingly.

By a synergistic action of the effect of accelerating the action of heat liberation by increasing the flow rate of the cooling air (Ab) and the effect of accelerating the action of heat liberation by improvement in the heat transfer in the cooling element 2, further improvement in the dehumidification capability of the dehumidification unit of the present invention is accomplished.

On the other hand, at the time when the cooling air (Ab) flows into the openings 24A and 24B from upstream of the openings 24A and 24B, there is created a temperature gradient between a first portion of the cooling air (Ab) flowing through a first area corresponding to the upstream side of the first air ventilation passages 3, 3, ... of the adsorption element 1 and a second portion of the cooling air (Ab) flowing through a second area corresponding to the downstream side of the first air ventilation passages 3, 3, ... of the adsorption element 1, corresponding to the degree of deviation in the temperature distribution on the side of the adsorption element 1; however, the cooling air (Ab) with such a temperature gradient enters the inside of the opening 24A and 24B and the first and second portions are mixed together there. As a result, the temperature gradient is eliminated possibly, and the cooling air (Ab) flowing towards the second air ventilation passages 4, 4, ... continuously extending on the downstream side of the openings 24A and 24B is equalized in temperature. Furthermore, in the present invention, the passage direction of the second air ventilation passages 4, 4, ... on the downstream side of the openings 24A and 24B as viewed in plane view is inclined so as to get closer to the area 2d corresponding to the downstream side of the first air ventilation passages 3, 3, ... of the adsorption element 1 with approach towards the downstream side. As a result of such arrangement, when the cooling air (Ab) flows towards the second air ventilation passages 4, 4, ... from the openings 24A and 24B, the cooling air (Ab) is forcibly deviated to flow through second air ventilation passages of the second air ventilation passages 4, 4, ... that are situated nearer to the area 2d corresponding to the downstream side of the first air ventilation passages 3, 3, ... of the adsorption element 1 (i.e., those situated nearer to an area with a correspondingly small temperature difference from the to-be-processed air (Aa) with respect to the temperature gradient of the air (Aa) on the adsorption element's 1 side and with a less degree of contribution to the exchange of heat). The action of heat-exchange in the area is accelerated and the effective heat-exchange region in the cooling element 2 is extended.

As a synergistic effect resulting from the above, the dehumidification capability of the dehumidification unit is improved to a further extent.

(p) In the dehumidification unit of the sixteenth invention of the present application according to any one of the eighth, ninth, thirteenth, and fourteenth inventions, it is arranged such that the passage direction of the second air ventilation passages 4, 4, ... on the downstream side of the openings 24A and 24B as viewed in plane view is inclined so as to get closer to the area 2d of the cooling element 2 corresponding to the downstream side of the first air ventilation passages 3, 3, ... of the adsorption element 1 with approach towards the downstream side. As a result of such arrangement, when the cooling air (Ab) flows towards the second air ventilation passages 4, 4, ... from the openings 24A and 24B, the cooling air (Ab) is forcibly deviated to flow through second air ventilation passages of the second air ventilation passages 4, 4, ... that are situated nearer to the area 2d corresponding to the downstream side of the first air ventilation passages 3, 3, ... of the adsorption element 1 (i.e., those situated nearer to an area with a correspondingly small temperature difference from the to-be-processed air (Aa) with respect to the temperature gradient of the air (Aa) on the adsorption element's 1 side and with a less degree of contribution to the exchange of heat). The action of heat-exchange in the area is accelerated and the effective heat-exchange region in the cooling element 2 is expanded, and the effects as set forth in any one of the above paragraphs (h), (i), (m), and (n) are promoted by an amount corresponding to the expansion in effective heat-exchange region.

(q) Finally, in the dehumidification unit of the seventeenth invention of the present application according to any one of the eighth, ninth, thirteenth, fourteenth, and fifteenth inventions, it is arranged such that a plurality of sets of the openings 24A and 24B and the second air ventilation passages 4, 4, ... situated downstream of the openings 24A and 24B are provided in a back-and-forth arrangement relative to the flow direction of the cooling air (Ab) in the cooling element 2. As a result of such arrangement, the action of reducing the pressure loss of the cooling air (Ab), the action of equalizing the temperature of the cooling air (Ab), and the action of accelerating the transfer of heat of the cooling air (Ab) which are caused by the openings 24A and 24B, and the action of expanding the effective heat-exchange region of the cooling element 2 by changing the passage resistance of the second air ventilation passages 4, 4, ... by regulating the passage length of the second air ventilation passages 4, 4, ... or by regulating the passage cross-sectional area of the second air ventilation passages 4, 4, ... so as to force the flow of the cooling air (Ab) to deviate, are carried out a plurality of times in the flow direction of the cooling air (Ab). This further ensures that the effects as set forth in any one of the above paragraphs (h), (i), (m), (n), and (o) are obtained.

DETAILED DESCRIPTION OF THE INVENTION

Hereinbelow, the present invention will be described more specifically based on the following preferred embodiments.

I. Embodiment 1

Figure 1:
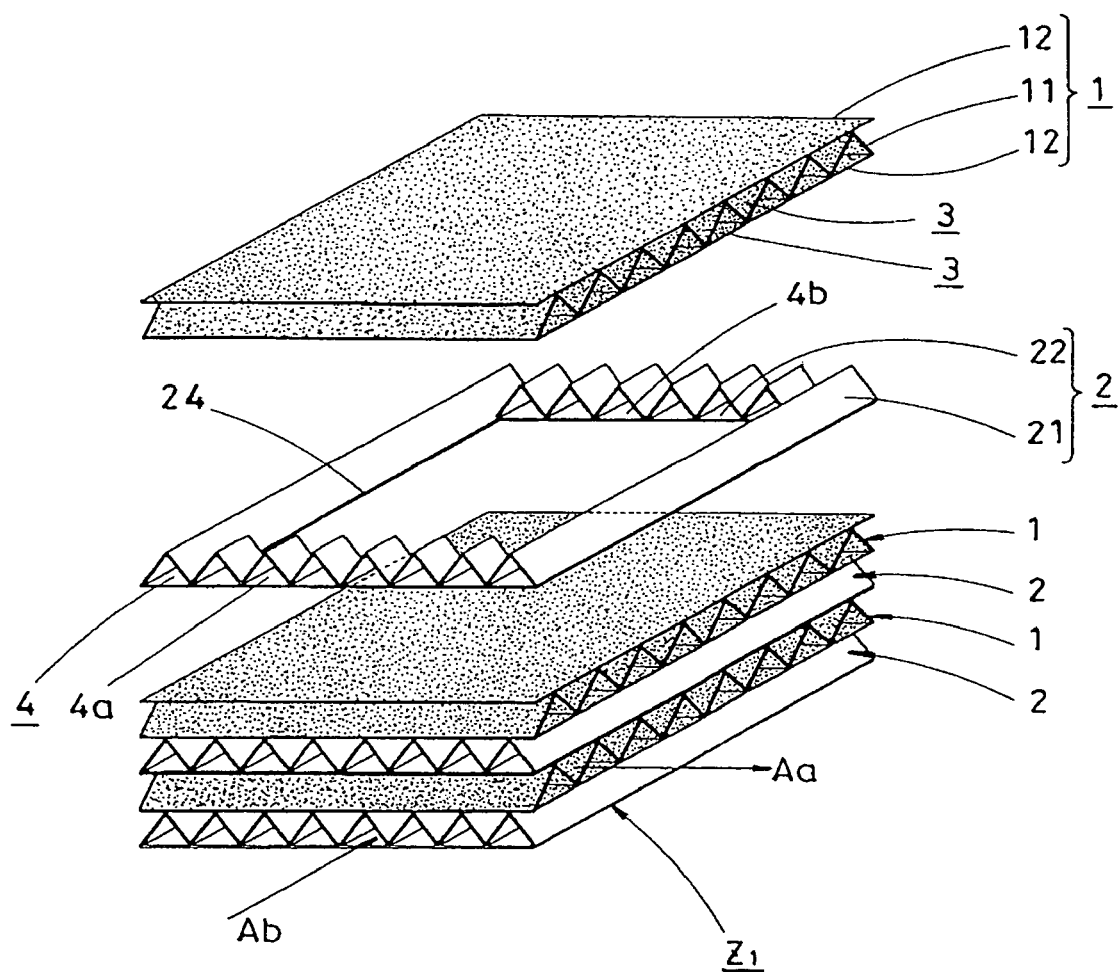
FIG. 1 is a perspective view showing in an exploded manner a dehumidification unit according to a first embodiment of the present invention.
Figure 2:
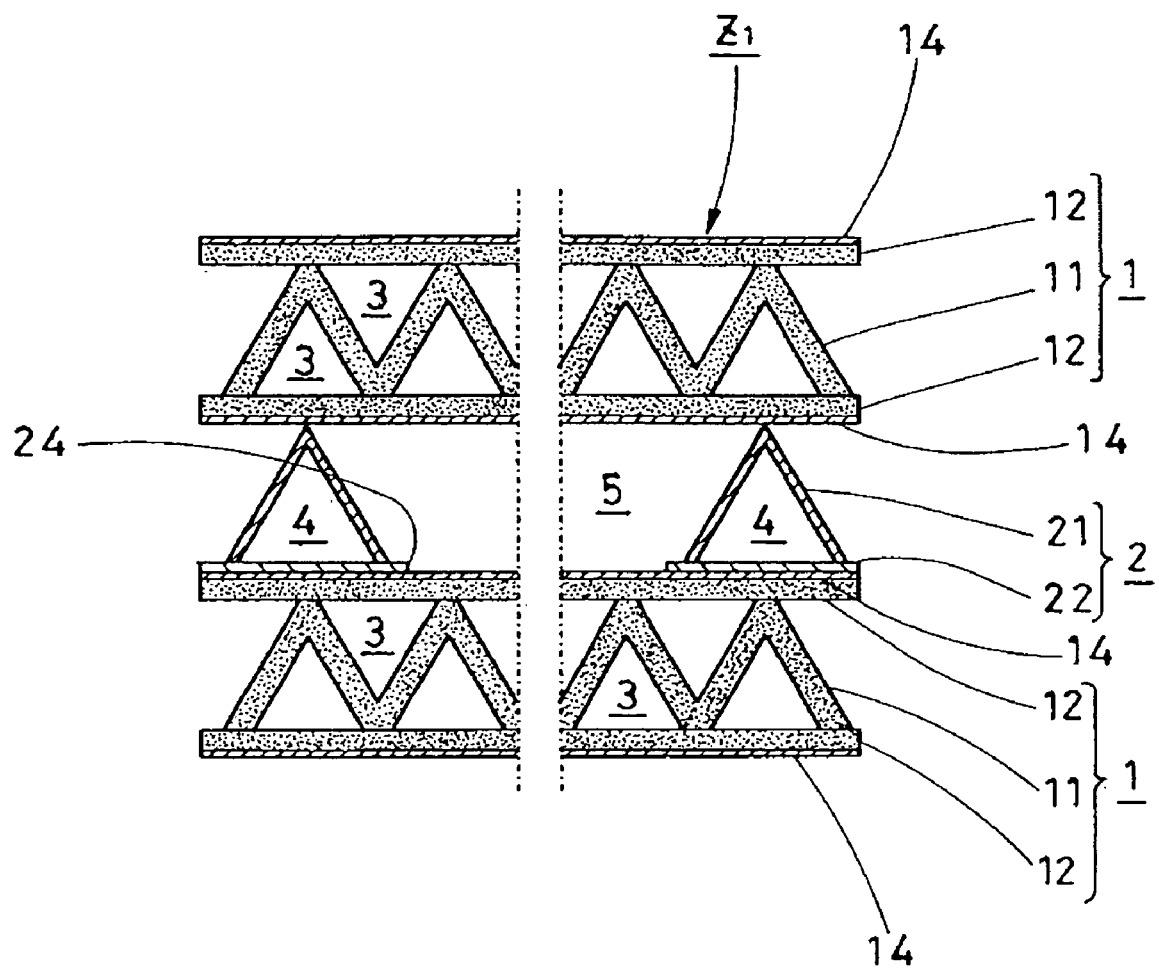
FIG. 2 is a longitudinal sectional view showing in an enlarged manner principal parts of the dehumidification unit shown in FIG. 1.
Figure 3:
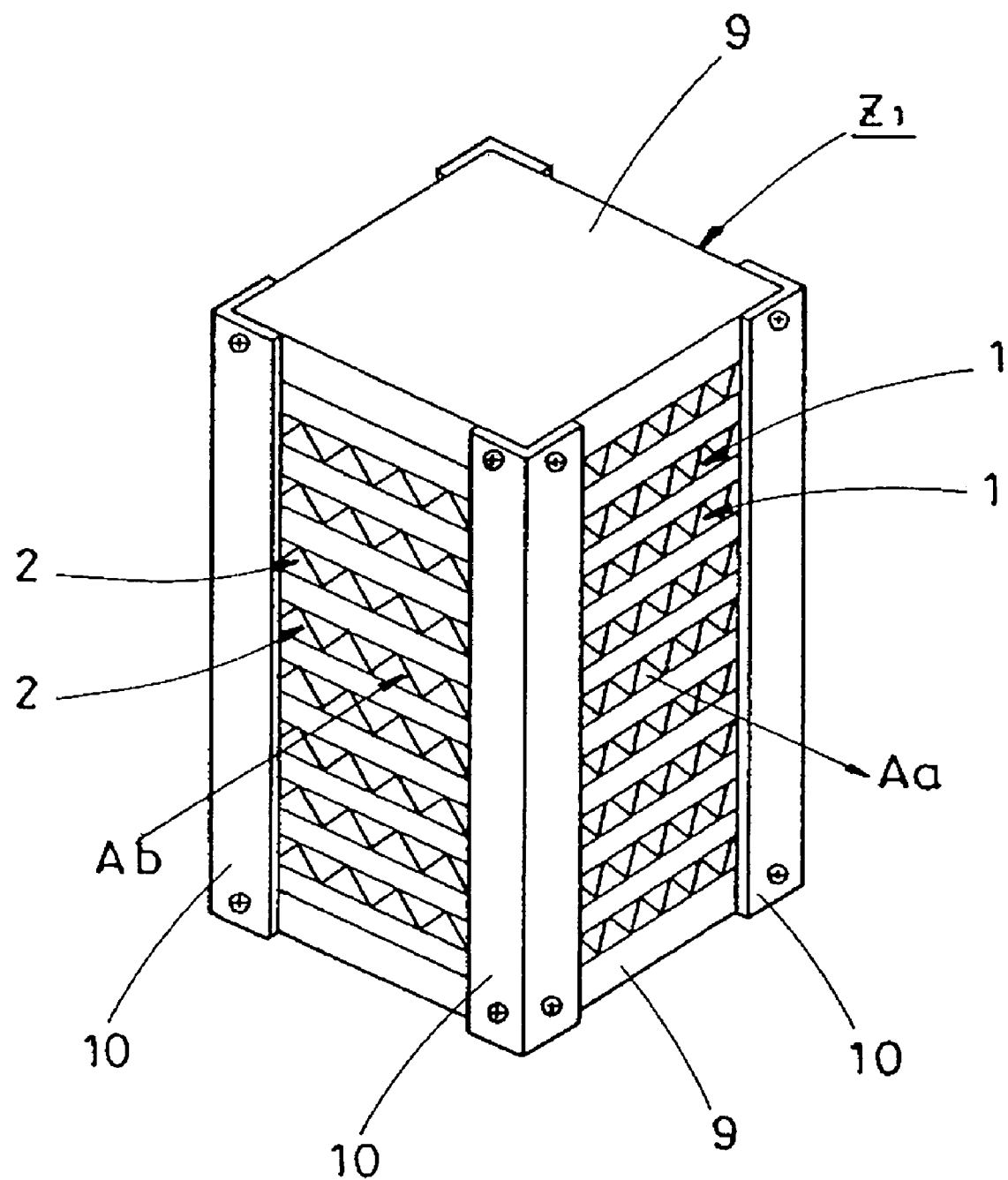
FIG. 3 is an outline perspective view of the dehumidification unit shown in FIG. 1.

Referring first to FIGS. 1-3, there is illustrated a dehumidification unit $Z_1$ formed in accordance with a first embodiment of the present invention. As shown in FIG. 1, the dehumidification unit $Z_1$ is formed as follows: a plurality of adsorption elements 1, 1, . . . and a plurality of cooling elements 2, 2, . . . are laminated sequentially alternately in a 90-degree plane phase, thereby to form a laminated body. Then, two end plates 9, 9 are mounted on one lamination-wise end and on the other lamination-wise end of the laminated body, respectively. The end plates 9, 9 are connected together by four frame members 10, 10, . . . which are arranged along the four corners of the laminated body, in other words all the components are combined into a single body, as shown in FIG. 3. Hereinafter, specific constructions for each of the adsorption element 1 and the cooling element 2 which together constitute the dehumidification unit $Z_1$ will be described.

Construction of Adsorption Element 1

As shown in FIGS. 1 and 2, the adsorption element 1 is shaped like a double-sided cardboard made up of a below-mentioned air ventilation passage forming member 11 and a pair of side-plate members 12, 12. Note that, for convenience of explanation, the cooling element 2 is deviated an angle of 90 degrees in plane phase as if the cooling element 2 and the adsorption element 1 are in the same plane phase, as shown in FIG. 2 (the same is applied to FIGS. 5, 8, 11, 13, 15, 17, 20, and 22).

The air ventilation passage forming member 11 is formed of fiber paper made of ceramic fibers. More specifically, the air ventilation passage forming member 11 is a bending plate member formed by alternate bending of a sheet of fiber paper in the thickness direction thereof, in other words the air ventilation passage forming member 11 is shaped, as a whole, like a corrugated plate. An adequate adsorbent, such as silica gel etcetera, is supported on a surface of the air ventilation passage forming member 11. On the other hand, each of the side plate members 12, 12 is formed of fiber paper of ceramic fibers and is in the form of a flat plate. An adequate adsorbent, such as silica gel etcetera, is supported on one surface of each side plate member 12 and a separation sheet layer 14 is formed on the other surface.

And, with the separation sheet layers 14 oriented outwardly, the side plate members 12, 12 are firmly united to the surfaces of the air ventilation passage forming member 11 so that they are combined into a single body, whereby the adsorption element 1 provided with the first air ventilation passages 3, 3, . . . extending in parallel with areas corresponding to "valley" portions of the air ventilation passage forming member 11 is prepared. Accordingly, in the adsorption element 1, the first air ventilation passages 3, 3, . . . formed in rows in a plane direction of the adsorption element 1 are placed in such a state that they are completely separated from the outside by the separation sheet layers 14, 14 of the side plate members 12, 12.

The adsorbent is supported on the air ventilation passage forming member 11 and on the side plate members 12 as follows. For example, at the time of making fiber paper of which the air ventilation passage forming member 11 and the side plate members 12 are formed, an adsorbent is mixed thereinto. Alternatively, fiber paper is dipped into an adsorbent-mixed dipping liquid.

The separation sheet layer 14 is disposed to prevent the passage of gas and liquid through the side-plate member 12, and to completely separate the first air ventilation passages 3 from second air ventilation passages 4 (described later) on the side of the cooling element 2. For example, the separation sheet layer 14 is formed by attaching a plastic film to the surface of the side-plate member 12, by vapor-depositing a metallic material (for example, aluminum) on the surface of the side-plate member 12, or by applying an organic binder, such as aqueous urethane resin etcetera, onto the surface of the side-plate member 12.

Construction of Cooling Element 2

Referring to FIGS. 1 and 2, the cooling element 2 is shaped like a single-sided cardboard made up of an air ventilation passage forming member 21 (described later) and a side-plate member 22.

Stated another way, the air ventilation passage forming member 21 is made up of a bending plate member formed by alternate bending of a sheet metal of aluminum etcetera or a sheet resin in the thickness direction thereof, and is shaped like, as a whole, a corrugated plate. Additionally, the side-plate member 22 is formed from a sheet metal of aluminum etcetera or a sheet resin, and is shaped like a flat plate.

And, the side-plate member 22 is firmly united to one surface of the air ventilation passage forming member 21, whereby the side-plate member 22 and the air ventilation passage forming member 21 are combined into a single piece. Thereafter, a portion of the combined body positioned centrally relative to the plane direction is subjected to punching, thereby to form a rectangular opening 24. In this way, the cooling element 2 is obtained. Accordingly, the cooling element 2 is shaped, as a whole, like a rectangular frame.

In the cooling element 2, as a result of such an integral combination of the air ventilation passage forming member 21 and the side-plate member 22, a large number of second air ventilation passages 4, 4, . . . extending in parallel with each other are formed by respective valley portions of the side-plate member 22. Although the second air ventilation passages 4, 4, . . . are to be continuous passages extending from one end to the other end of the cooling element 2, they are divided midway relative to the passage direction (exclusive of second air ventilation passages that are situated respectively at one end and the other end of the cooling element 2 and constitute frame portions), in other words each of the second air ventilation passages thus divided is made up of an entry portion 4a on one side and an exit portion 4b on the other side. The entry portion 4a and the exit portion 4b face each other across the opening 24 in plane direction. Stated another way, the second air ventilation passages 4, 4, . . . are each divided into an entry side portion and an exit side portion, but their intermediate portions communicate with each other in the opening 24.

Incorporation of Adsorption Element 1 and Cooling Element 2

The adsorption element 1 and the cooling element 2, as constructed above, are sequentially alternately laminated one upon the other in a plane phase of 90 degrees. These adsorption and cooling elements 1 and 2 are brought together into a laminated body by the end plates 9, 9 and the frame members 10, 10, . . . , thereby to prepare the dehumidification unit $Z_1$ having a rectangular block-like outer appearance (see FIG. 3). In the dehumidification unit $Z_1$ comprising laminations of the adsorption elements 1 and the cooling elements 2, a cooling element 2 is sandwiched between two adsorption elements 1, 1 situated on both sides of the cooling element 2, and both opening surfaces of the opening 24 of the cooling element 2 are closed by the adsorption elements 1, 1, thereby defining an empty space 5 having a required volume (see FIG. 2). And, the empty space 5 communicates, through the entry portions 4a, 4a, . . . and through the exit portions 4b, 4b, . . . , with the outside.

Therefore, in the dehumidification unit $Z_1$ with a rectangular block-like outer appearance comprising four side surfaces (a first pair of opposing side surfaces and a second pair of opposing side surfaces). The first air ventilation passages 3, 3, . . . of each of the adsorption elements 1, 1, . . . have opening ends at the first pair of opposing side surfaces. The entry portions 4a, 4a, . . . of the second air ventilation passages 4, 4, . . . of the cooling element 2 open at one of the second pair of opposing side surfaces. On the other hand, the exit portions 4b, 4b, . . . of the second air ventilation passages 4, 4, . . . of the cooling element 2 open at the other of the second pair of opposing side surfaces.

Here, the operation of the dehumidification unit $Z_1$ is described together with other relevant matters. In the dehumidification unit $Z_1$, humid air as air (Aa) to be processed is passed through each of the first air ventilation passages 3, 3, . . . and cooling air (Ab) is passed through each of the second air ventilation passages 4, 4, . . . , whereby the to-be-processed air (Aa) is dehumidified. More specifically, on the side of the adsorption element 1, when the to-be-processed air (Aa) flows in the inside of each of the first air ventilation passages 3, 3, . . . , the moisture contained in the air (Aa) is sequentially adsorption-removed by the adsorbent supported on each of the first air ventilation passages 3, 3, . . . and is dehumidified. Finally, the air (Aa) is discharged as a stream of low-humidity air.

On the other hand, on the side of the cooling element 2, the action of heat liberation by an absorption of heat of adsorption generated on the side of adsorption element 1 is carried out by the cooling air (Ab) flowing through each of the second air ventilation passages 4, 4, . . . . . By the liberating of heat of adsorption, the temperature of the adsorbent on the side of the adsorption element 1 is constantly maintained at adequate level. Therefore, the adsorbent will maintain its adsorption capability at high level over a long period of time. As a result, the dehumidification unit $Z_1$ will maintain its dehumidification capability at high levels over long periods.

Especially, the dehumidification unit $Z_1$ of the present embodiment demonstrates high-level dehumidification capabilities because of the following structural characteristics of the cooling element 2.

Firstly, it is the effect of improvement in the dehumidification capability of the dehumidification unit $Z_1$ by reduction in the pressure loss of the cooling air (Ab). That is, in the dehumidification unit $Z_1$ of the present embodiment, the cooling element 2 is provided with the opening 24. Each of the second air ventilation passages 4, 4, . . . is divided relative to the passage direction into the entry portion 4a and the exit portion 4b by the opening 24 and its intermediate portion is the empty space 5 common to the second air ventilation passages 4, 4, . . . . As a result of such arrangement, the cooling air (Ab) flows into the second air ventilation passages 4, 4, . . . by way of the entry portions 4a, 4a, . . . and then enters the inside of the empty space 5 directly from the entry portions 4a, 4a, . . . . Thereafter, in the inside of the empty space 5 the cooling air (Ab) flows in a free manner toward the exit portions 4b, 4b, . . . from the side of the entry portions 4a, 4a, . . . , and is discharged through the exit portions 4b, 4b, . . . to the outside.

In this case, there exists no member which prevents the passage of the cooling air (Ab) in the inside of the empty space 5, and the resistance against the flow of the cooling air (Ab) is held as low as possible. As the result of this, the total pressure loss of the cooling element 2 of the present embodiment is made smaller by an amount corresponding to the reduction in passage length of the second air ventilation passage 4 by the formation of the opening 24, when compared, for example, with the case where the second air ventilation passages 4, 4, . . . are each configured so as to continuously extend from one end side to the other end side of the cooling element 2 (in other words the construction without the provision of the opening 24). The effect of pressure loss reduction by the formation of the opening 24 effectively works also in the structure of the present embodiment in which each second air ventilation passage 4 of the cooling element 2 has a triangular cross-sectional shape (that is to say, such a structure that the ratio of effective cross-sectional area to total cross-sectional area is small and the resistance against the flow of the cooling air (Ab) is liable to increase).

Accordingly, in the dehumidification unit $Z_1$ of the present embodiment, in spite of the arrangement that the cross-sectional shape of the second air ventilation passage 4 is triangular, its pressure loss is held low. As a result, the flow rate of the cooling air (Ab) which flows through the second air ventilation passage 4 is increased, and correspondingly the heat-liberation efficiency of heat of adsorption on the side of the adsorption element 1 by the cooling air (Ab) is improved. Therefore, improvement in the dehumidification capability of the dehumidification unit $Z_1$ is expected.

Additionally, in this case, the entry portions 4a, 4a, . . . of the second air ventilation passages 4, 4, . . . are arranged on one end side of the opening 24. On the other hand, the exit portions 4b, 4b, . . . of the second air ventilation passages 4, 4, . . . are arranged on the other end side of the opening 24. Therefore, on the side of the entry portions 4a, 4a, . . . , the cooling air (Ab) flowing towards the opening 24 is flow-rectified by the entry portions 4a, 4a, . . . and is prevented from deviating in the direction in which the second air ventilation passages 4, 4, . . . are formed in rows. As the result of this, the flow of the cooling air (Ab) in the inside of the empty space 5 is stabilized and it becomes possible to reduce the pressure loss to a further extent.

Figure 35:
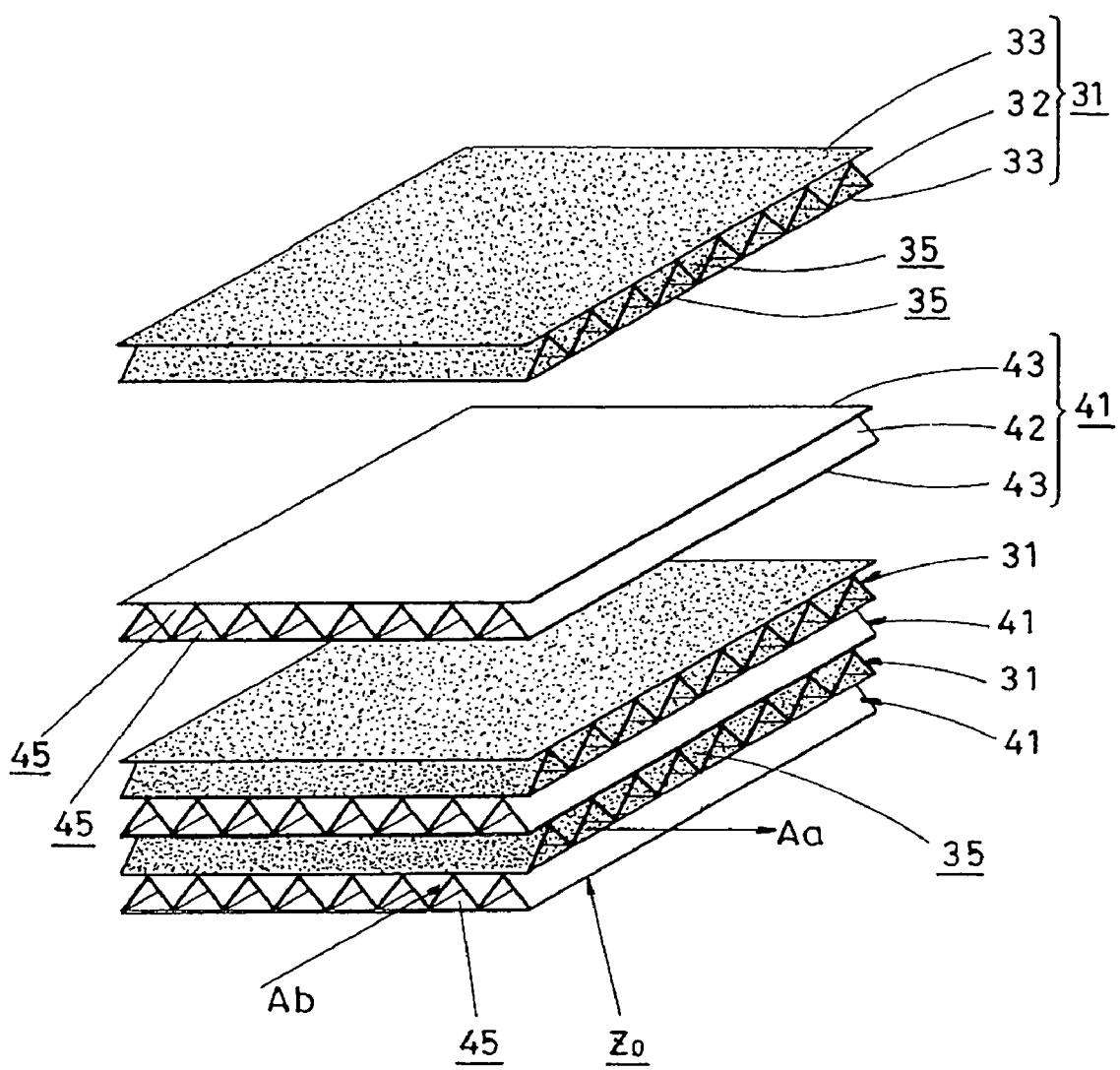
FIG. 35 is a perspective view showing in an exploded manner principal parts of a conventional dehumidification unit.
Figure 36:
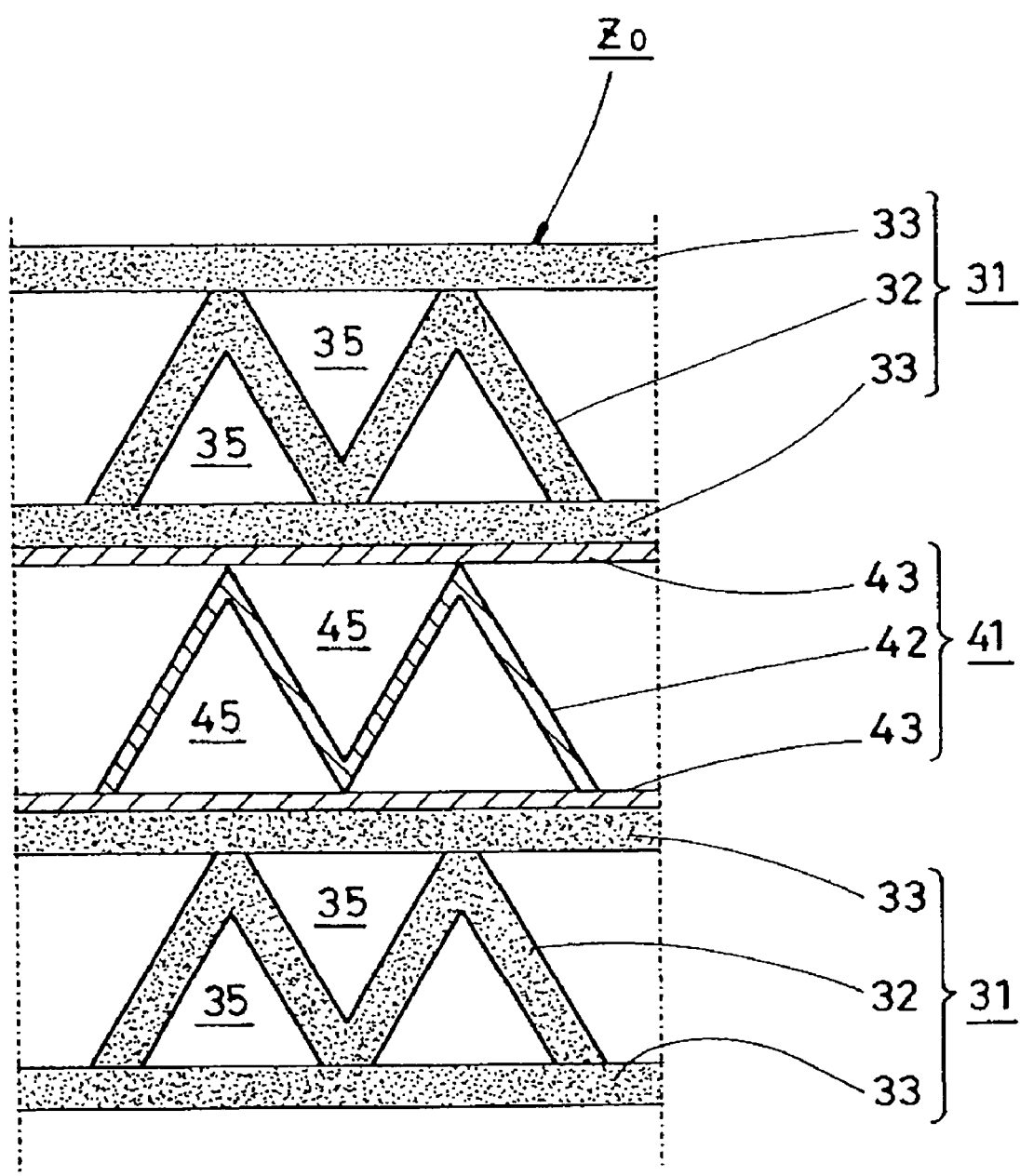
FIG. 36 is a longitudinal sectional view showing in an enlarged manner principal parts of the dehumidification unit shown in FIG. 35.

Secondary, it is the effect of improvement in the dehumidification capability of the dehumidification unit $Z_1$ by accelerating the transfer of heat between the adsorption element 1 and the cooling element 2. In other words, in the dehumidification unit $Z_1$ of the present embodiment, the empty space 5 is defined by the opening 24 of the cooling element 2, and in a corresponding portion to the empty space 5 the cooling air (Ab) in the inside of the empty space 5 is brought into direct contact with the side-plate member 12 of the adsorption element 1. Accordingly, when compared, for example, with a conventional dehumidification unit (see FIG. 35) in which there is provided a side-plate member on the side of the second air ventilation passages 4 of the cooling element 2, the resistance against the transfer of heat between the adsorption element 1 and the cooling element 2 is reduced by an amount corresponding to the reduction in the number of component members interposed between the adsorption element 1 and the cooling element 2. The action of heat liberation by an adsorption of heat of adsorption generated on the side of the first air ventilation passage 3 by the cooling air (Ab) flowing on the side of the second air ventilation passage 4 is accelerated, as a result of which improvement in the dehumidification capability of the dehumidification unit $Z_1$ is expected.

As a synergistic effect resulting from the above, higher-level dehumidification capabilities are obtained stably over a long period of time, and improvement in the commercial value of the dehumidification unit $Z_1$ is expected.

Further, by the provision of the opening 24 in the cooling element 2 as described above, the transfer of heat between the adsorption element 1 and the cooling element 2 is accelerated and the liberation of heat is accelerated by the increase in flow rate of the cooling air (Ab) resulting from the reduction in pressure loss. Accordingly, if the amount of heat liberation required on the side of the cooling element 2 is the same, this makes it possible to make the flow rate of the cooling air (Ab) in the empty space 5 lower by an amount corresponding to the acceleration in heat transfer and liberation. For example, in order to reduce the volume of the empty space 5, the thickness dimension of the cooling element 2 can be set to a smaller value. In addition, the dehumidification unit $Z_1$ made up the cooling element 2 and the adsorption element 1 is made compact in height dimension. Especially when using the dehumidification unit $Z_1$ as a dehumidification mechanism of an air conditioner, this contributes to the downsizing of air conditioners.

Furthermore, in the dehumidification unit $Z_1$ of the present embodiment, on the side of the exit portions 4b, 4b, . . . of the cooling element 2 the cooling air (Ab) flows outwardly from the empty space 5 through the exit portions 4b, 4b, . . . while being flow-rectified. Therefore, the level of noise generated by the outflow of the cooling air (Ab) is held as low as possible. As the result of this, quietness during dehumidification mode operation is secured. If the dehumidification unit $Z_1$ is employed, for example, as a dehumidification mechanism of an air conditioner, this provides advantages in view of realizing quiet air-conditioning operations.

II. Embodiment 2

Figure 4:
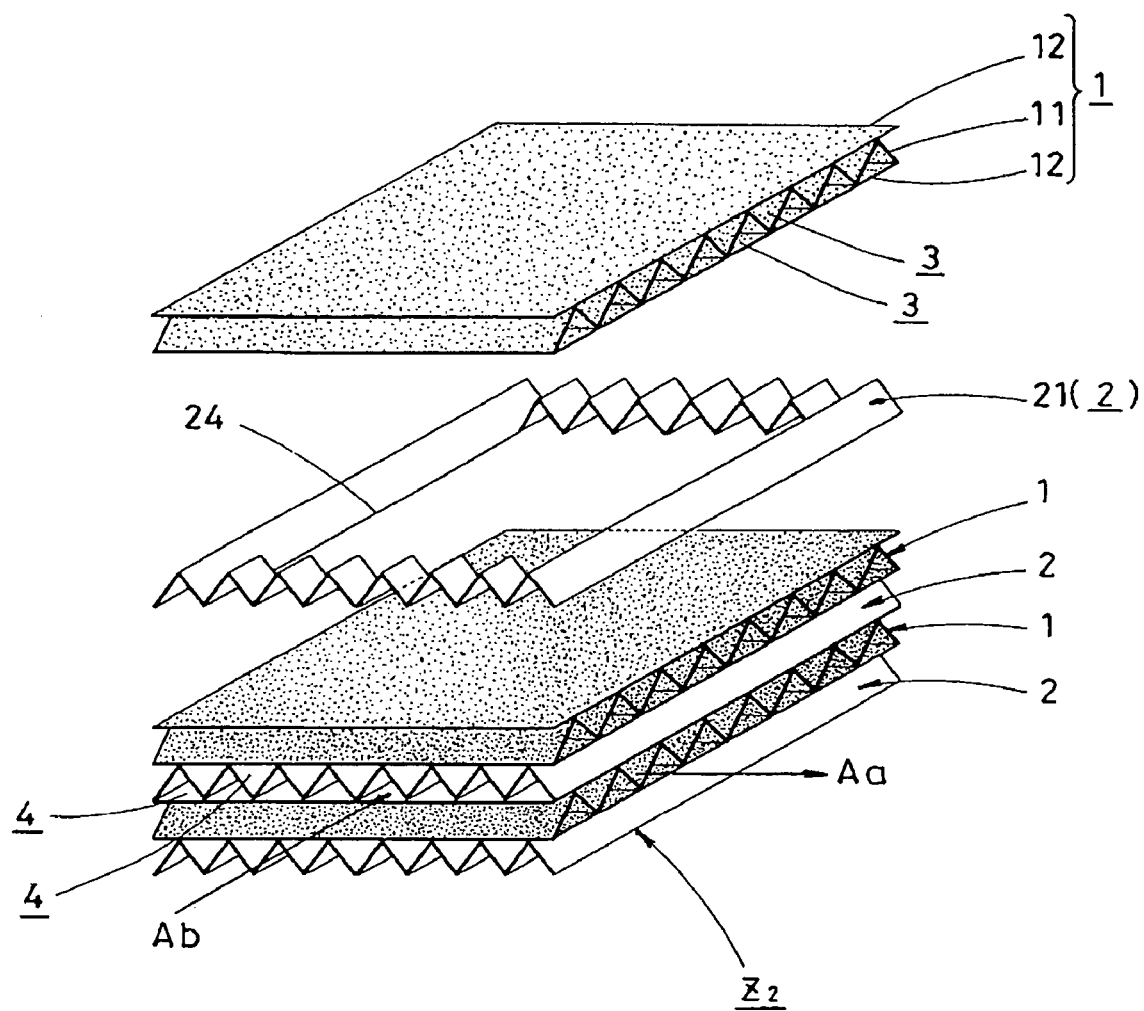
FIG. 4 is a perspective view showing in an exploded manner principal parts of a dehumidification unit according to a second embodiment of the present invention.
Figure 5:
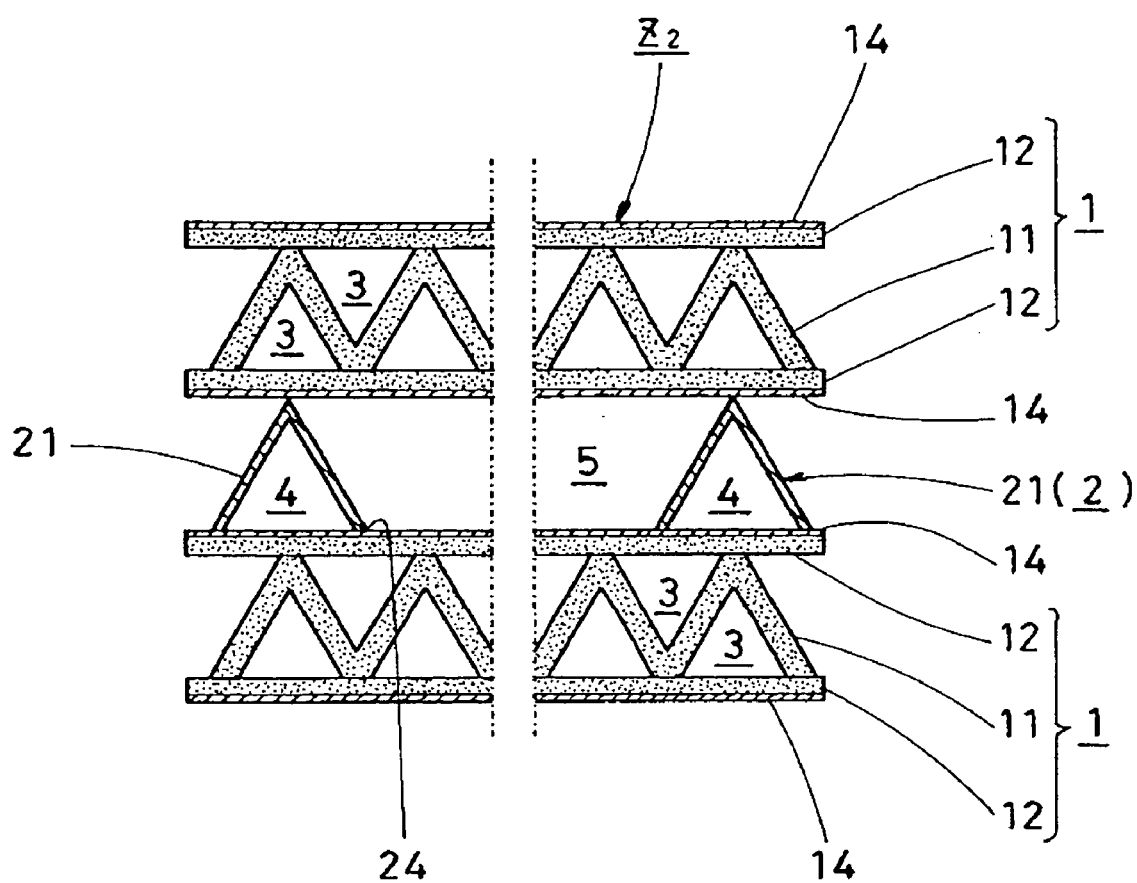
FIG. 5 is a longitudinal sectional view showing in an enlarged manner principal parts of the dehumidification unit shown in FIG. 4.

Referring to FIGS. 4 and 5, there is illustrated a dehumidification unit $Z_2$ formed in accordance with a second embodiment of the present invention. The dehumidification unit $Z_2$ is configured basically the same as the dehumidification unit $A_1$ of the first embodiment, with the exception of the way the cooling element 2 is constructed.

In the dehumidification unit ZL of the first embodiment, the cooling element 2, made up of the air ventilation passage forming member 21 formed from a bending plate member and the side-plate member 22, is shaped like a single-sided cardboard. On the other hand, in the dehumidification unit $Z_2$ of the present embodiment, the cooling element 2 is made up only of the air ventilation passage forming member 21 formed from a bending plate member. The remaining arrangement, i.e., the arrangement in which the opening 24 is formed centrally relative to the plane direction in the cooling element 2 so that the cooling element 2 is shaped, as a whole, like a frame, is the same as the cooling element 2 of the first embodiment.

Accordingly, when forming the dehumidification unit $Z_2$ by alternate laminations of the cooling element 2 made up only of the air ventilation passage forming member 21 and the adsorption element 1, the second air ventilation passages 4, 4, . . . on the side of the cooling element 2 directly face, at all the areas thereof (i.e., a portion corresponding to the empty space 5 defined by the opening 24 and all portions corresponding to the entry portions 4a, 4a, . . . and to the exit portions 4b, 4b, . . . ), the side-plate member 12 of the adsorption element 1. Because of this, the efficiency of heat transfer between the cooling air (Ab) flowing on the side of the cooling element 2 and the adsorption element 1 the temperature of which has been increased by heat of adsorption becomes higher in comparison with the dehumidification unit $Z_1$ of the first embodiment in which the second air ventilation passages 4, 4, . . . face, at portions corresponding to the entry portions 4a, 4a, . . . and to the exit portions 4b, 4b, . . . , the adsorption element 1 with the side-plate member 22 lying therebetween. The heat-liberation action of heat of adsorption is accelerated correspondingly and, in addition, further improvement in the dehumidification capability of the dehumidification unit $Z_2$ is expected.

Since the remaining arrangements other than the above and operation/working effects based thereon are the same as the dehumidification unit $Z_1$ according to the first embodiment, their respective descriptions are omitted here by using the corresponding explanations made in the first embodiment.

III. Embodiment 3

Figure 6:
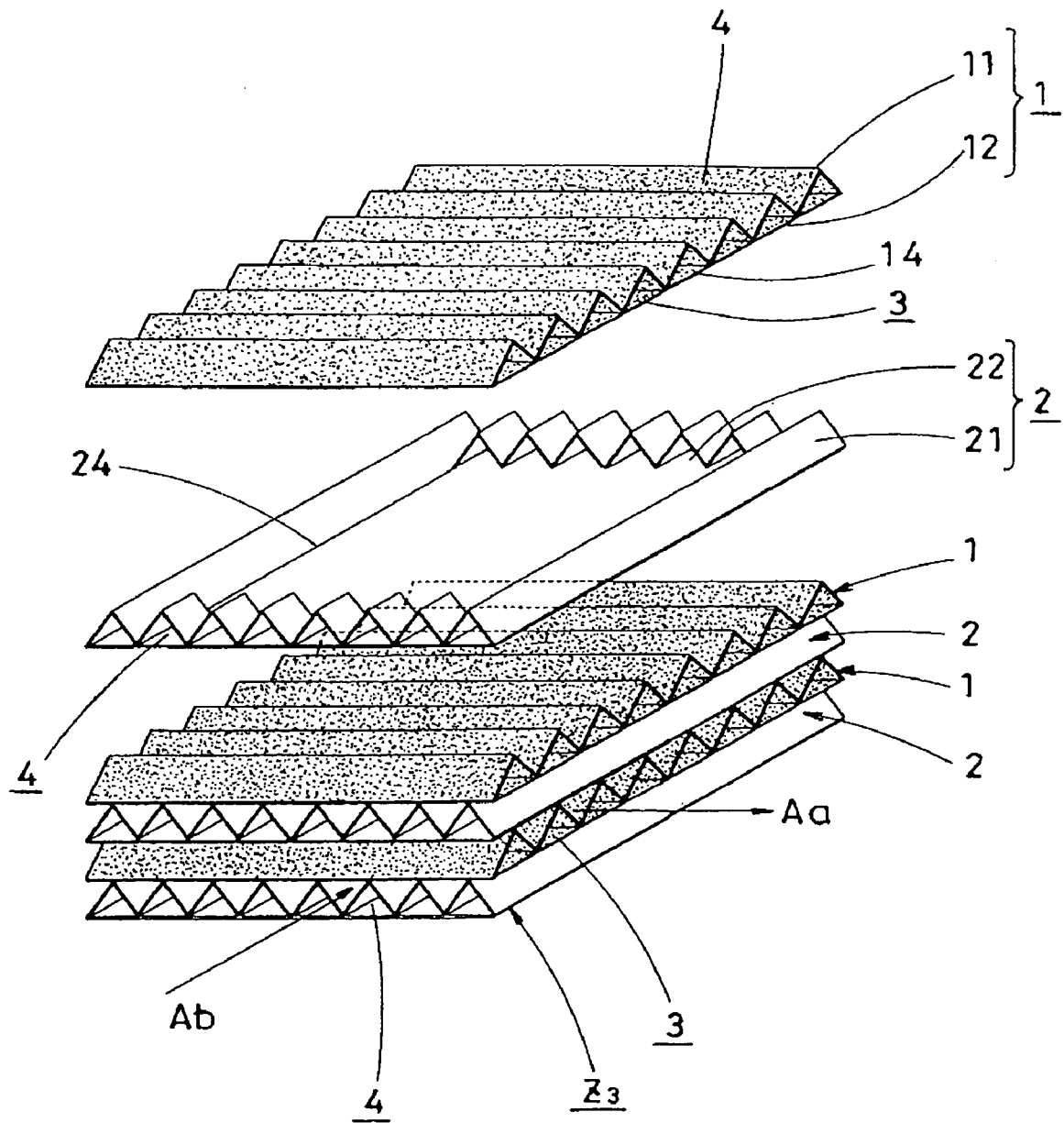
FIG. 6 is a perspective view showing in an exploded manner principal parts of a dehumidification unit according to a third embodiment of the present invention.

Referring to FIG. 6, there is illustrated a dehumidification unit $Z_3$ formed in accordance with a third embodiment of the present invention. The dehumidification unit $Z_3$ is configured basically the same as the dehumidification unit $Z_1$ of the first embodiment, with the exception of the way the adsorption element 1 and the cooling element 2 are constructed.

In the dehumidification unit $Z_1$ of the first embodiment, the adsorption element 1, made up of three components (i.e., an air ventilation passage forming member 11 formed from a bending plate member and a pair of side-plate members 12, 12 joined respectively to one surface and to the other surface of the air ventilation passage forming member 11), is shaped like a double-sided cardboard, and each side-plate number 12 is provided, on its exterior surface, with a respective separation sheet layer 14. On the other hand, in the dehumidification unit $Z_3$ of the present embodiment, the adsorption element 1, made up of an air ventilation passage forming member 11 formed from a bending plate member and a single side-plate member 12 joined to one surface of the air ventilation passage forming member 11, is shaped like a single-sided cardboard, and a surface of the side-plate member 12 of the adsorption element 1 and a surface of the air ventilation passage forming member 11 situated on the open side are each provided with a respective separation sheet layer 14.

Additionally, for the case of the cooling element 2 of the dehumidification unit $Z_1$ of the first embodiment, the side-plate member 22 shaped like a flat plate is firmly joined to one surface of the air ventilation passage forming member 21 shaped like a corrugated plate, and its planewise central portion is subjected to punching, thereby to punch a hole (i.e., the rectangular opening 24) through an integrally combined member made up of the air ventilation passage forming member 21 and the side-plate member 22. Unlike the dehumidification unit $Z_1$ of the first embodiment, in the dehumidification unit $Z_3$ of the present embodiment it is arranged such that only the air ventilation passage forming member 21 is subjected to punching so as to punch a rectangular hole (the opening 24) therethrough and the side-plate member 22 remains unprocessed at the bottom of the opening 24, although the cooling element 2 of the dehumidification unit $Z_3$ is formed from two different members, namely the air ventilation passage forming member 21 and the side-plate member 22. In addition, the cooling element 2 is prepared as follows. The air ventilation passage forming member 21 is subjected to punching so that the opening 24 is preformed. Thereafter, the side-plate member 22 (not subjected to punching) is firmly joined to the air ventilation passage forming member 21 already provided with the opening 24.

In the dehumidification unit $Z_3$ provided with the adsorption element 1 of such configuration, the adsorption element 1 is made up of only two component members (i.e., the air ventilation passage forming member 11 and the side-plate member 12). When compared to the dehumidification unit $Z_1$ of the first embodiment characterized in that the adsorption element 1 is made up of three component members (i.e., the air ventilation passage forming member 11 and the side-plate members 12 as a side-plate member pair), the adsorption element 1 of the dehumidification unit $Z_3$ is made up of a less number of component members, and the manufacture of the adsorption element 1 is facilitated correspondingly and cost savings are provided.

Since the remaining arrangements other than the above and operation/working effects based thereon are the same as the dehumidification unit $Z_1$ according to the first embodiment, their respective descriptions are omitted here by using the corresponding explanations made in the first embodiment.

IV. Embodiment 4

Figure 7:
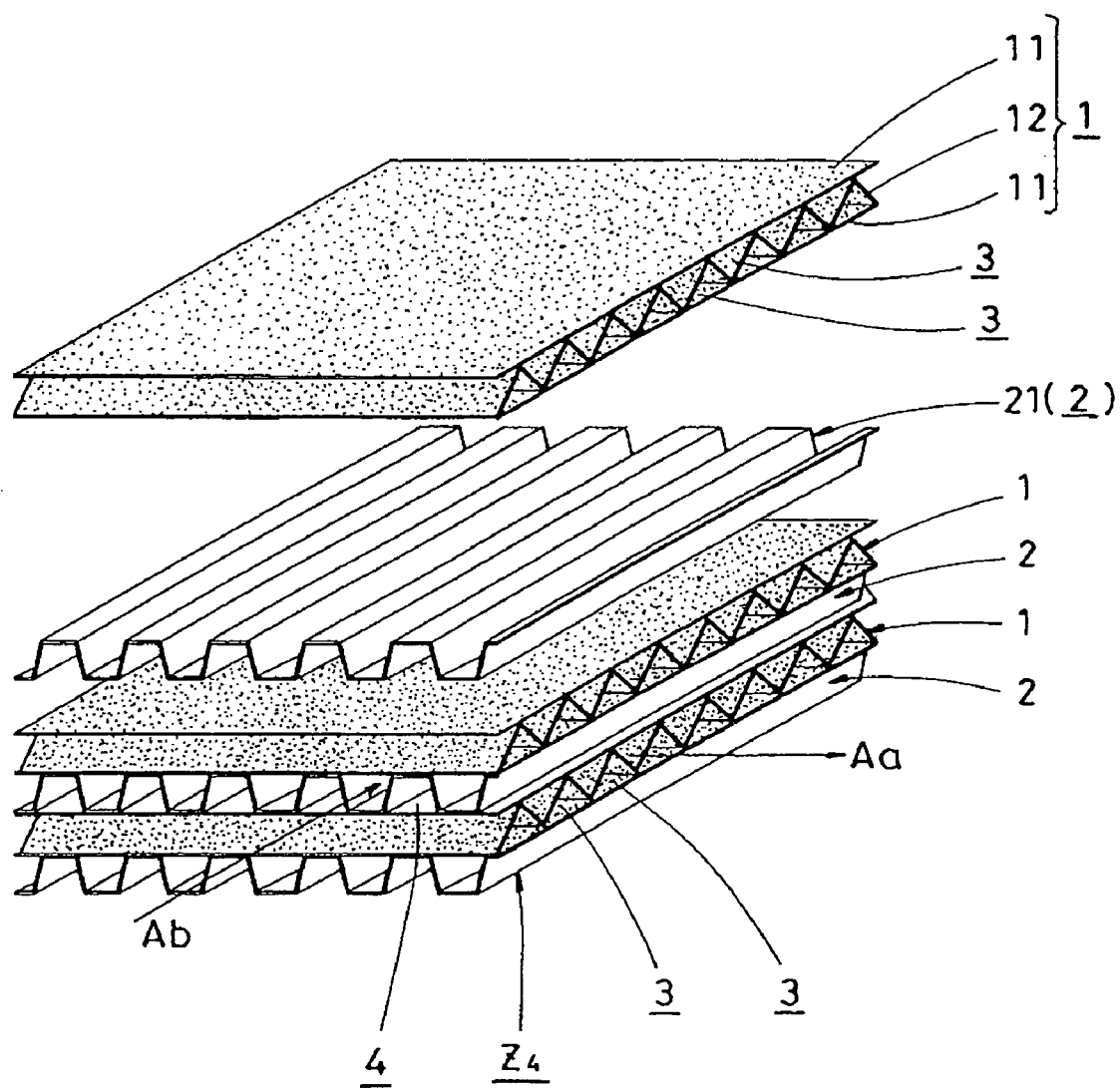
FIG. 7 is a perspective view showing in an exploded manner a dehumidification unit according to a fourth embodiment of the present invention.
Figure 8:
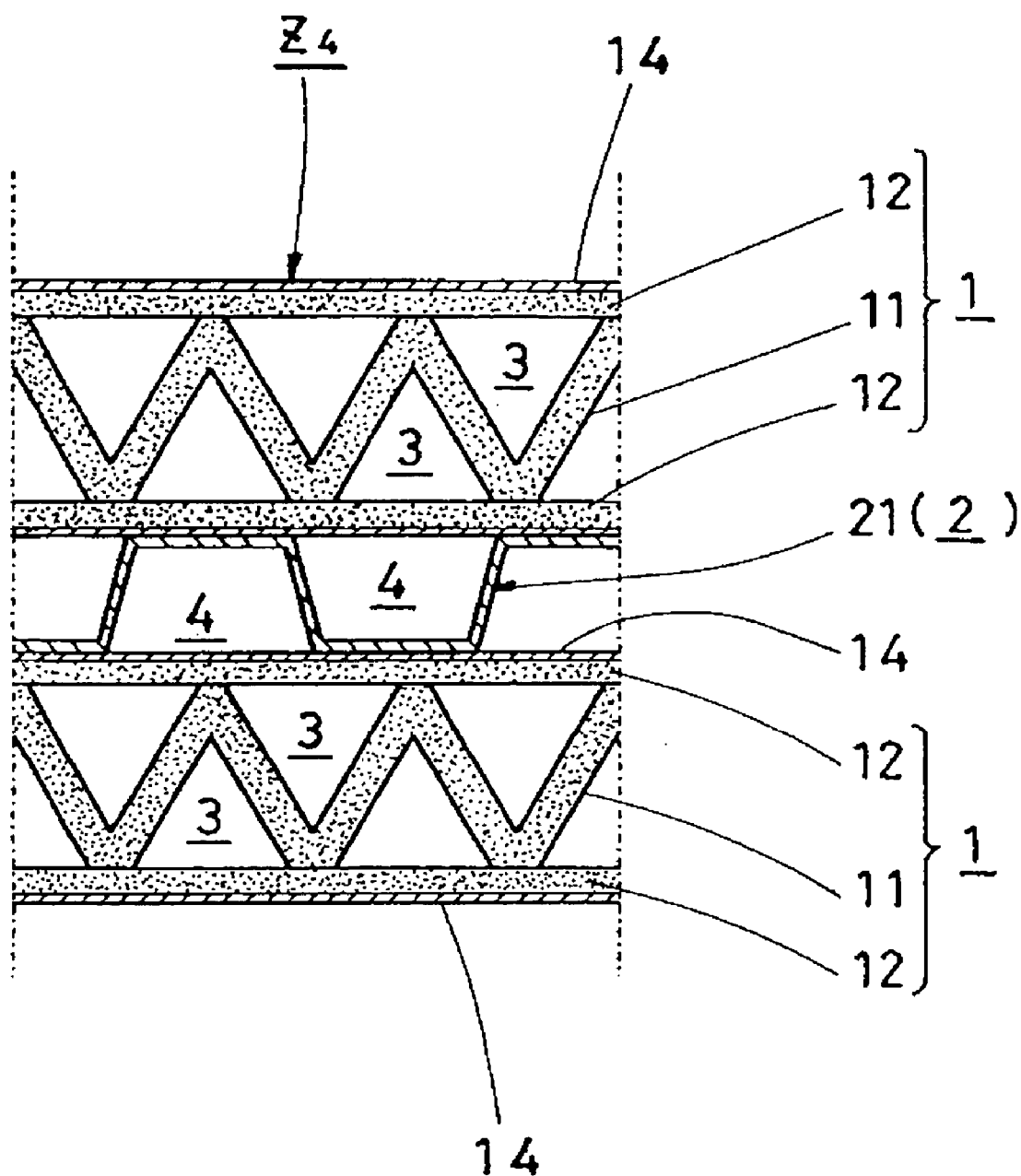
FIG. 8 is a longitudinal sectional view showing in an enlarged manner principal parts of the dehumidification unit shown in FIG. 7.
Figure 9:
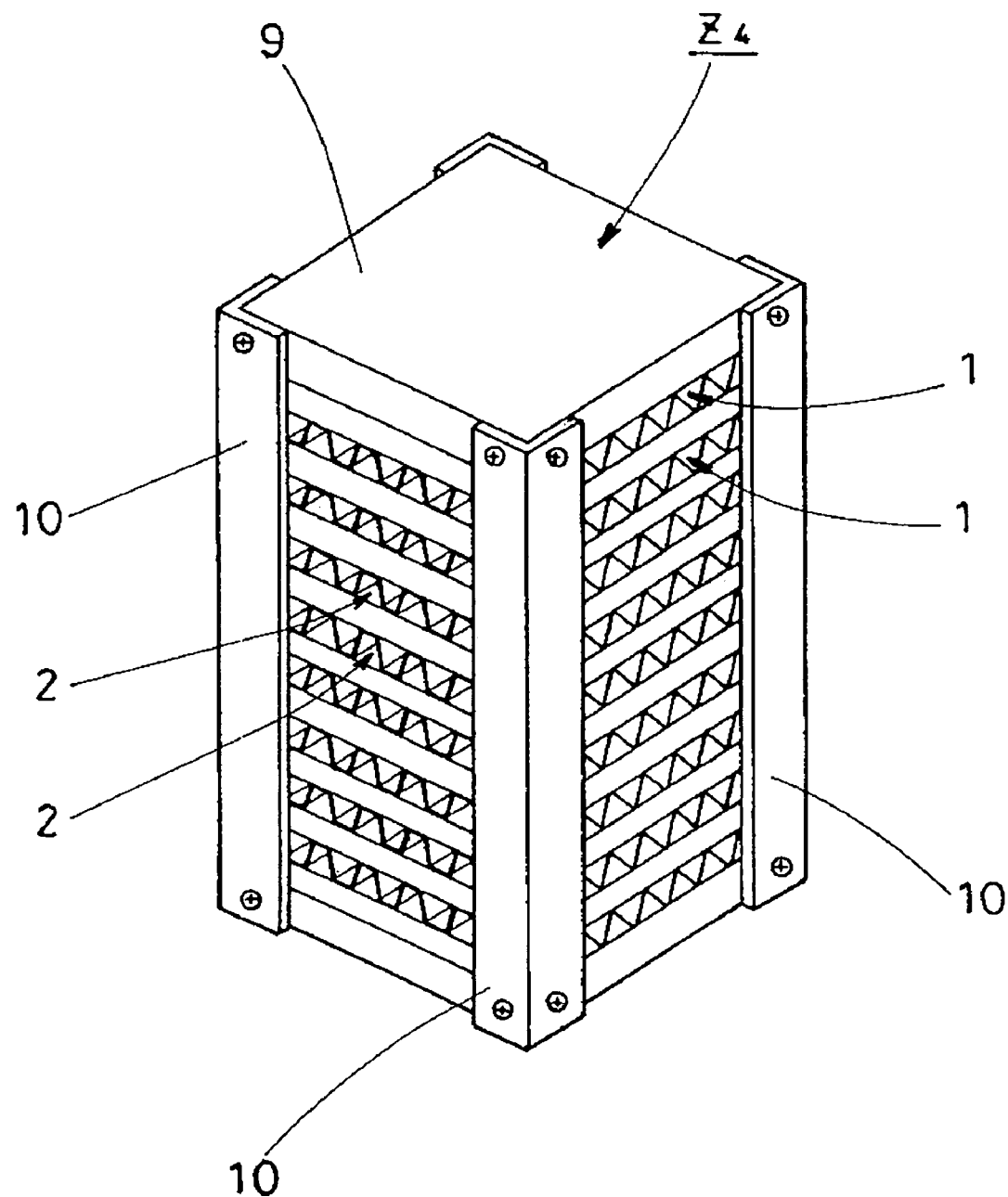
FIG. 9 is an outline perspective view of the dehumidification unit shown in FIG. 7.

Referring to FIGS. 7-9, there is illustrated a dehumidification unit $Z_4$ formed in accordance with a fourth embodiment of the present invention. The dehumidification unit $Z_4$ is formed as follows: a plurality of adsorption elements 1, 1, . . . and a plurality of cooling elements 2, 2, . . . are laminated sequentially alternately in a 90-degree plane phase, thereby to form a laminated body. Then, two end plates 9, 9 are mounted on one lamination-wise end and on the other lamination-wise end of the laminated body, respectively. The end plates 9, 9 are connected together by four frame members 10, 10, . . . which are arranged along the four corners of the laminated body, in other words all the components are combined into a single body, as shown in FIG. 9. Hereinafter, specific constructions for the adsorption element 1 and the cooling element 2 which together constitute the dehumidification unit $Z_4$ will be described.

As shown in FIGS. 7 and 8, the adsorption element 1 of the present embodiment is shaped like a double-sided cardboard made up of a below-mentioned air ventilation passage forming member 11 and a pair of side-plate members 12, 12.

The air ventilation passage forming member 11 is formed of fiber paper made of ceramic fibers. More specifically, the air ventilation passage forming member 11 is a bending plate member formed by alternate bending of a sheet of fiber paper in the thickness direction thereof, in other words the air ventilation passage forming member 11 is shaped, as a whole, like a corrugated plate. An adequate adsorbent, such as silica gel etcetera, is supported on a surface of the air ventilation passage forming member 11. On the other hand, each of the side plate members 12, 12 is formed of fiber paper of ceramic fibers and is in the form of a flat plate. An adequate adsorbent, such as silica gel etcetera, is supported on one surface of each side plate member 12 and a separation sheet layer 14 is formed on the other surface.

And, with the separation sheet layers 14 oriented outwardly, the side plate members 12, 12 are firmly united to the surfaces of the air ventilation passage forming member 11 so that they are combined into a single body, whereby the adsorption element 1 provided with the first air ventilation passages 3, 3, . . . extending in parallel with areas corresponding to "valley" portions of the air ventilation passage forming member 11 is prepared. Accordingly, in the adsorption element 1, the first air ventilation passages 3, 3, . . . formed in rows in a plane direction of the adsorption element 1 are placed in such a state that they are completely separated from the outside by the separation sheet layers 14, 14 of the side plate members 12, 12.

The absorbent is supported on the air ventilation passage forming member 11 and on the side-plate members 12, 12 by means of the same technique as described in terms of the adsorption element 1 of the first embodiment. Accordingly, the description concerned is omitted here. Additionally, the separation sheet layer 14 is formed by means of the same technique as described in terms of the adsorption element 1 of the first embodiment. Accordingly, the description concerned is omitted here.

As can be seen from FIGS. 7 and 8, the cooling element 2 is made up only of a below-mentioned air ventilation passage forming member 21. More specifically, the air ventilation passage forming member 21 is made up of a bending plate member formed by alternate bending of a sheet metal of aluminum etcetera or a sheet resin in a trapezoidal pattern in the thickness direction thereof, and is shaped like, as a whole, a trapezoidally-corrugated bending plate.

The adsorption element 1 and the cooling element 2, as constructed above, are sequentially alternately laminated one upon the other in a plane phase of 90 degrees. These elements 1 and 2 are brought together into a single laminated body by the end plates 9, 9 and the frame members 10, 10, . . . , thereby to prepare the dehumidification unit $Z_4$ having a rectangular block-like outer appearance (see FIG. 9). As shown in FIG. 8, in the dehumidification unit $Z_4$ thus prepared, a plurality of second air ventilation passages 4, 4, . . . having a trapezoidal cross-sectional shape (i.e., an approximately rectangular cross-sectional shape) are defined between the air ventilation passage forming member 21 and the side-plate member 12 of each of the adsorption elements 1, 1 situated on both sides of the air ventilation passage forming member 21, by "valley" portions of the air ventilation passage forming member 21.

Accordingly, as shown in FIG. 9, the dehumidification unit $Z_4$ has four side surfaces comprising a first pair of opposing side surfaces and a second pair of opposing side surfaces. The first air ventilation passages 3, 3, . . . of each of the adsorption elements 1, 1, . . . have opening ends at the first pair of opposing side surfaces. On the other hand, the second air ventilation passages 4, 4, . . . of each of the cooling elements 2, 2, . . . have open ends at the second pair of opposing side surfaces.

Here, the operation of the dehumidification unit $Z_4$ is described together with other relevant matters. In the dehumidification unit $Z_4$, humid air as air (Aa) to be processed is passed through each of the first air ventilation passages 3, 3, . . . and cooling air (Ab) is passed through each of the second air ventilation passages 4, 4, . . . , whereby the to-be-processed air (Aa) is dehumidified. More specifically, on the side of the adsorption element 1, when the to-be-processed air (Aa) flows in the inside of each of the first air ventilation passages 3, 3, . . . , the moisture contained in the air (Aa) is sequentially adsorption-removed by the adsorbent supported on each of the first air ventilation passages 3, 3, . . . and is dehumidified. Finally, the air (Aa) is discharged as a stream of low-humidity air.

On the other hand, on the side of the cooling element 2, the action of heat liberation by an absorption of heat of adsorption generated on the side of adsorption element 1 is carried out by the cooling air (Ab) flowing through each of the second air ventilation passages 4, 4, . . . . By the liberating of heat of adsorption, the temperature of the adsorbent on the side of the adsorption element 1 is constantly maintained at adequate level. Therefore, the adsorbent will maintain its adsorption capability at high level over a long period of time. As a result, the dehumidification unit $Z_4$ will maintain its dehumidification capability at high levels over long periods.

Especially, the dehumidification unit $Z_4$ of the present embodiment demonstrates high-level dehumidification capabilities because of the following structural characteristics of the cooling element 2.

In the dehumidification unit $Z_4$ of the present embodiment, the second air ventilation passages 4, 4, . . . defined in the cooling element 2 have a trapezoidal cross-sectional shape. As a result of such arrangement, the effective passage area of each of the second air ventilation passages 4, 4, . . . becomes greater than that of an air ventilation passage having the same total passage area as the second air ventilation passage 4 and having a triangular cross-sectional shape. Because of this, the flow resistance of the second air ventilation passages 4, 4, . . . is small and the pressure loss of the cooling air (Ab) flowing through the second air ventilation passages 4, 4, . . . is held low. This makes it possible to increase the flow rate of the cooling air (Ab) in the second air ventilation passages 4, 4, . . . by an amount corresponding to the reduction in pressure loss. As the result of this, the heat-liberation efficiency of heat of adsorption by the cooling air (Ab) is improved, and the dehumidification capability of the dehumidification unit $Z_4$ is maintained at high levels over a long period of time.

V. Embodiment 5

Figure 10:
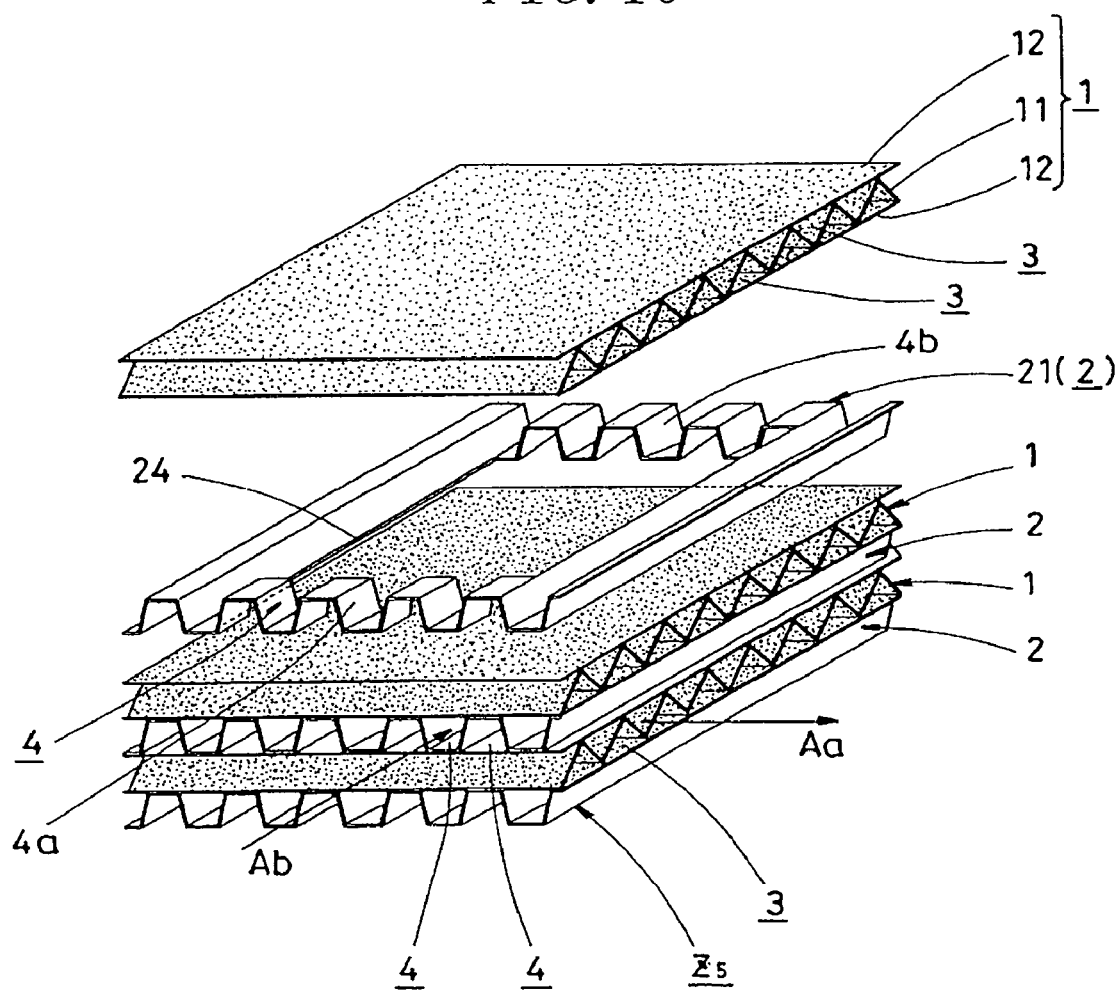
FIG. 10 is a perspective view showing in an exploded manner a dehumidification unit according to a fifth embodiment of the present invention.
Figure 11:
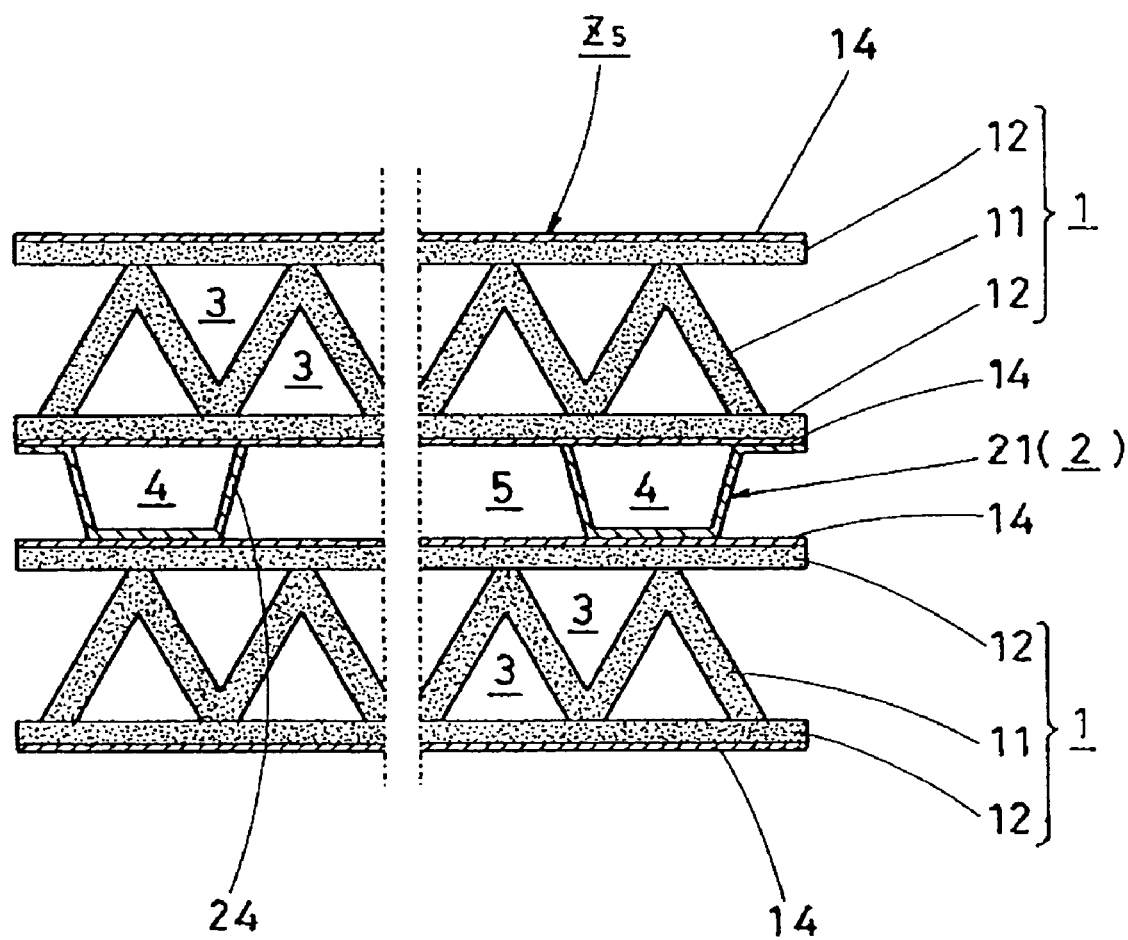
FIG. 11 is a longitudinal sectional view showing in an enlarged manner principal parts of the dehumidification unit shown in FIG. 10.

Referring to FIGS. 10 and 11, there is illustrated a dehumidification unit $Z_5$ formed in accordance with a fifth embodiment of the present invention. The dehumidification unit $Z_5$ is configured basically the same as the dehumidification unit $Z_4$ of the fourth embodiment, with the exception of the way the cooling element 2 is constructed.

In the dehumidification unit $Z_4$ of the fourth embodiment, the cooling element 2 is made up of the air ventilation passage forming member 21 formed from a bending plate member bent into a trapezoidal shape. Unlike the cooling element 2 of the dehumidification unit $Z_4$, the cooling element 2 of the dehumidification unit $Z_5$ is formed from a frame-like air ventilation passage forming member 21. More specifically, the air ventilation passage forming member 21 is formed from a bending plate member bent into a trapezoidal shape and provided with an opening 24 at its planewise central portion. A plurality of second air ventilation passages 4, 4, ... extending in parallel with each other are formed in the cooling element 2 by its "valley" portions. By the formation of the opening 24, only both ends of each of the second air ventilation passages 4, 4, ... remain as an entry portion 4a and as an exit portion 4b respectively, and a portion other than the entry and exit portions 4a, 4b, i.e. an intermediate portion, is substituted by the opening 24.

The adsorption element 1 and the cooling element 2, as constructed above, are sequentially alternately laminated one upon the other in a plane phase of 90 degrees. These adsorption and cooling elements 1 and 2 are brought together into a laminated body by the end plates 9, 9 and the frame members 10, 10, ..., thereby to prepare the dehumidification unit $Z_5$. In the dehumidification unit $Z_5$ comprising laminations of the adsorption elements 1 and the cooling elements 2, a cooling element 2 is sandwiched between two adsorption elements 1, 1 situated on both sides of the cooling element 2, and both opening surfaces of the opening 24 of the cooling element 2 are closed by the adsorption elements 1, 1, thereby defining an empty space 5 having a required volume. And, the empty space 5 communicates, through the entry portions 4a, 4a, ... and through the exit portions 4b, 4b, ..., with the outside.

Here, the operation of the dehumidification unit $Z_5$ is described together with other relevant matters. In the dehumidification unit $Z_5$, humid air as air (Aa) to be processed is passed through each of the first air ventilation passages 3, 3, ... and cooling air (Ab) is passed through each of the second air ventilation passages 4, 4, ..., whereby the to-be-processed air (Aa) is dehumidified. More specifically, on the side of the adsorption element 1, when the to-be-processed air (Aa) flows in the inside of each of the first air ventilation passages 3, 3, ..., the moisture contained in the air (Aa) is sequentially adsorption-removed by the adsorbent supported on each of the first air ventilation passages 3, 3, ... and is dehumidified. Finally, the air (Aa) is discharged as a stream of low-humidity air.

On the other hand, on the side of the cooling element 2, the action of heat liberation by an absorption of heat of adsorption generated on the side of adsorption element 1 is carried out by the cooling air (Ab) flowing through each of the second air ventilation passages 4, 4, .... By the liberating of heat of adsorption, the temperature of the adsorbent on the side of the adsorption element 1 is constantly maintained at adequate level. Therefore, the adsorbent will maintain its adsorption capability at high level over a long period of time. As a result, the dehumidification unit $Z_5$ will maintain its dehumidification capability at high levels over long periods.

Furthermore, the dehumidification unit $Z_5$ of the present embodiment provides, in addition to the above-described basic effects, the following specific effects.

The dehumidification unit $Z_5$ provides a first specific effect attributable to the cross-sectional shape of the second air ventilation passages 4, 4, ... defined in the cooling element 2. As is the case with the dehumidification unit $Z_4$ of the fourth embodiment, in the dehumidification unit $Z_5$ of the present embodiment the cooling element 2 is provided with the second air ventilation passages 4, 4, ... having a trapezoidal cross-sectional shape, whereby the pressure loss of the cooling air (Ab) in the cooling element 2 is lessened. As a result, the flow rate of the cooling air (Ab) increases, thereby improving the heat-liberation efficiency of heat of adsorption. Therefore, the dehumidification capability of the dehumidification unit $Z_5$ is improved to a further extent.

The dehumidification unit $Z_5$ provides a second specific effect attributable to the provision of the opening 24 in the cooling element 2. In the dehumidification unit $Z_5$ of the present embodiment, the cooling element 2 is provided with the opening 24. Each of the second air ventilation passages 4, 4, ... is divided, relative to the passage direction, into an entry portion 4a and an exit portion 4b. In addition, the intermediate portion is the empty space 5 common to the second air ventilation passages 4, 4, ..... As a result of such arrangement, the cooling air (Ab) which flows into the second air ventilation passages 4, 4, ... through the entry portions 4a, 4a, ... immediately enters the inside of the empty space 5 from the entry portions 4a, 4a, ..., freely flows from the side of the entry portions 4a, 4a, ... towards the side of the exit portions 4b, 4b, ..., and thereafter is discharged through the exit portions 4b, 4b, ... to the outside.

In such a case, there exists no member which prevents the passage of the cooling air (Ab) in the empty space 5, and the resistance against the flow of the cooling air (Ab) is held as low as possible. As the result of this, the total pressure loss of the cooling element 2 of the present embodiment is made smaller by an amount corresponding to the reduction in passage length of the second air ventilation passage 4 by the formation of the opening 24, when compared, for example, with the case where the second air ventilation passages 4, 4, ... are each configured so as to continuously extend from one end side to the other end side of the cooling element 2 (in other words the construction without the provision of the opening 24). Consequently, the flow rate of the cooling air (Ab) which flows through the second air ventilation passage 4 is increased, and the heat-liberation efficiency of heat of adsorption on the side of the adsorption element 1 by the cooling air (Ab) becomes better by an amount corresponding to the increase in flow rate of the cooling air (Ab). Therefore, improvement in the dehumidification capability of the dehumidification unit $Z_5$ is expected.

Additionally, in this case, the entry portions 4a, 4a, ... of the second air ventilation passages 4, 4, ... are arranged on one end side of the opening 24. On the other hand, the exit portions 4b, 4b, ... of the second air ventilation passages 4, 4, ... are arranged on the other end side of the opening 24. Therefore, on the side of the entry portions 4a, 4a, ..., the cooling air (Ab) flowing towards the opening 24 is flow-rectified by the entry portions 4a, 4a, ... and is prevented from deviating in the direction in which the second air ventilation passages 4, 4, ... are formed in rows. As the result of this, the flow of the cooling air (Ab) in the inside of the empty space 5 is stabilized and it becomes possible to reduce the pressure loss to a further extent.

The dehumidification unit $Z_5$ provides a third specific effect resulting from accelerating the transfer of heat between the adsorption element 1 and the cooling element 2. In other words, in the dehumidification unit $Z_5$ of the present embodiment, the empty space 5 is defined by the opening 24 of the cooling element 2, and in a corresponding portion to the empty space 5 the cooling air (Ab) in the inside of the empty space 5 is brought into direct contact with the side-plate member 12 of the adsorption element 1. Accordingly, when compared, for example, with a conventional dehumidification unit (see FIG. 35) in which there is provided a side-plate member on the side of the second air ventilation passages 4 of the cooling element 2, the resistance against the transfer of heat between the adsorption element 1 and the cooling element 2 is reduced by an amount corresponding to the reduction in the number of component members interposed between the adsorption element 1 and the cooling element 2. The action of heat liberation by an adsorption of heat of adsorption generated on the side of the first air ventilation passage 3 by the cooling air (Ab) flowing on the side of the second air ventilation passage 4 is accelerated, as a result of which improvement in the dehumidification capability of the dehumidification unit $Z_5$ is expected.

Fourthly, as described above, by the provision of the opening 24 in the cooling element 2 as described above, the transfer of heat between the adsorption element 1 and the cooling element 2 is accelerated and the liberation of heat is accelerated by the increase in flow rate of the cooling air (Ab) resulting from the reduction in pressure loss. Accordingly, if the amount of heat liberation required on the side of the cooling element 2 is the same, this makes it possible to make the flow rate of the cooling air (Ab) in the empty space 5 lower by an amount corresponding to the acceleration in heat transfer and liberation. For example, in order to reduce the volume of the empty space 5, the thickness dimension of the cooling element 2 can be set to a smaller value. In addition, the dehumidification unit $Z_5$ made up the cooling element 2 and the adsorption element 1 is made compact in height dimension. Especially when using the dehumidification unit $Z_5$ as a dehumidification mechanism of an air conditioner, this contributes to the downsizing of air conditioners.

Fifthly, in the dehumidification unit $Z_5$ of the present embodiment, on the side of the exit portions 4b, 4b, ... of the cooling element 2 the cooling air (Ab) flows outwardly from the empty space 5 through the exit portions 4b, 4b, ... while being flow-rectified. Therefore, the level of noise generated by the outflow of the cooling air (Ab) is held as low as possible. As the result of this, quietness during dehumidification mode operation is secured. If the dehumidification unit $Z_5$ is employed, for example, as a dehumidification mechanism of an air conditioner, this is preferable in view of realizing quiet air-conditioning operations.

VI. Embodiment 6

Figure 12:
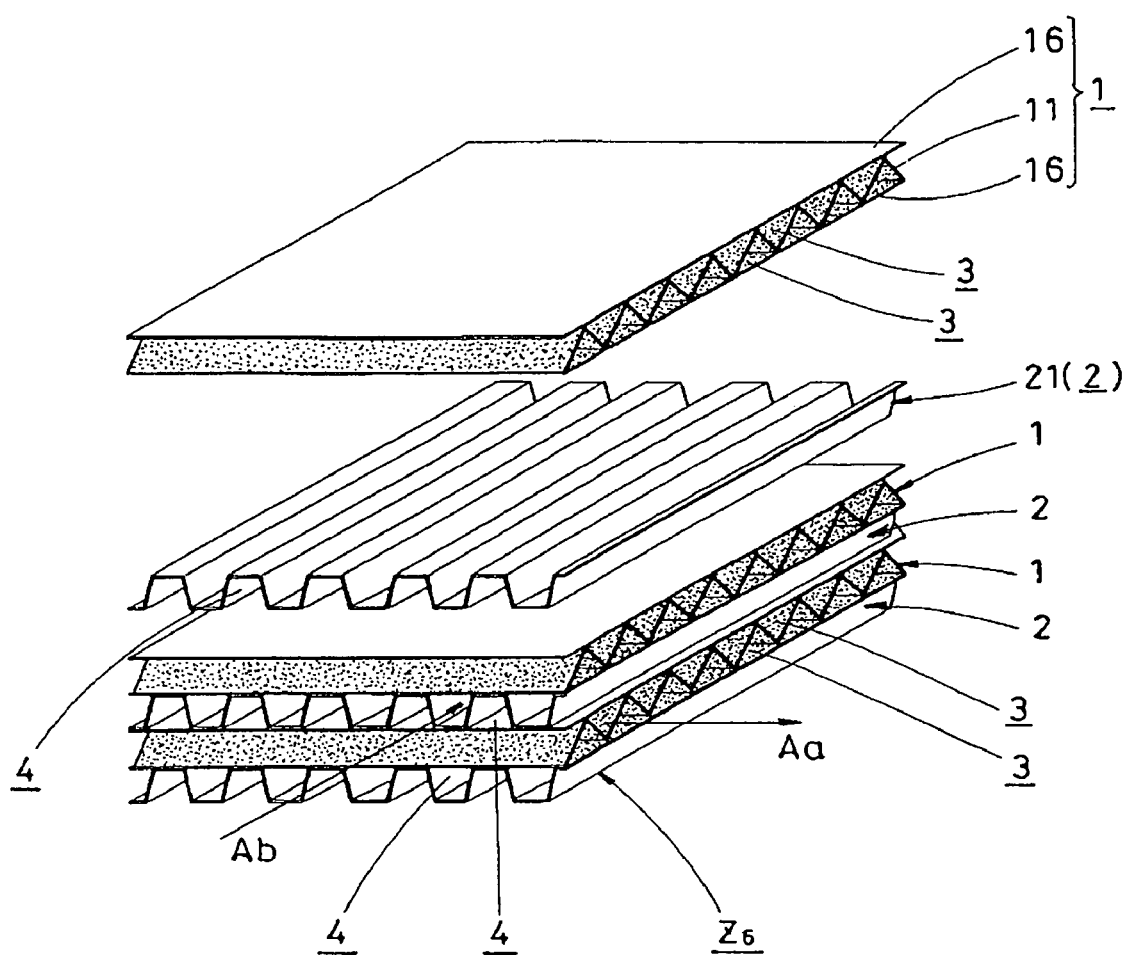
FIG. 12 is a perspective view showing in an exploded manner a dehumidification unit according to a sixth embodiment of the present invention.
Figure 13:
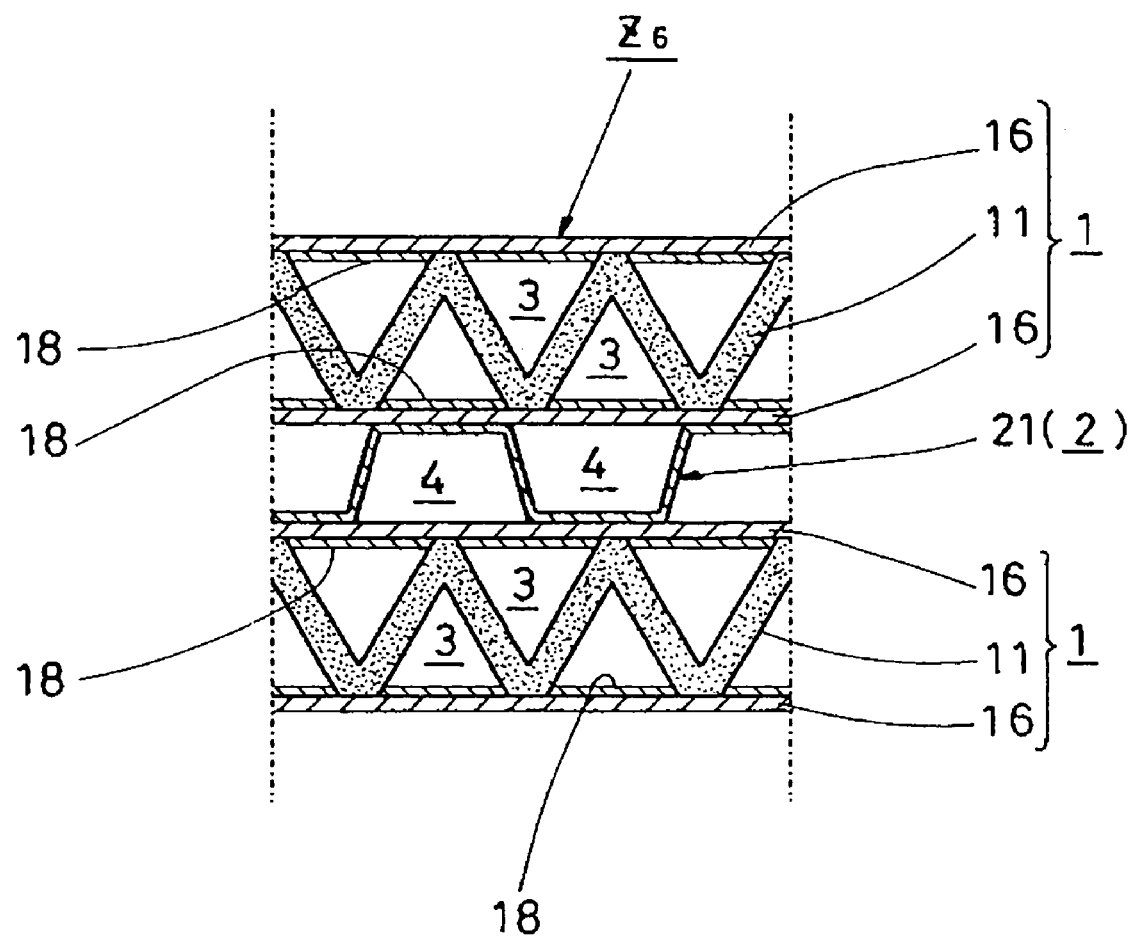
FIG. 13 is a longitudinal sectional view showing in an enlarged manner principal parts of the dehumidification unit shown in FIG. 12.

Referring to FIGS. 12 and 13, there is illustrated a dehumidification unit $Z_6$ formed in accordance with a sixth embodiment of the present invention. The dehumidification unit $Z_6$ is configured basically the same as the dehumidification unit $Z_4$ of the fourth embodiment, with the exception of the way the adsorption element 1 is constructed.

In the dehumidification unit $Z_4$ of the fourth embodiment, the adsorption element 1, made up of three component members (i.e., an air ventilation passage forming member 11 formed from a bending plate member of fiber paper and a pair of side-plate members 12, 12 which are flat plate bodies of fiber paper and which are joined to one side and to the other side of the air ventilation passage forming member 11, respectively), is shaped like a double-sided cardboard, and each side-plate member 12 is provided, on its exterior surface, with a respective separation sheet layer 14. Unlike the dehumidification unit $Z_4$, in the dehumidification unit $Z_6$ of the present embodiment the adsorption element 1 is made up of an air ventilation passage forming member 11 formed from a bending plate member of fiber paper on which an adsorbent is supported, and a pair of side-plate members 16, 16 which are joined to one side and to the other side of the air ventilation passage forming member 11, respectively and which are formed from a sheet metal of aluminum etcetera or from a sheet resin, and each of the side-plate members 16, 16 directly supports on its interior surface an adsorbent as an adsorbent layer 18.

In the dehumidification unit $Z_6$ provided with the adsorption element 1 of such configuration, the side-plate members 16, 16 each directly support thereon an adsorbent. As a result of such arrangement, the distance between the adsorbent thus supported and the second air ventilation passage 4 on the side of the cooling element 2 becomes shorter, when compared with the case where the adsorbent is supported on the side-plate member 12 made of fiber paper, as in the dehumidification unit $Z_4$ of the fourth embodiment. Furthermore, especially when the side-plate member 16 is formed from a sheet metal, there is produced a synergistic effect that the efficiency of transferring heat of adsorption generated in the adsorbent on the side of the adsorption element 1 towards the cooling element 1 is improved because such a sheet metal has a high heat transfer rate, and further improvement in the dehumidification capability of the dehumidification unit $Z_6$ is expected.

Since the remaining arrangements other than the above and operation/working effects based thereon are the same as the dehumidification unit $Z_4$ according to the fourth embodiment, their respective descriptions are omitted here by using the corresponding explanations made in the fourth embodiment.

VII. Embodiment 7

Figure 14:
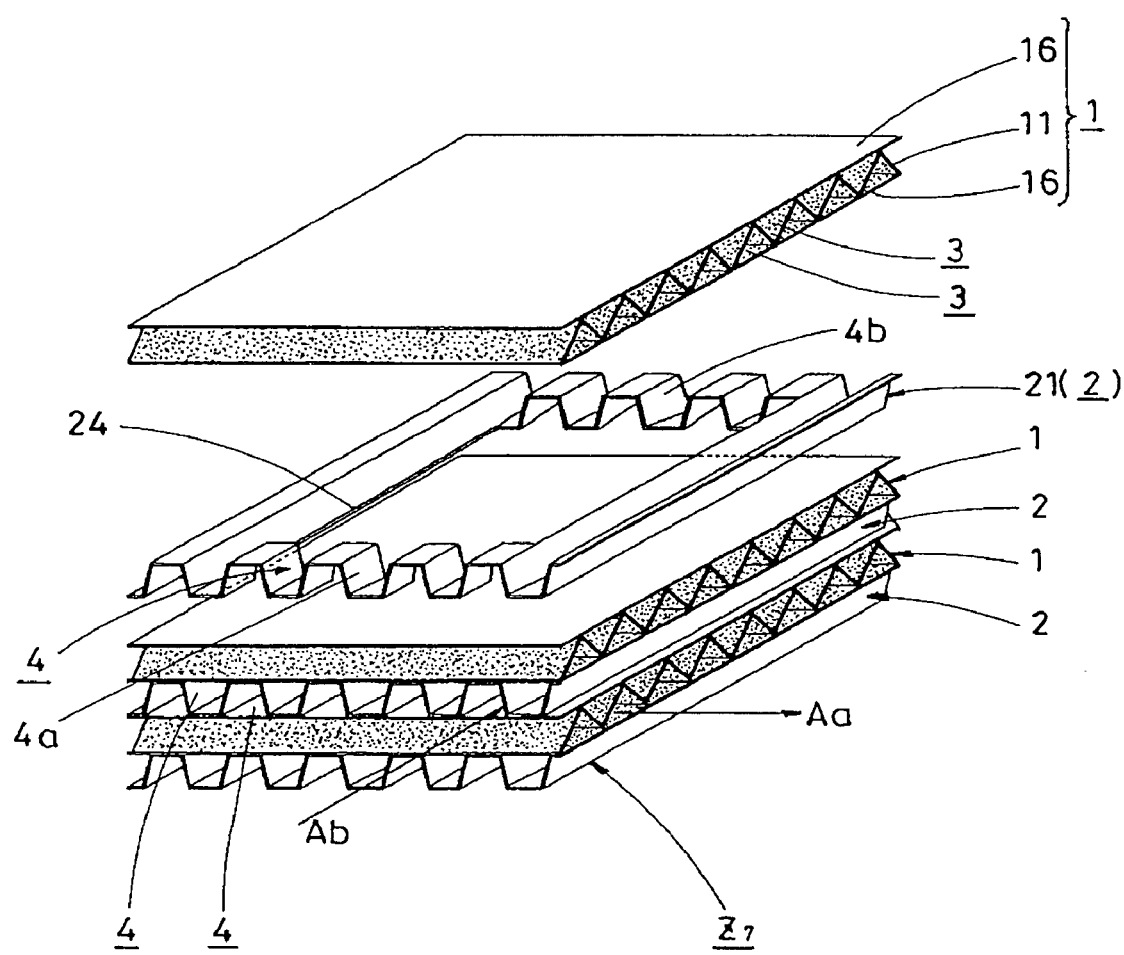
FIG. 14 is a perspective view showing in an exploded manner a dehumidification unit according to a seventh embodiment of the present invention.
Figure 15:
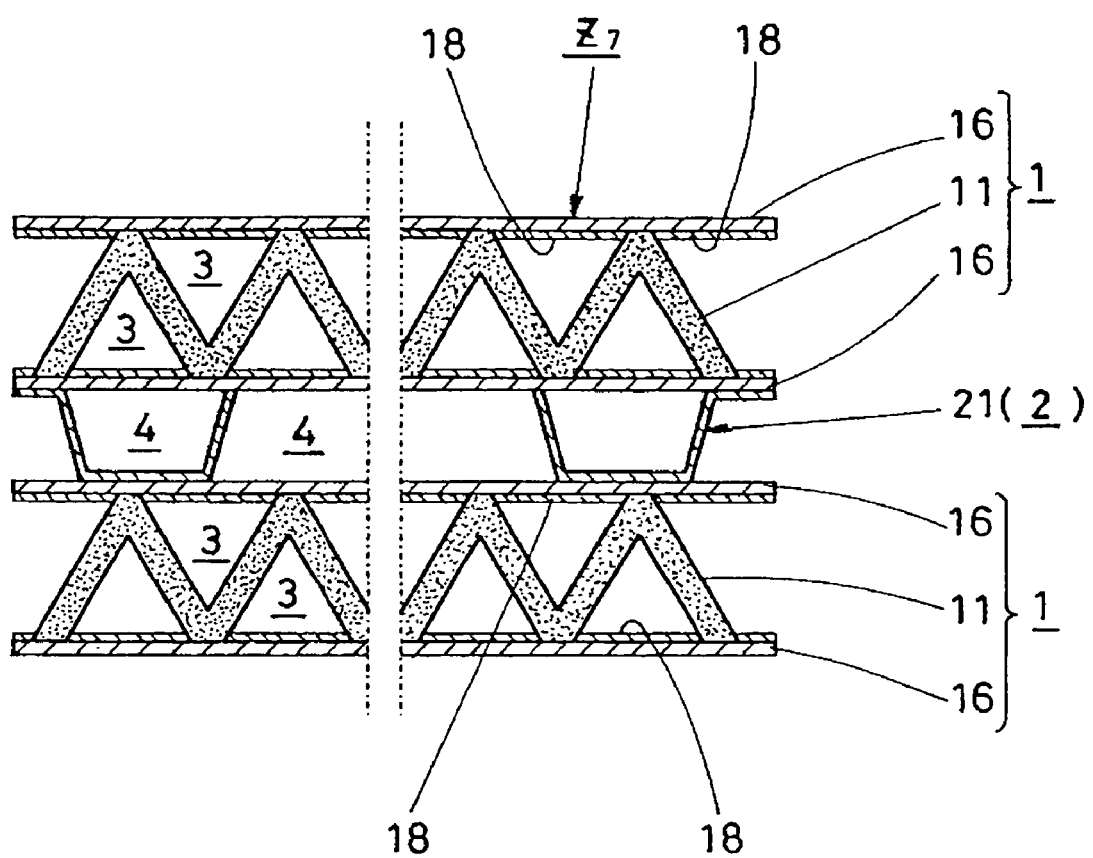
FIG. 15 is a longitudinal sectional view showing in an enlarged manner principal parts of the dehumidification unit shown in FIG. 14.

Referring to FIGS. 14 and 15, there is illustrated a dehumidification unit $Z_7$ formed in accordance with a seventh embodiment of the present invention. The dehumidification unit $Z_7$ is a result of the embodying of inventions as set forth in claim 1 and claim 3. The dehumidification unit $Z_7$ is configured basically the same as the dehumidification unit $Z_5$ of the fifth embodiment, with the exception of the way the adsorption element 1 is constructed.

In the dehumidification unit $Z_5$ of the fifth embodiment, the adsorption element 1, made up of three component members (i.e., an air ventilation passage forming member 11 formed from a bending plate member of fiber paper and a pair of side-plate members 12, 12 which are flat plate bodies of fiber paper and which are joined to one side and to the other side of the air ventilation passage forming member 11, respectively), is shaped like a double-sided cardboard, and each side-plate member 12 is provided, on its exterior surface, with a respective separation sheet layer 14. Unlike the dehumidification unit $Z_5$, in the dehumidification unit $Z_7$ of the present embodiment the adsorption element 1 is made up of an air ventilation passage forming member 11 formed from a bending plate member of fiber paper on which an adsorbent is supported, and a pair of side-plate members 16, 16 which are joined to one side and to the other side of the air ventilation passage forming member 11, respectively and which are formed from a sheet metal of aluminum etcetera or from a sheet resin, and each of the side-plate members 16, 16 directly supports on its interior surface an adsorbent as an adsorbent layer 18.

In the dehumidification unit $Z_7$ provided with the adsorption element 1 of such configuration, the side-plate members 16, 16 each directly support thereon an adsorbent. As a result of such arrangement, the distance between the adsorbent thus supported and the second air ventilation passage 4 on the side of the cooling element 2 becomes shorter, when compared with the case where the adsorbent is supported on the side-plate member 12 made of fiber paper, as in the dehumidification unit $Z_5$ of the fifth embodiment. Furthermore, especially when the side-plate member 16 is formed from a sheet metal, there is produced a synergistic effect that the efficiency of transferring heat of adsorption generated in the adsorbent on the side of the adsorption element 1 towards the cooling element 1 is improved because such a sheet metal has a high heat transfer rate, and further improvement in the dehumidification capability of the dehumidification unit $Z_7$ is expected.

Since the remaining arrangements other than the above and operation/working effects based thereon are the same as the dehumidification units $Z_4$ and $Z_5$ according to the fourth and fifth embodiments, their respective descriptions are omitted here by using the corresponding explanations made in the fourth and fifth embodiments.

VIII. Embodiment 8

Figure 16:
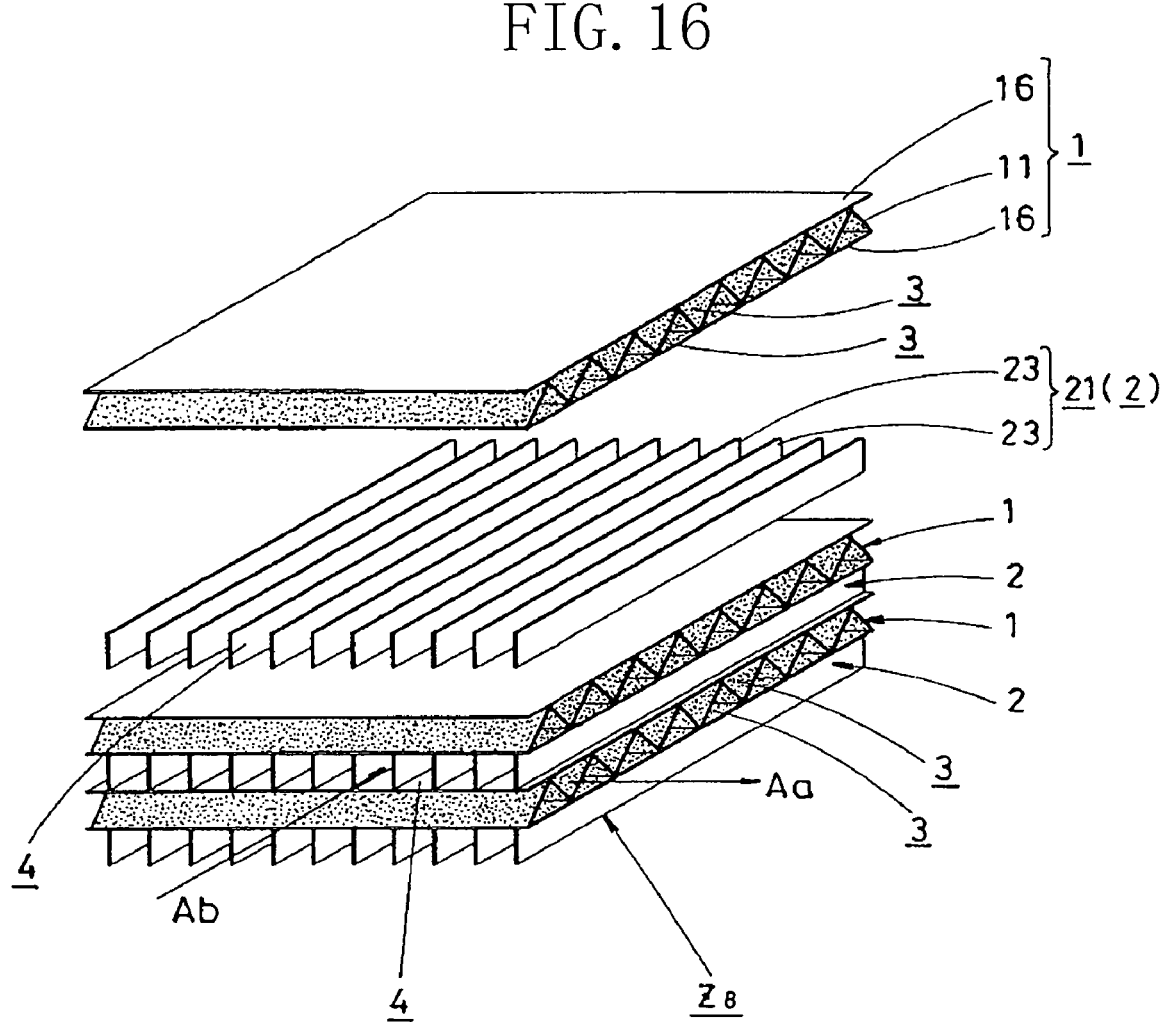
FIG. 16 is a perspective view showing in an exploded manner a dehumidification unit according to an eighth embodiment of the present invention.
Figure 17:
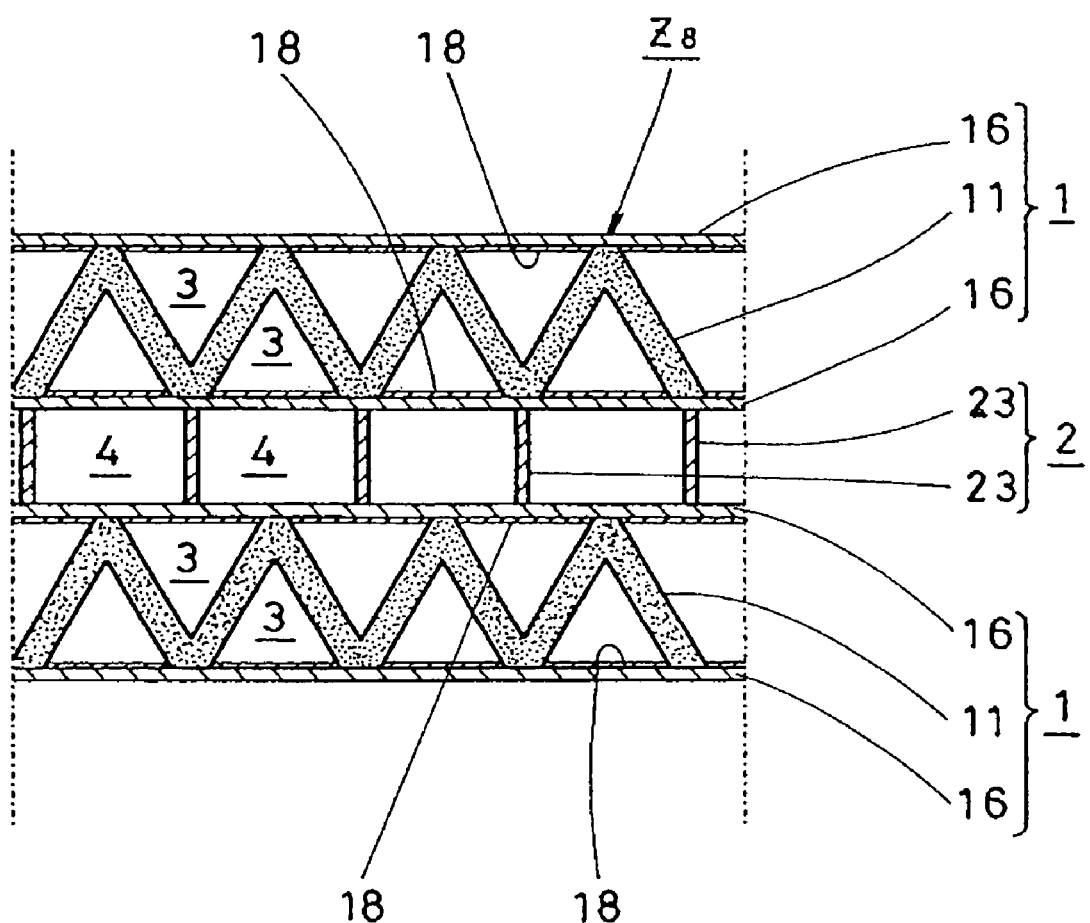
FIG. 17 is a longitudinal sectional view showing in an enlarged manner principal parts of the dehumidification unit shown in FIG. 16.
Figure 18:
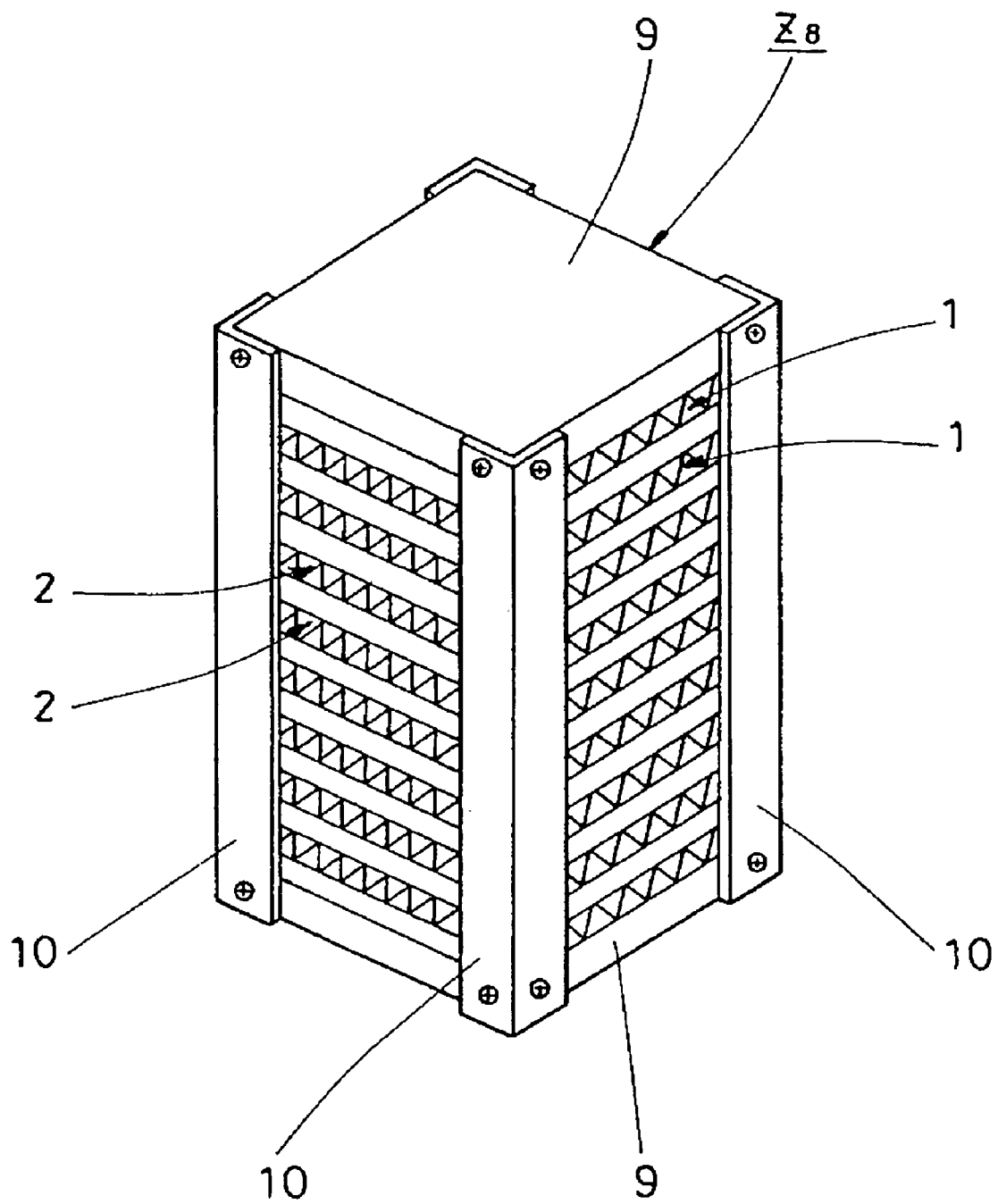
FIG. 18 is an outline perspective view of the dehumidification unit shown in FIG. 16.

Referring to FIGS. 16-18, there is illustrated a dehumidification unit $Z_5$ formed in accordance with an eighth embodiment of the present invention. The dehumidification unit $Z_8$ is configured basically the same as the dehumidification unit $Z_6$ of the sixth embodiment, with the exception of the way the cooling element 2 is constructed.

In the dehumidification unit $Z_6$ of the sixth embodiment, the cooling element 2 is formed from the bending plate member 21 bent into a trapezoidal shape, and the second air ventilation passages 4, 4, ... defined in the cooling element 2 have a trapezoidal cross-sectional shape (i.e., an approximately rectangular cross-sectional shape), thereby to reduce the pressure loss of the cooling air (Ab). Unlike the dehumidification unit $Z_6$, in the dehumidification unit $Z_8$ of the present embodiment the cooling element 2 is formed from an air ventilation passage forming member 21 made up of a plurality of band plate-like partition walls members 23, 23, ... vertically arranged in parallel with each other at predetermined intervals and the second air ventilation passage 4 formed between each partition wall member 23 has a rectangular cross-sectional shape, thereby to reduce the pressure loss of the cooling air (Ab).

In the dehumidification unit $Z_8$ provided with the cooling element 2 of such configuration, the cooling element 2 is formed from the air ventilation passage forming member 21 made up of the partition wall members 23, 23, ... arranged at predetermined intervals. As a result of such arrangement, further weight savings and cost savings are provided in comparison, for example, with the case where the air ventilation passage forming member 21 is formed from a bending plate member.

Since the remaining arrangements other than the above and operation/working effects based thereon are the same as the dehumidification units $Z_4$ and $Z_6$ according to the fourth and sixth embodiments, their respective descriptions are omitted here by using the corresponding explanations made in the fourth and sixth embodiments.

IX. Embodiment 9

Figure 19:
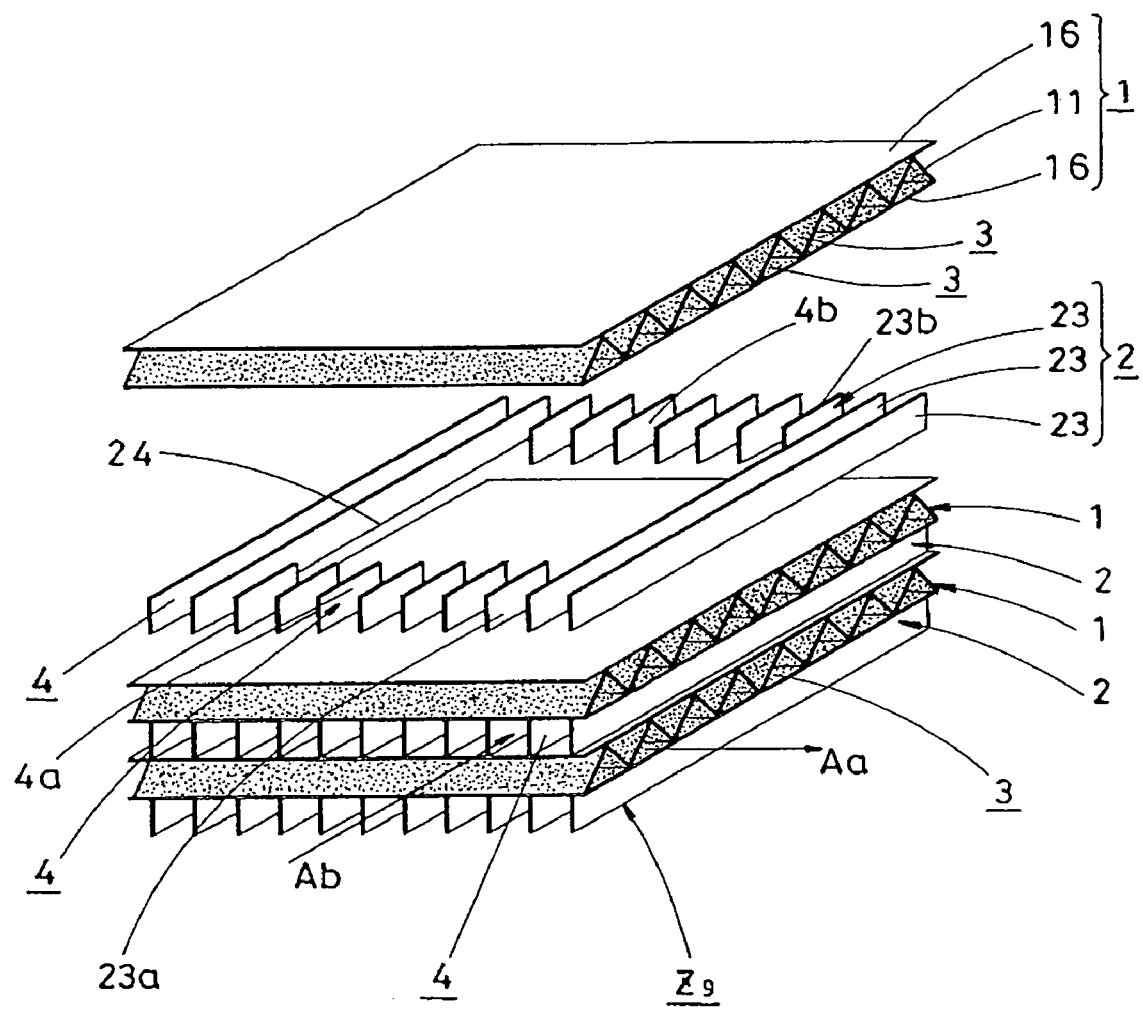
FIG. 19 is a perspective view showing in an exploded manner a dehumidification unit according to a ninth embodiment of the present invention.
Figure 20:
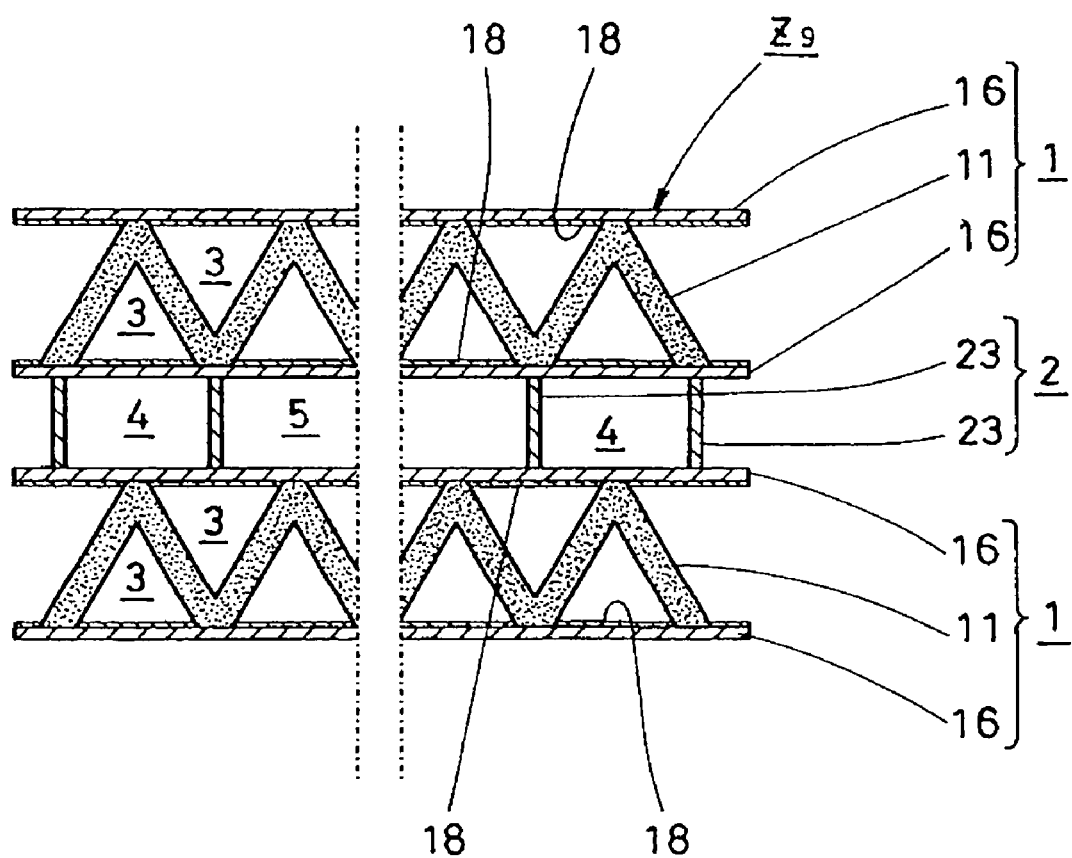
FIG. 20 is a longitudinal sectional view showing in an enlarged manner principal parts of the dehumidification unit shown in FIG. 19.

Referring to FIGS. 19 and 20, there is illustrated a dehumidification unit $Z_9$ formed in accordance with a ninth embodiment of the present invention. The dehumidification unit $Z_9$ is configured basically the same as the dehumidification unit $Z_8$ of the eighth embodiment, with the exception of the way the cooling element 2 is constructed.

In the dehumidification unit $Z_8$ of the eighth embodiment, the cooling element 2 is formed from the air ventilation passage forming member 21 made up of the band plate-like partition wall members 23, 23, ... arranged vertically in parallel with each other at predetermined intervals, and the second air ventilation passage 4 formed between each partition wall member 23 has a rectangular cross-sectional shape, thereby to reduce the pressure loss of the cooling air (Ab). Unlike the dehumidification unit $Z_8$, in the dehumidification unit $Z_9$ of the present embodiment, two partition wall members 23 and 23 of all the partition wall members 23, 23, ... that are situated at both side ends of the dehumidification unit $Z_9$ are longer-size continuous members extending the full length of the adsorption element 1. On the other hand, the rest of the partition wall members 23 are first shorter-size members 23a and second shorter-size members 23b. The first members 23a are arranged on one end side of the second air ventilation passages 4, 4, ... with respect to the passage direction, and the second members 23b are arranged on the other end side so that they are kept at a distance from each other. Rectangular passages defined between the first members 23a, 23a, ... serve as the entry portions 4a, 4a, ... of the second air ventilation passages 4, and rectangular passages defined between the second members 23b, 23b, ... serve as the exit portions 4b, 4b, ... of the second air ventilation passages 4. As the result of this, a rectangular space facing the entry portions 4a, 4a, ... and the exit portions 4b, 4b, ..., i.e., the opening 24, is defined between the first members 23a, 23a, and the second members 23b, 23b, ....

In the dehumidification unit $Z_9$ provided with the adsorption and cooling elements 1 and 2 as formed above:

(a) In order to reduce the resistance against the flow of the cooling air (Ab), it is arranged such that the second air ventilation passages 4, 4, ... of the cooling element 2 have a rectangular cross-sectional shape capable of offering a low level of flow resistance and the length of the second air ventilation passages 4, 4, ... is made shorter by an amount corresponding to the formation of the opening 24. As a result, the pressure loss of the cooling air (Ab) in the cooling element 2 is reduced to a further extent; and (b) The opening 24 is formed in the cooling element 2, thereby to improve the efficiency of heat transfer between the cooling air (Ab) flowing in the empty space 5 formed by the opening 24 and the adsorption element 1 with which the cooling air (Ab) is brought into contact.

As a synergistic effect of (a) and (b), further improvement in the dehumidification capability of the dehumidification unit $Z_9$ is expected.

Since the remaining arrangements of the present embodiment other than the above and operation/working effects based thereon are the same as the dehumidification units $Z_4$, $Z_6$, and $Z_8$ according to the fourth, sixth, and eighth embodiments, their respective descriptions are omitted here by using the corresponding explanations made in the fourth, sixth, and eighth embodiments.

X. Embodiment 10

Figure 21:
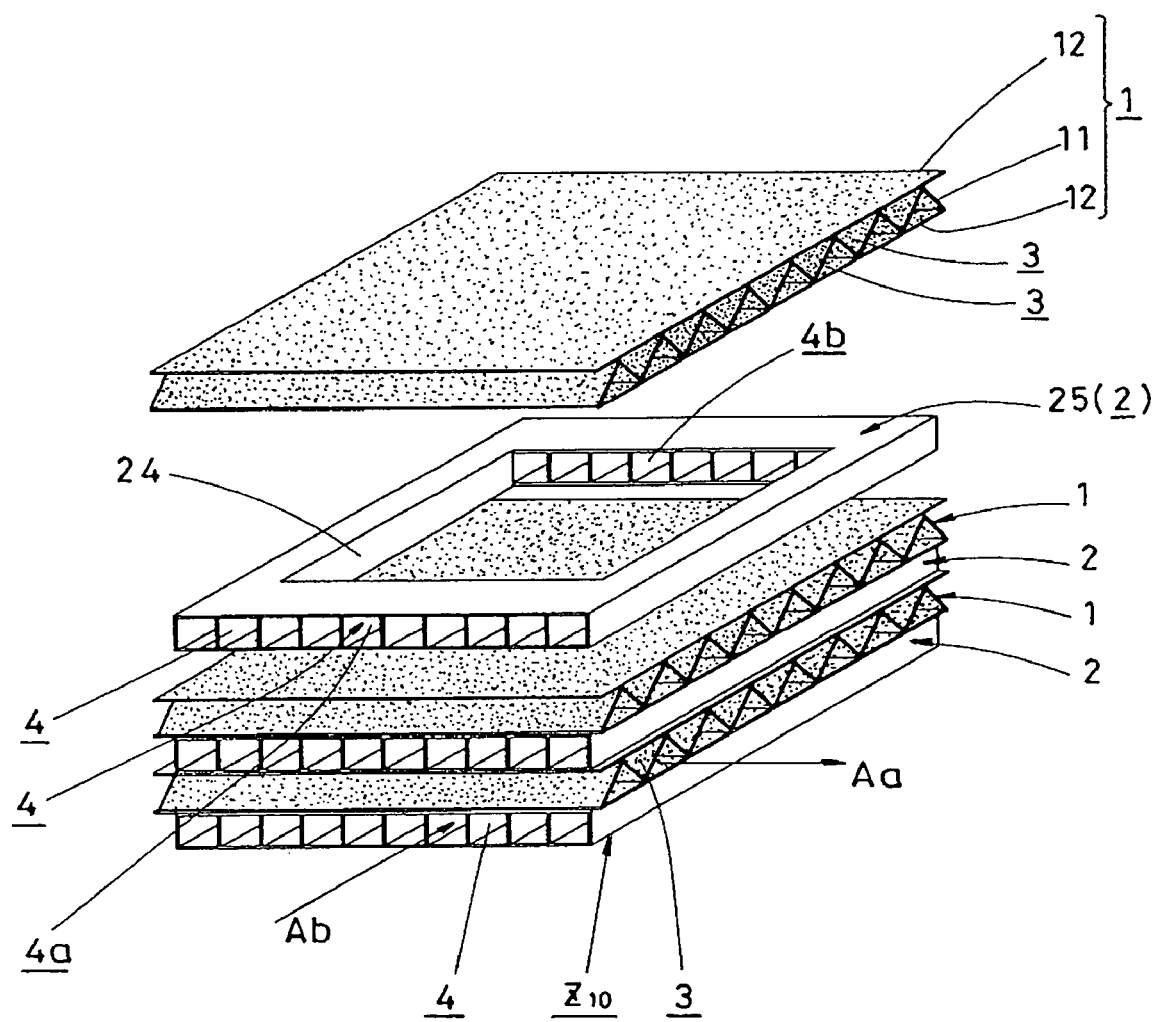
FIG. 21 is a perspective view showing in an exploded manner a dehumidification unit according to a tenth embodiment of the present invention.
Figure 22:
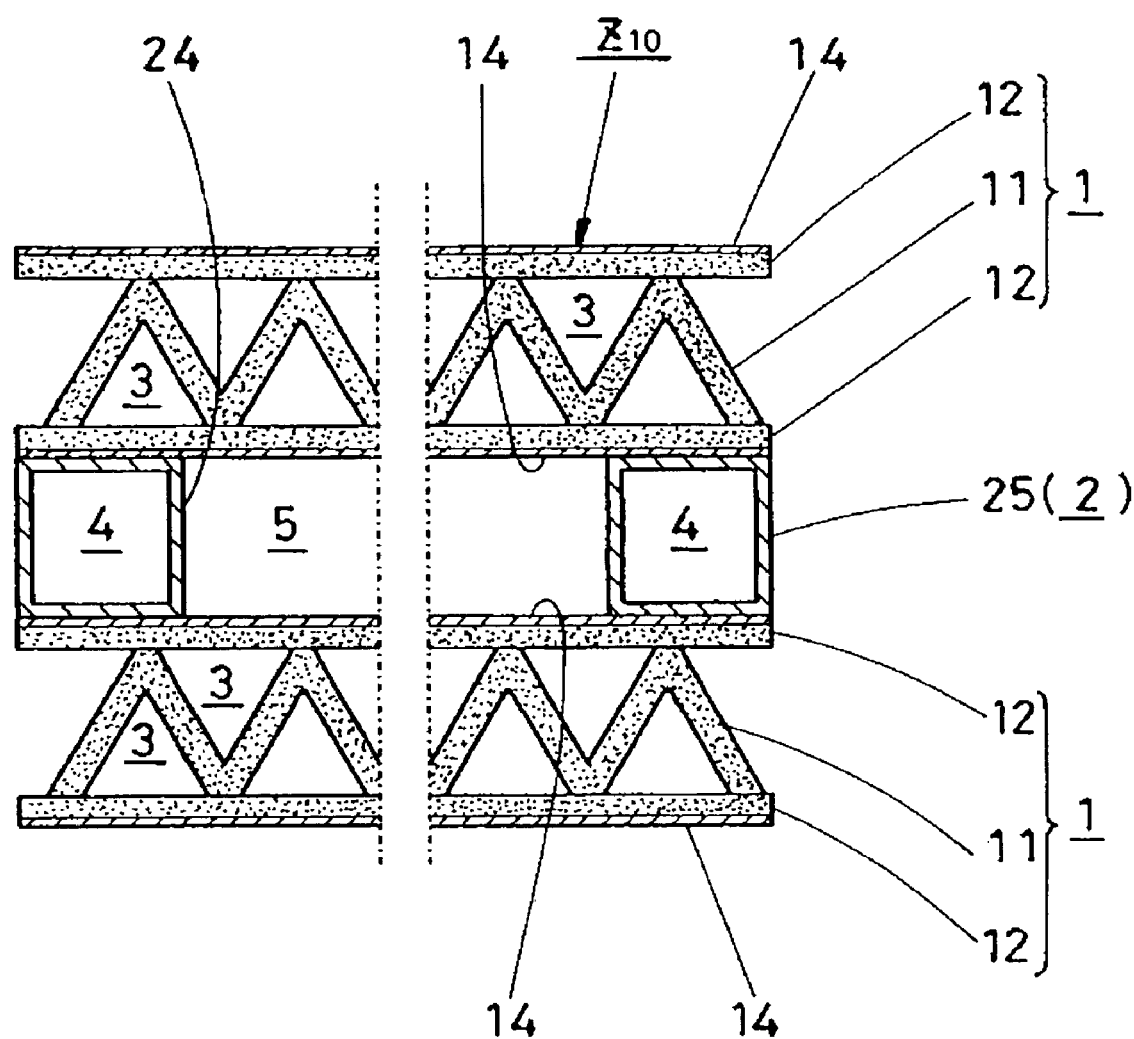
FIG. 22 is a longitudinal sectional view showing in an enlarged manner principal parts of the dehumidification unit shown in FIG. 21.

Referring to FIGS. 21 and 22, there is illustrated a dehumidification unit $Z_{10}$ formed in accordance with a tenth embodiment of the present invention. The dehumidification unit $Z_{10}$ is configured basically the same as the dehumidification unit $Z_1$ of the first embodiment, with the exception of the way the cooling element 2 is constructed.

In the dehumidification unit $Z_1$ of the first embodiment, the cooling element 2 is made up of an air ventilation passage forming member 21 formed from a bending plate member and a side-plate member 22 formed from a flat plate body, and is shaped like a single-sided cardboard. Unlike the dehumidification unit $Z_1$, the cooling element 2 of the dehumidification unit $Z_{10}$ is formed only from a passage structure body 25 which will be described below.

The passage structure body 25 is formed from a frame-like thick plate. More specifically, the passage structure body 25 is constructed by forming, by punching or other technique, a rectangular opening through a planewise central portion of a single piece body in the form of a thick plate and in which a large number of rows of second air ventilation passages 4, 4, ... having a rectangular cross-sectional shape are arranged laterally. And, in the passage structure body 25, by the formation of the opening 24, two of the second air ventilation passages 4, 4, ..., located respectively at one end and at the other end in relation to the direction in which the rows of the second air ventilation passages 4, 4, ... are arranged, are continuous passages extending the full length of the cooling element 2. On the other hand, as the result of the formation of the opening 24, the rest (i.e., the remaining second air ventilation passages 4 located inside relative to the row arrangement direction) are in such a form that only entry portions 4a, 4a, ... located on one end side of the opening 24 and exit portions 4b, 4b, ... located on the other end side remain, wherein both the entry portions 4a, 4a, ... and the exit portions 4b, 4b, ... face the opening 24.

In the dehumidification unit $Z_{10}$ comprising alternate laminations of the cooling element 2 and the adsorption element 1 which are formed in accordance with the present embodiment:

(a) The pressure loss of the cooling air (Ab) flowing through the second air ventilation passages 4, 4, ... of the cooling element 2 becomes smaller, because the second air ventilation passages 4, 4, ... have a rectangular cross-sectional shape capable of offering a low level of flow resistance, whereby the flow rate of the cooling air (Ab) becomes higher by an amount corresponding to the reduction in pressure loss. The heat-liberation efficiency of heat of adsorption is improved;

(b) The opening 24 is formed in the cooling element 2, thereby reducing the length of the second air ventilation passages 4 associated with the opening 24. Consequently, the flow resistance of these second air ventilation passages 4 becomes lower in comparison with the case where they are continuous passages extending the full length of the cooling element 2. As a result, the pressure loss of the cooling air (Ab) flowing through the second air ventilation passages 4 is lowered, and the flow rate of the cooling air (Ab) is increased by an amount corresponding to the reduction in pressure loss of the cooling air (Ab). The heat-liberation efficiency of heat of adsorption on the side of the adsorption element 1 is improved; and (c) The efficiency of heat transfer between the cooling air (Ab) flowing in the inside of the empty space 5 formed by the opening 24 defined in the cooling element 2 and the adsorption element 1 with which the cooling air (Ab) is brought into contact, is improved.

As a synergistic effect of the above (a)-(c), further improvement in the dehumidification capability of the dehumidification unit $Z_{10}$ is expected.

Since the remaining arrangements other then the above and operation/working effects based thereon are the same as the dehumidification unit $Z_1$ according to the first embodiment, their respective descriptions are omitted here by using the corresponding explanations made in the first embodiment.

XI. Embodiment 11

Figure 23:
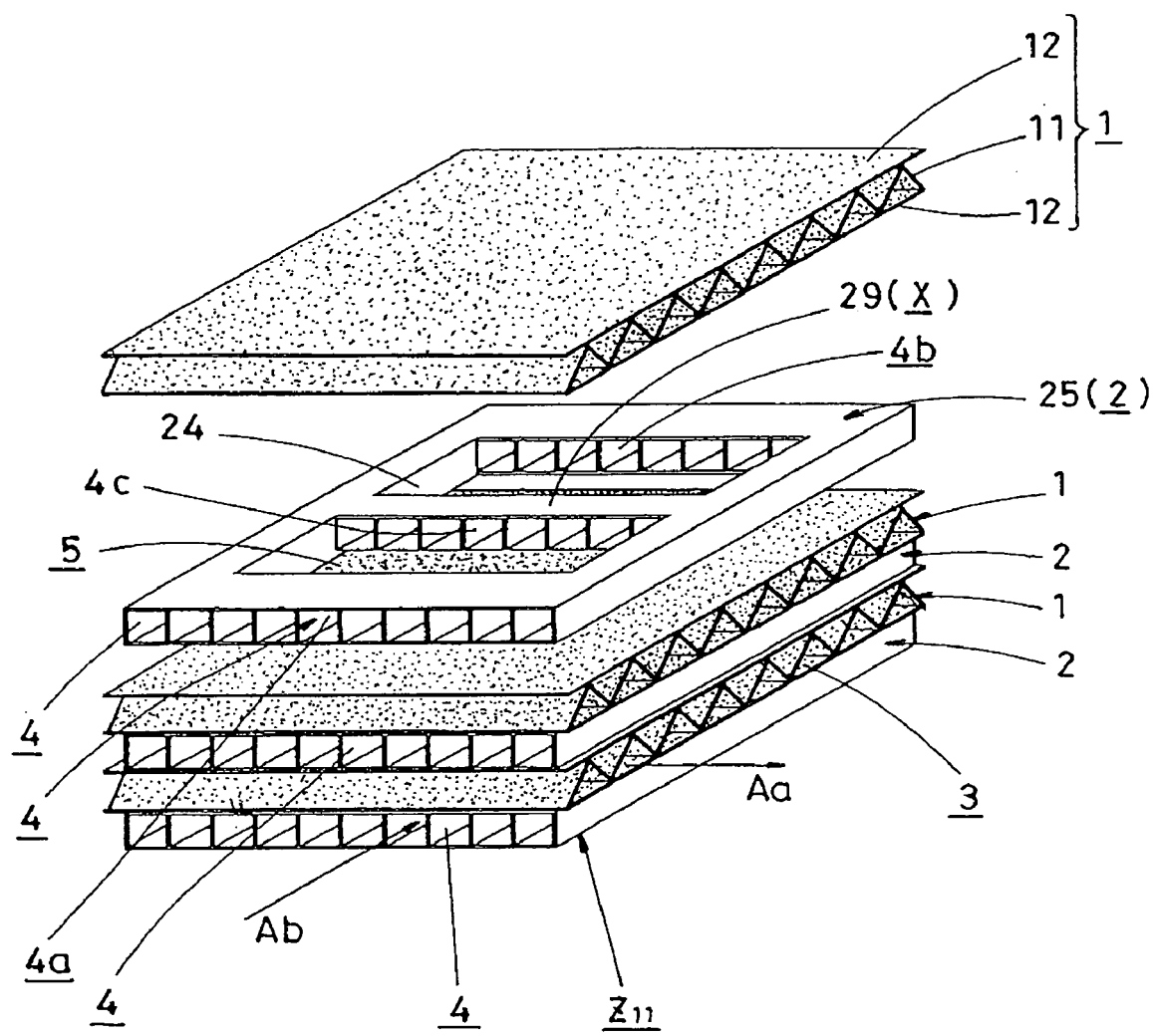
FIG. 23 is a perspective view showing in an exploded manner a dehumidification unit according to an eleventh embodiment of the present invention.

Referring to FIG. 23, there is illustrated a dehumidification unit $Z_{11}$ formed in accordance with an eleventh embodiment of the present invention. The dehumidification unit $Z_{11}$ is configured basically the same as the dehumidification unit $Z_{10}$ of the tenth embodiment, with the exception that they differ from each other partially in the configuration of the cooling element 2.

In the dehumidification unit $Z_{10}$ of the tenth embodiment, the cooling element 2 is formed from a passage structure body 25 shaped like a thick plate frame in which a large number of second air ventilation passages 4, 4, ... are arranged in rows and whose planewise central portion is provided with an opening 24. Unlike the dehumidification unit $Z_{10}$, the cooling element 2 of the dehumidification unit $Z_{11}$ of the present embodiment is formed from a passage structure body 25 which is provided, at its passagewise, approximately central portion within the opening 24, with an intermediate passage member 29 (which corresponds to air stream regulating means X as set forth in the fifth invention of the present application) which is so disposed as to divide the opening 24 into two portions (i.e., a front portion and a rear portion), and the intermediate passage member 29 is provided with intermediate passages 4c, 4c, ... corresponding to the entry and exit portions 4a, 4a, ... and 4b, 4b, ... of the second air ventilation passages 4, 4, ....

In the dehumidification unit $Z_{11}$ provided with the cooling element 2 of such construction, for example when the cooling air (Ab) flows, through the entry portions 4a, 4a, ... of the second air ventilation passages 4, 4, ..., into the opening 24, there is the possibility that a flow deviation occurs because the cooling air (Ab) is allowed to freely flow within the opening 24 if the opening 24 is an undivided single volume portion. This can be thought to be adversely affecting the adsorptive action of the cooling air (Ab) in the region of the opening 24; however, because of the above-described arrangement of the present embodiment that the intermediate passage member 29 is disposed inside the opening 24, the cooling air (Ab) which has entered the inside of the opening 24 is flow-rectified by the intermediate passage member 29 at the intermediate portion relative to the flow direction thereof. The flow deviation of the cooling air (Ab) is held as low as possible. As the result of this, the heat-liberation efficiency of heat of adsorption by the cooling element 2 is improved, thereby improving the dehumidification capability of the dehumidification unit $Z_{11}$ to a further extent.

Since the remaining arrangements other than the above and their operation/working effects of the present embodiment are the same as the dehumidification units $Z_{11}$ and $Z_{10}$ according to the first and tenth embodiments, their respective descriptions are omitted here by using the corresponding explanations made in the first and tenth embodiments.

XII. Embodiment 12

Figure 24:
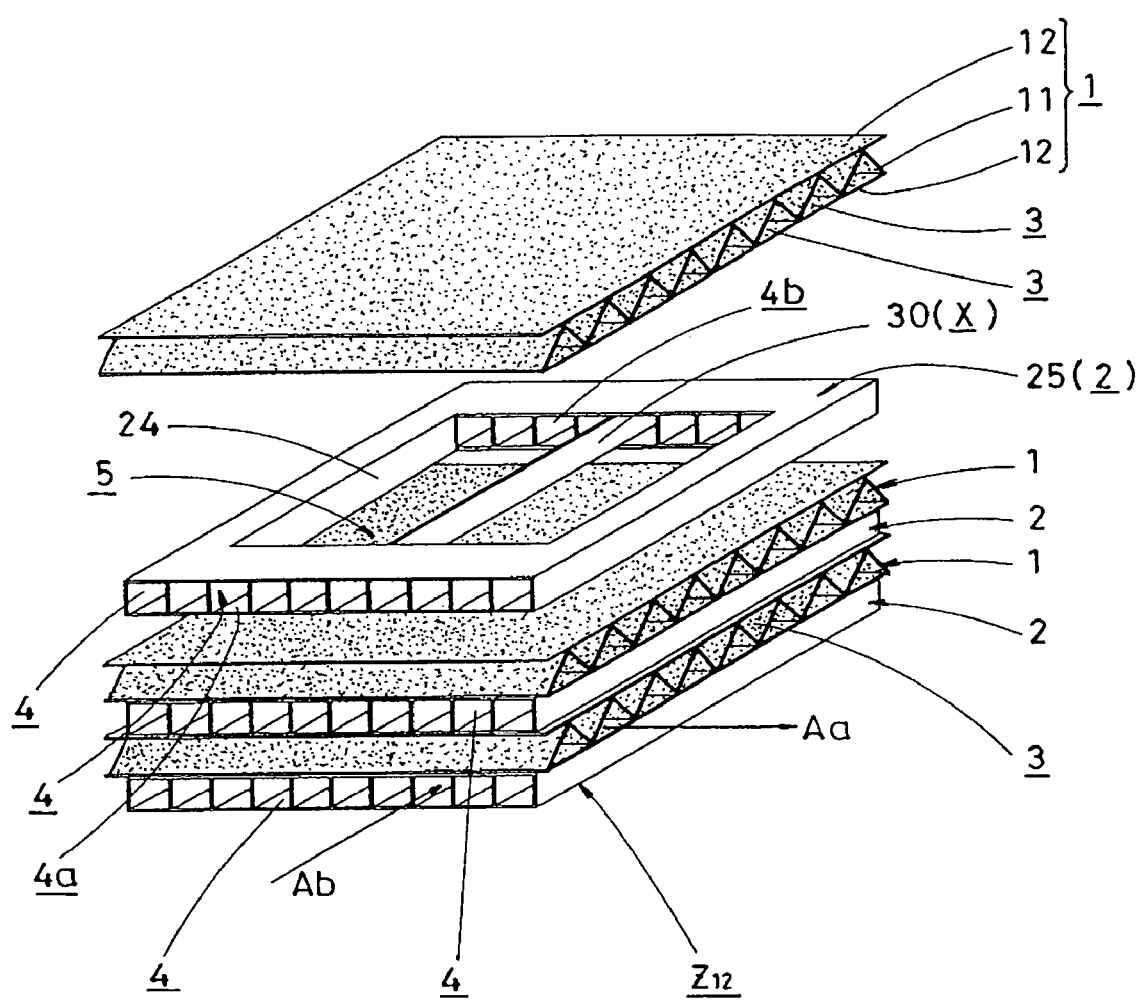
FIG. 24 is a perspective view showing in an exploded manner a dehumidification unit according to a twelfth embodiment of the present invention.

Referring to FIG. 24, there is illustrated a dehumidification unit $Z_{12}$ formed in accordance with a twelfth embodiment of the present invention. In the dehumidification unit $Z_{11}$ according to the eleventh embodiment, it is arranged such that the intermediate passage member 29 is disposed in a passagewise intermediate area of the opening 24 so as to traverse it, and the cooling air (Ab) flowing in the side of the opening 24 is flow-rectified midway relative to the flow direction by the intermediate passage member 29, thereby to inhibit the flow deviating of the cooling air (Ab) in the inside of the opening 24. Unlike the dehumidification unit $Z_{11}$, in the dehumidification unit $Z_{12}$ of the present embodiment a partition wall member 30 (which corresponds to "air stream regulating means X") is so disposed as to divide the opening 24 side to side into two portions, i.e., a right side portion and a left side portion, whereby the flow of the cooling air (Ab) flowing into the opening 24 is split right and left. Consequently, this accomplishes not only improvement in the heat-liberation efficiency of heat of adsorption by the cooling air (Ab) in the area of the opening 24 but also further improvement in the dehumidification capability of the dehumidification unit $Z_{12}$.

Since the remaining arrangements other than the above and their operation/working effects of the present embodiment are the same as the dehumidification units $Z_1$, $Z_{10}$, and $Z_{11}$ according to the first, tenth, and eleventh embodiments, their respective descriptions are omitted here by using the corresponding explanations made in the first, tenth, and eleventh embodiments.

XIII. Embodiment 13

Figure 25:
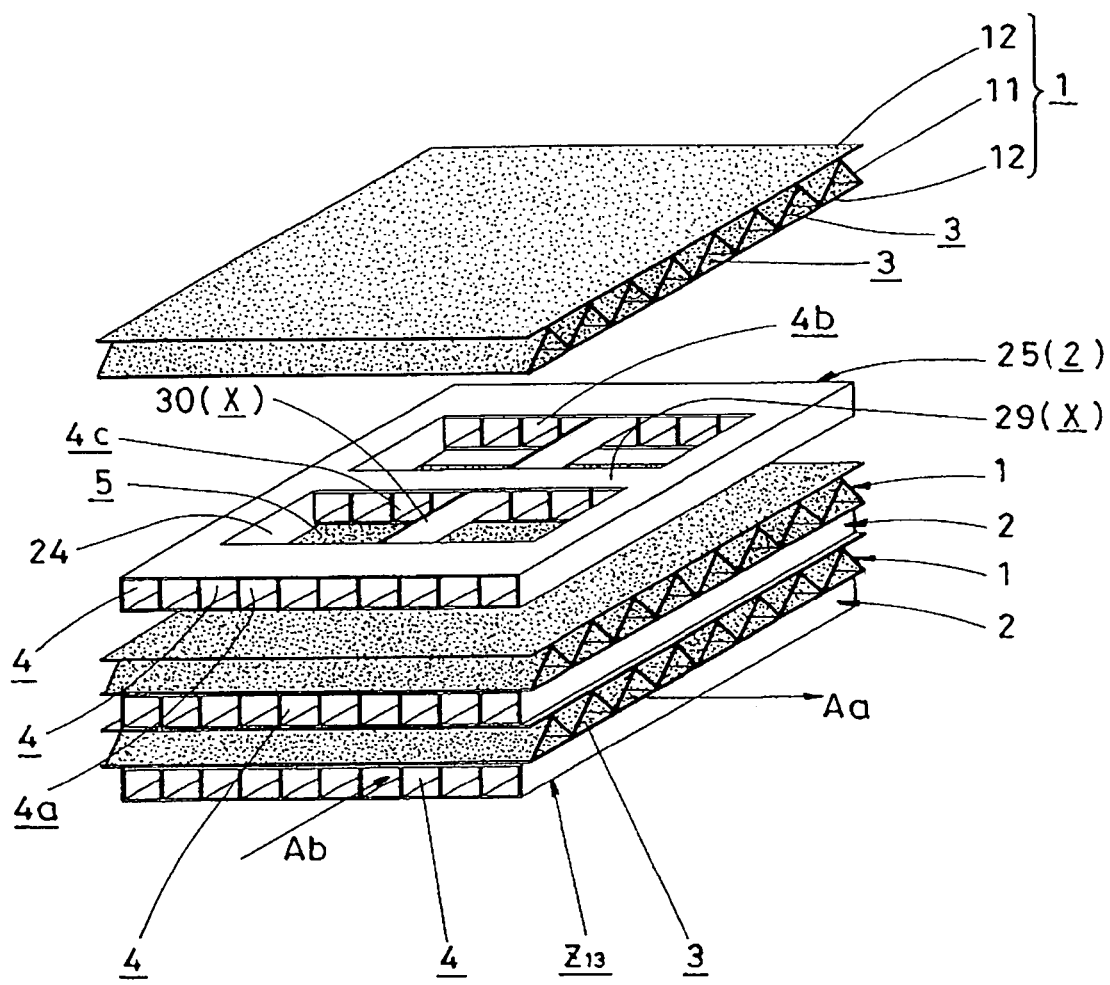
FIG. 25 is a perspective view showing in an exploded manner a dehumidification unit according to a thirteenth embodiment of the present invention.

Referring to FIG. 25, there is illustrated a dehumidification unit $Z_{13}$ formed in accordance with a thirteenth embodiment of the present invention. The dehumidification unit $Z_{13}$ has a configuration as a result of a combination of the dehumidification unit $Z_{11}$ of the eleventh embodiment and the dehumidification unit $Z_{12}$ of the twelfth embodiment.

More specifically, the intermediate passage member 29 is provided in the opening 24 in the dehumidification unit $Z_{11}$ of the eleventh embodiment and the partition wall member 30 is provided in the opening 24 in the dehumidification unit $Z_{12}$ of the twelfth embodiment, for the purpose of inhibiting the flow deviation of the cooling air (Ab) within the opening 24. Unlike the dehumidification units $Z_{11}$ and $Z_{12}$, in the dehumidification unit $Z_{13}$ of the present embodiment, both the intermediate passage member 29 and the partition wall member 30 are provided within the opening 24.

In the dehumidification unit $Z_{13}$ of the present embodiment provided with the cooling element 2 of such construction, the cooling air (Ab) entering the inside of the opening 24 undergoes flow rectifying actions by the intermediate passage member 29 and flow dividing actions by the partition wall member 30. This further ensures that the flow deviation of the cooling air (Ab) within the opening 24 is inhibited from occurring. As a result, the dehumidification unit $Z_{13}$ demonstrates its dehumidification capability at still higher levels.

Since the remaining arrangements other than the above and operation/working effects based thereon are the same as the dehumidification units $Z_1$, $Z_{10}$, $Z_{11}$, and $Z_{12}$ according to the first, tenth, eleventh, and twelfth embodiments, their respective descriptions are omitted here by using the corresponding explanations made in the first, tenth, eleventh, and twelfth embodiments.

XIV. Embodiment 14

Figure 26:
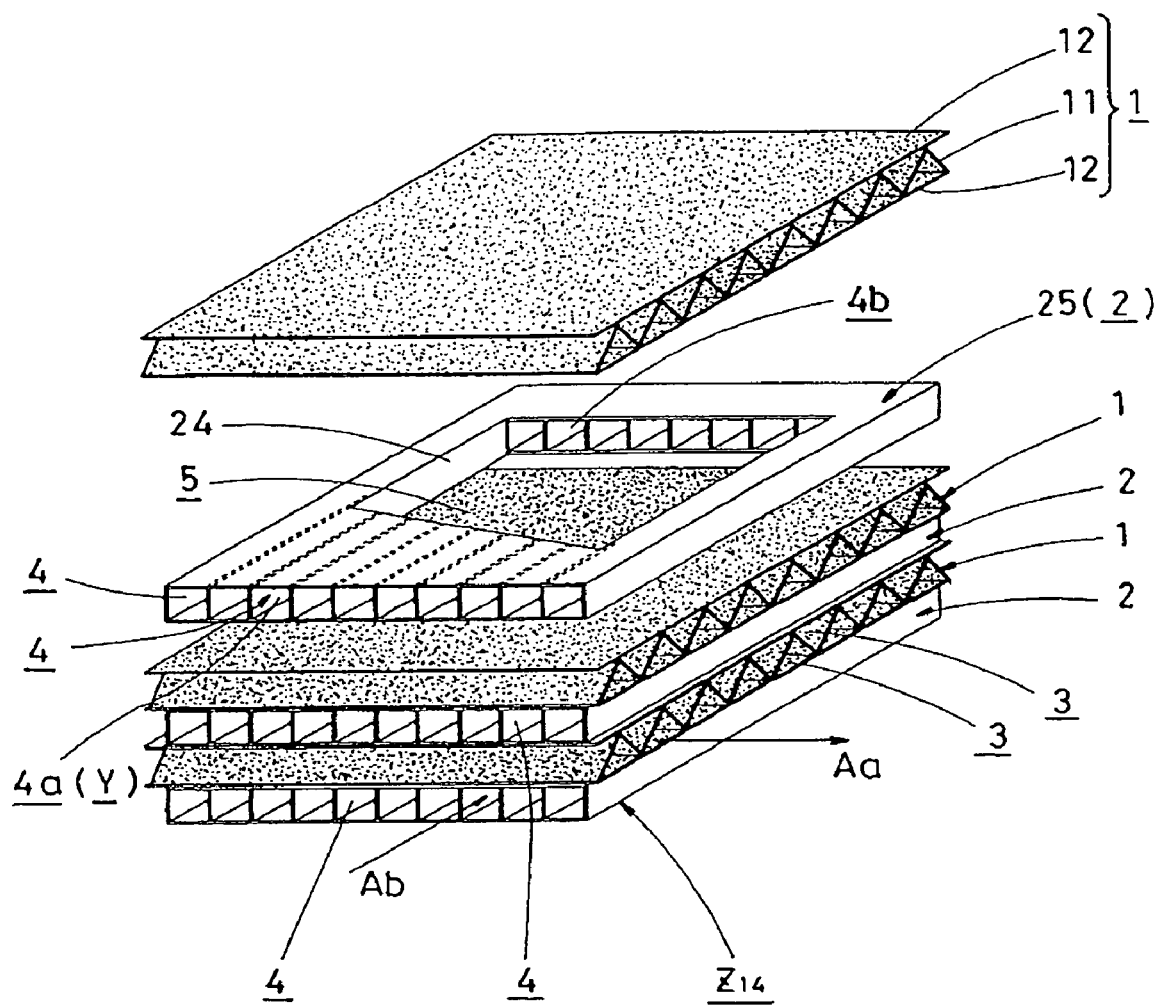
FIG. 26 is a perspective view showing in an exploded manner a dehumidification unit according to a fourteenth embodiment of the present invention.

Referring to FIG. 26, there is illustrated a dehumidification unit $Z_{14}$ formed in accordance with a fourteenth embodiment of the present invention. The dehumidification unit $Z_{14}$ is a developed example of the dehumidification unit $Z_{10}$ of the tenth embodiment.

More specifically, in the dehumidification unit $Z_{10}$ of the tenth embodiment, the opening 24 which is defined in a planewise central portion of the cooling element 2 is shaped like a rectangle corresponding to its outer shape (in other words all the entry portions 4a, 4a, . . . situated on one end side of the opening 24 have the same length). Unlike the dehumidification unit $Z_{10}$ of the tenth embodiment, in the dehumidification unit $Z_{14}$ of the present embodiment the opening 24 is not shaped like a rectangle but is formed into an approximately trapezoidal shape so that one side of the trapezoid on the side of the entry portions 4a, 4a, . . . slopes so as to deviate outwardly from the upstream side towards the downstream side relative to the passage direction of the first air ventilation passages 3, 3, . . . of the adsorption element 1. To sum up, the shape of the opening 24 is set such that the passage length of the entry portions 4a, 4a, . . . situated on one end side of the opening 24 becomes gradually shorter with approach towards the downstream side from the upstream side of the first air ventilation passages 3, 3, . . . (stated another way, the passage length becomes shorter the nearer to the downstream side of the first air ventilation passages 3, 3, . . . ). In the present embodiment, the entry portions 4a, 4a, . . . having different passage lengths together constitute a "flow rate regulating means Y" as set forth in the sixth invention of the present application.

When the length of the entry portions 4a, 4a, . . . is set as described above, the entry portions 4a, 4a, . . . have progressively lower passage resistances the nearer to the downstream side of the first air ventilation passages 3, 3, . . . . The nearer an entry portion 4a is to the downstream side of the first air ventilation passages 3, 3, . . . , the lower is its passage resistance. In other words, the entry portions 4a, 4a, . . . have progressively greater flow rates of the cooling air (Ab) flowing therethrough the nearer to the downstream side of the first air ventilation passages 3, 3, . . . . Accordingly, the distribution of flow rates of the cooling air (Ab) within the opening 24 becomes greater the nearer to the downstream side of the first air ventilation passages 3, 3, . . . . More specifically, in the dehumidification unit $Z_{14}$ of the present embodiment, the entry portions 4a, 4a, . . . have different passage lengths relative to the passage direction of the first air ventilation passages 3, 3, . . . so that the flow deviation of the cooling air (Ab) is deliberately caused in the opening 24. Because of the flow deviation of the cooling air (Ab), the following effects are provided.

The temperature distribution of heat of adsorption on the side of the adsorption element 1 is observed. The heat of adsorption is high on the upstream side of the first air ventilation passages 3, 3, . . . (i.e., on the inflow side of the to-be-processed air (Aa) to the adsorption element 1) but is low on the downstream side, corresponding to the degree of moisture adsorptive action. Consequently, the cooling air (Ab) evenly flows, through the second air ventilation passages 4, 4, . . . on the side of the cooling element 2 extending in a direction orthogonal to the first air ventilation passages 3, 3, . . . , into the cooling element 2. Then, the cooling air (Ab) freely flows within the opening 24 without receiving any restrictive action. Inevitably heat-exchange is conducted intensively in an area with a wide range of temperature (i.e., a corresponding area to the upstream side of the first air ventilation passages 3, 3, . . . ) and, on the other hand, little or no heat-exchange is conducted in a corresponding area to the downstream side of the first air ventilation passages 3, 3, . . . . As the result of this, the effective heat-exchange region of the opening 24 decreases and there is a corresponding fall in the heat-exchange efficiency. Stated another way, there is a fall in the heat-liberation efficiency of heat of adsorption.

In such a case, if the passage length of the entry portions 4a, 4a, . . . is adjusted so that the entry portions 4a, 4a, . . . have progressively greater flow rates of the cooling air (Ab) the nearer to the downstream side of the first air ventilation passages 3, 3, . . . of the adsorption element 1 (as in the dehumidification unit $Z_{14}$ of the present embodiment), then heat-exchange is conducted possibly throughout the opening 24. The effective heat-exchange region of the opening 24 increases and, as a result, there is a corresponding increase in the heat-exchange efficiency. Improvement in the heat-liberation efficiency of heat of adsorption is accomplished, and further improvement in the dehumidification capability of the dehumidification unit $Z_{14}$ will be expected.

Since the remaining arrangements other than the above and their operation/working effects based thereon are the same as the dehumidification units $Z_1$ and $Z_{10}$ according to the first and tenth embodiments, their respective descriptions are omitted here by using the corresponding explanations made in the first and tenth embodiments.

XV. Embodiment 15

Figure 27:
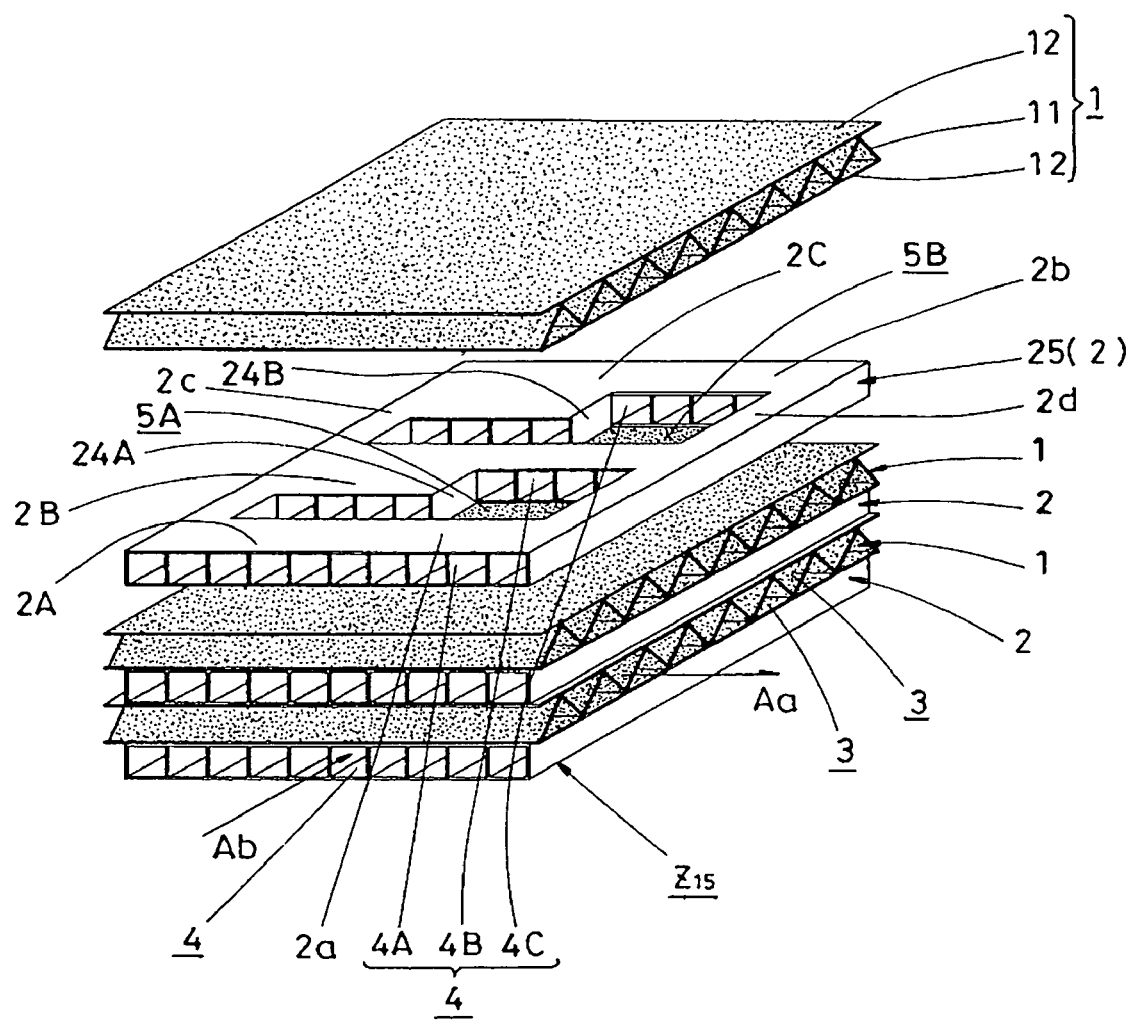
FIG. 27 is a perspective view showing in an exploded manner a dehumidification unit according to a fifteenth embodiment of the present invention.

Referring to FIG. 27, there is illustrated a dehumidification unit $Z_{15}$ formed in accordance with a fifteenth embodiment of the present invention. Like each of the dehumidification units $Z_1$-$Z_{14}$ of the above-described embodiments, the dehumidification unit $Z_{15}$ of the present embodiment is formed by sequentially alternately laminating a plurality of adsorption elements 1, 1, . . . each provided with a large number of first air ventilation passages 3, 3, . . . and a plurality of cooling elements 2, 2, . . . each provided with a large number of second air ventilation passages 4, 4, . . . in a 90-degree plane phase so that the first air ventilation passages 3, 3, . . . are orthogonal to the second air ventilation passages 4, 4, . . . when viewed from above. The dehumidification unit $Z_{15}$ of the present embodiment is such an integrally laminated structure.

The adsorption element 1 of the dehumidification unit $Z_{15}$ according to the fifteenth embodiment is similar in construction to the adsorption element 1 of each of the previously described embodiments. The dehumidification unit $Z_{15}$ is characterized by the construction of the above-described cooling element 2 and by the operation/working effects based thereon. Accordingly, only the construction of the cooling element 2 will be described in detail. The construction of the adsorption element 1 and the basic operation/working effects of the dehumidification unit $Z_{15}$ prepared by a combination of the adsorption element 1 and the cooling element 2 are not described here (see the corresponding descriptions made in the foregoing embodiments).

The cooling element 2 is a thick plate-like passage structure body 25 formed from a single-piece member. The passage structure body 25 is provided with second air ventilation passages 4, 4, . . . which have a rectangular cross sectional shape and which are arranged laterally in a large number of rows. In the present embodiment, an upstream-side opening 24A and a downstream-side opening 24B are formed respectively at a first and a second position of the cooling element 2 by punching or other technique, so that these openings 24A and 24B pass completely through the cooling element 2, wherein the first and second positions are spaced passagewise. By the formation of the openings 24A and 24B, the cooling element 2 has three different passage portions situated in a back-to-forth arrangement in the passage direction, namely an upstream-side passage portion 2A located at a passagewise upstream most area 2a, an intermediate passage portion 2B located at an intermediate area, and a downstream-side passage portion 2C located at a downsreammost area 2b. Consequently, the second air ventilation passages 4, 4, . . . are each made up of three different discontinuous flow paths facing each other across each opening 24A and 24B. More specifically, the second air ventilation passages 4, 4, . . . each comprise a first flow path 4A formed in the upstream-side passage portion 2A, a second flow path 4B formed in the intermediate passage portion 2B, and a third flow path 4C formed in the downstream passage portion 2C.

Additionally, in the dehumidification unit $Z_{15}$ of the present embodiment, the intermediate passage portion 2B and the downstream-side passage portion 2C are each formed so as to have a two-stage stepped plane shape consisting of a narrow portion and a wide portion. More specifically, the passage portions 2B and 2C each have a two-stage stepped shape having a rear end edge and a front end edge. The rear end edge consists of a straight line approximately orthogonal to the passage direction. On the other hand, the front end edge extends linearly. And, in this case, the width dimension of each of the intermediate and downstream-side passage portions 2B and 2C (i.e., the dimension relative to the passage direction) is set such that an area situated nearer to a one side end 2c corresponding to the upstream side of the first air ventilation passages 3, 3, . . . on the adsorption element's 1 side has a greater width dimension and an area situated nearer to a other side end 2d corresponding to the downstream side of the first air ventilation passages 3, 3, . . . has a smaller width dimension, in the laminated state of the cooling element 2 and the adsorption element 1.

Accordingly, in each of the intermediate and downstream-side passage portions 2B and 2C, the passage length of the second flow paths 4B, 4B, . . . and the passage length of the third flow paths 4C, 4C, . . . are set such that flow paths nearer to the one side end 2c of the cooling element 2 are long and, on the other hand, flow paths nearer to the other side end 2d are short. Corresponding to the difference in passage length, the resistance against the passage of the cooling air (Ab) is great for the flow paths situated nearer to the one side end 2c but is small for the flow paths situated nearer to the other side end 2d, in each of the intermediate and downstream-side passage portions 2B and 2C.

The dehumidification unit $Z_{15}$ prepared by a combination of the cooling element 2 of such configuration with the aforesaid adsorption element 1 provides the following operation and working effects. In the dehumidification unit $Z_{15}$, both opening surfaces of each of the openings 24A and 24B of the cooling element 2 are closed by two adsorption elements 1 adjacent to the cooling element 2, thereby defining an upstream-side empty space 5A and a downstream-side empty space 5B. The first flow paths 4A, 4A, . . . of the upstream-side passage portion 2A and the second flow paths 4B, 4B, . . . of the intermediate passage portion 2B face the upstream-side empty space 5A. On the other hand, the second flow paths 4B, 4B, . . . of the intermediate passage portion 2B and the third flow paths 4C, 4C, . . . of the downstream-side passage portion 2C face the downstream-side empty space 5B.

In the dehumidification unit $Z_{15}$ of the present embodiment, the cooling air (Ab) is introduced into the second air ventilation passages 4, 4, . . . of the cooling element 2 from the side of the first flow paths 4A, 4A, . . . . Then, the cooling air (Ab) flows through the upstream-side empty space 5A, through the second flow paths 4B, 4B, . . . , through the downstream-side empty portion 5B, and through the third flow paths 4C, 4C, . . . in that order, thereby cooling the two adsorption elements 1 and 1 adjoining the cooling element 2 for liberation of heat of adsorption generated from the adsorption elements 1 and 1.

In the cooling element 2 of the present embodiment, the openings 24A and 24B are provided. When compared with the case where the openings 24A and 24B are not provided and the second air ventilation passages 4, 4, . . . are continuous passages extending the full length of the cooling element 2, the passage length of the second air ventilation passages 4, 4, . . . becomes shorter by an amount corresponding to the area occupied by the openings 24A and 24B, and the pressure loss of the cooling air (Ab) flowing through the second air ventilation passages 4, 4, . . . is reduced correspondingly. As the result of this, the flow rate of the cooling air (Ab) flowing on the side of the cooling element 2 becomes higher by an amount corresponding to the reduction in pressure loss. The heat-liberation action of heat of adsorption by the cooling air (Ab) is accelerated and the total dehumidification capability of the dehumidification unit is improved.

Furthermore, when the to-be-processed air (Aa) is passed through the first air ventilation passages 3, 3, . . . of the adsorption element 1, the action of adsorption and removal of the moisture contained in the air (Aa) by the adsorbent supported on the adsorption element 1 intensively takes place on the upstream side of the first air ventilation passages 3, 3, . . . . Accordingly, the heat of adsorption of the adsorption element 1 becomes locally high in an area corresponding to the upstream side of the first air ventilation passages 3, 3, . . . . When observed from the adsorption element's 2 side, heat-exchange takes places intensively in a portion of the whole area of the cooling element 2 corresponding to the upstream side of the first air ventilation passages 3, 3, . . . of the adsorption element 1, and the ratio of the effective heat-exchange region to the whole heat-exchange region of the cooling element 2 is reduced. This causes the degradation of heat-exchange capability.

To cope with the above, in the present embodiment, both the passage length of the first flow paths 4A, 4A, . . . of the intermediate passage portion 2B and the passage length of the third flow paths 4C, 4C, . . . of the downstream-side passage portion 2C are set as follows: the passage length of flow paths situated on the side nearer to the one side end 2c of the cooling element 2 is made longer and, on the other hand, the passage length of flow paths situated on the side nearer to the other side end 2d is made shorter. Thereby, there is created a difference in passage resistance between these areas. As a result of such a passage resistance difference, the cooling air (Ab) flows one-sidedly towards the other side end 2d at a lower level of passage resistance. Consequently, the flow rate of the cooling air (Ab) decreases on the side of the one side end 2c at a higher level of passage resistance. As the result of this, on the adsorption element's 1 side, the action of dehumidification taking place intensively on the upstream side of the first air ventilation passages 3, 3, . . . is inhibited due to the drop in cooling action by the cooling air (Ab) on the cooling element's 2 side, and the action of dehumidification expands to the downstream side of the first air ventilation passages 3, 3, . . . . Accordingly, in the cooling element 2, its area on the side of the other side end 2d also effectively contributes to the cooling action of the adsorption element 1 (i.e., the heat-liberation action of heat of adsorption), and the effective heat-exchange region in the cooling element 2 is expanded correspondingly. The total dehumidification capability of the dehumidification unit $Z_{15}$ is improved to a further extent.

Furthermore, when the cooling air (Ab) is introduced to the second air ventilation passages 4, 4, . . . of the cooling element 2 from the side of the first flow paths 4A, 4A, . . . , the heat of adsorption on the side of the adsorption element 1 has a temperature degradation in the passage direction of the first air ventilation passages 3, 3, . . . . Accordingly, there is a difference in temperature between streams of the cooling air (Ab) flowing through the second air ventilation passages 4, 4, . . . of the cooling element 2. However, in the dehumidification unit $Z_{15}$ of the present embodiment, the upstream-side empty space 5A and the downstream-side empty portion 5B are formed midway along the second air ventilation passages 4, 4, . . . . Streams of the cooling air (Ab) having different temperatures after the passing-through of the first flow paths 4A, 4A, . . . enter the inside of the upstream-side empty space 5A. These cooling air streams are mixed together in the upstream-side empty space 5A and then flow towards the second flow paths 4B, 4B, . . . as the cooling air (Ab) of approximately equal temperature. Meanwhile, streams of the cooling air (Ab) having different temperatures after the passing-through of the second flow paths 4B, 4B, . . . enter the inside of the downstream-side empty space 5B. These cooling air streams are mixed together in the downstream-side empty space 5B and then flow towards the third flow paths 4C,

4C, . . . as the cooling air (Ab) of approximately equal temperature. On the whole, in the cooling element 2 the degree of temperature gradient in a direction orthogonal to the flow direction of the cooling air (Ab) (i.e., the temperature gradient in the flow direction of the to-be-processed air (Aa) on the adsorption element's 1 side), is held as low as possible, and the whole area of the cooling element 2 serves as an effective area for heat-exchange and improvement in the dehumidification capability of the dehumidification unit $Z_{15}$ is expected.

On the other hand, because of the arrangement that the cooling element 2 is provided with the empty spaces 5A and 5B, the cooling air (Ab) flowing through the empty spaces 5A and 5B is brought into direct contact with the adsorption element 1. For example, when compared with the case where the empty spaces 5A and 5B (i.e., the openings 24A and 24B) are not provided and the cooling air (Ab) flowing through the second air ventilation passages 4, 4, . . . is brought into indirect contact with the adsorption element 1 with a passage wall lying therebetween, the efficiency of heat transfer between the adsorption element 1 and the cooling element 2 is more improved and the heat-liberation action of heat of adsorption by the cooling air (Ab) is accelerated.

In the present embodiment, the cooling element 2 is formed from the passage structure body 25. The present invention, however, is not limited to such configuration. For example, the cooling element 2 may be shaped like a single-sided cardboard or like a corrugated plate, as in each of the foregoing embodiments. The same is applied to the following embodiments.

XVI. Embodiment 16

Figure 28:
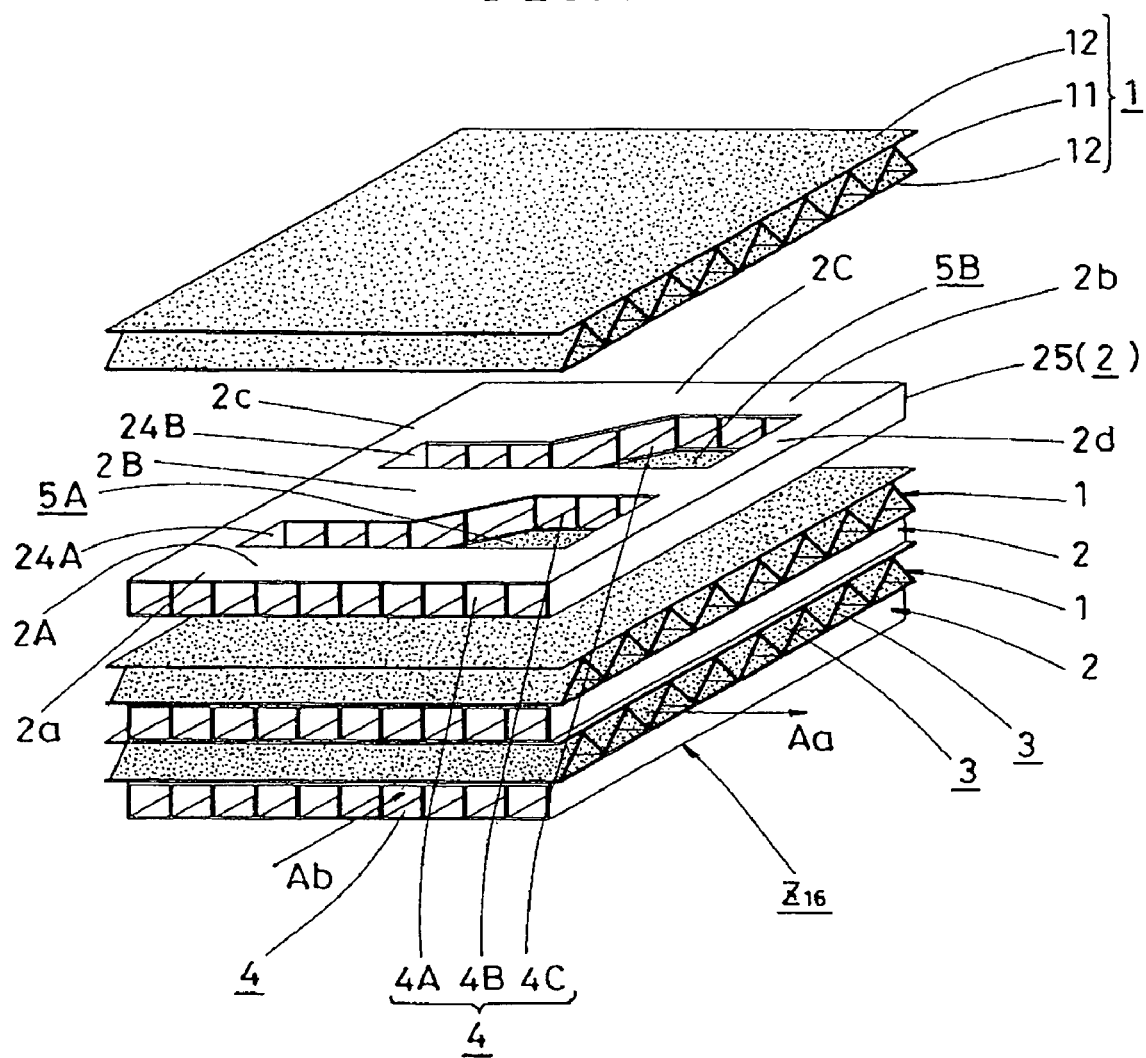
FIG. 28 is a perspective view showing in an exploded manner a dehumidification unit according to a sixteenth embodiment of the present invention.

Referring to FIG. 28, there is illustrated a dehumidification unit $Z_{16}$ formed in accordance with a sixteenth embodiment of the present invention. The dehumidification unit $Z_{16}$ is regarded as a modification example of the dehumidification unit $Z_{15}$ of the fifteenth embodiment.

More specifically, like the dehumidification unit $Z_{15}$ of the fifteenth embodiment, the dehumidification unit $Z_{16}$ of the present embodiment is characterized by the configuration of the cooling element 2. The dehumidification unit $Z_{16}$ of the sixteenth embodiment differs from the dehumidification unit $Z_{15}$ of the fifteenth embodiment as follows. Unlike the dehumidification unit $Z_{15}$ which is characterized in that the upstream end edge of each of the intermediate and downstream-side passage portions 2B and 2C of the cooling element 2 is formed into a two-stage stepped shape, it is arranged in the dehumidification unit $Z_{16}$ of the sixteenth embodiment such that an approximately central portion of the upstream end edge of each of the intermediate and downstream-side passage portions 2B and 2C of the cooling element 2 is so formed as to slope linearly.

As a result of such arrangement, in the cooling element 2 of the present embodiment, both the passage resistance of the first flow paths 4A, 4A, . . . of the intermediate passage portion 2B and the passage resistance of the third flow paths 4C, 4C, . . . of the downstream-side passage portion 2C smoothly vary from a high resistance value region situated on the side nearer to the one side end 2c towards a low resistance value region situated one the side nearer to the other side end 2d in the cooling element 2. In the light of the cooling capability, the cooling element 2 of the present embodiment has an advantage over the cooling element 2 of the fifteenth embodiment in which the passage resistance varies discontinuously.

In the present embodiment, only a predetermined area of the approximately central portion of the upstream end edge of each of the intermediate and downstream-side passage portions 2B and 2C is made to slope linearly. The present invention, however, is not limited to such configuration. For instance, the upstream end edge may be made to slope throughout its entire area from one end side to the other end side.

Since the remaining arrangements other than the above and operation/working effects based thereon are the same as the fifteenth embodiment, their respective descriptions are omitted here by using the corresponding explanations made in the fifteenth embodiment.

XVII. Embodiment 17

Figure 29:
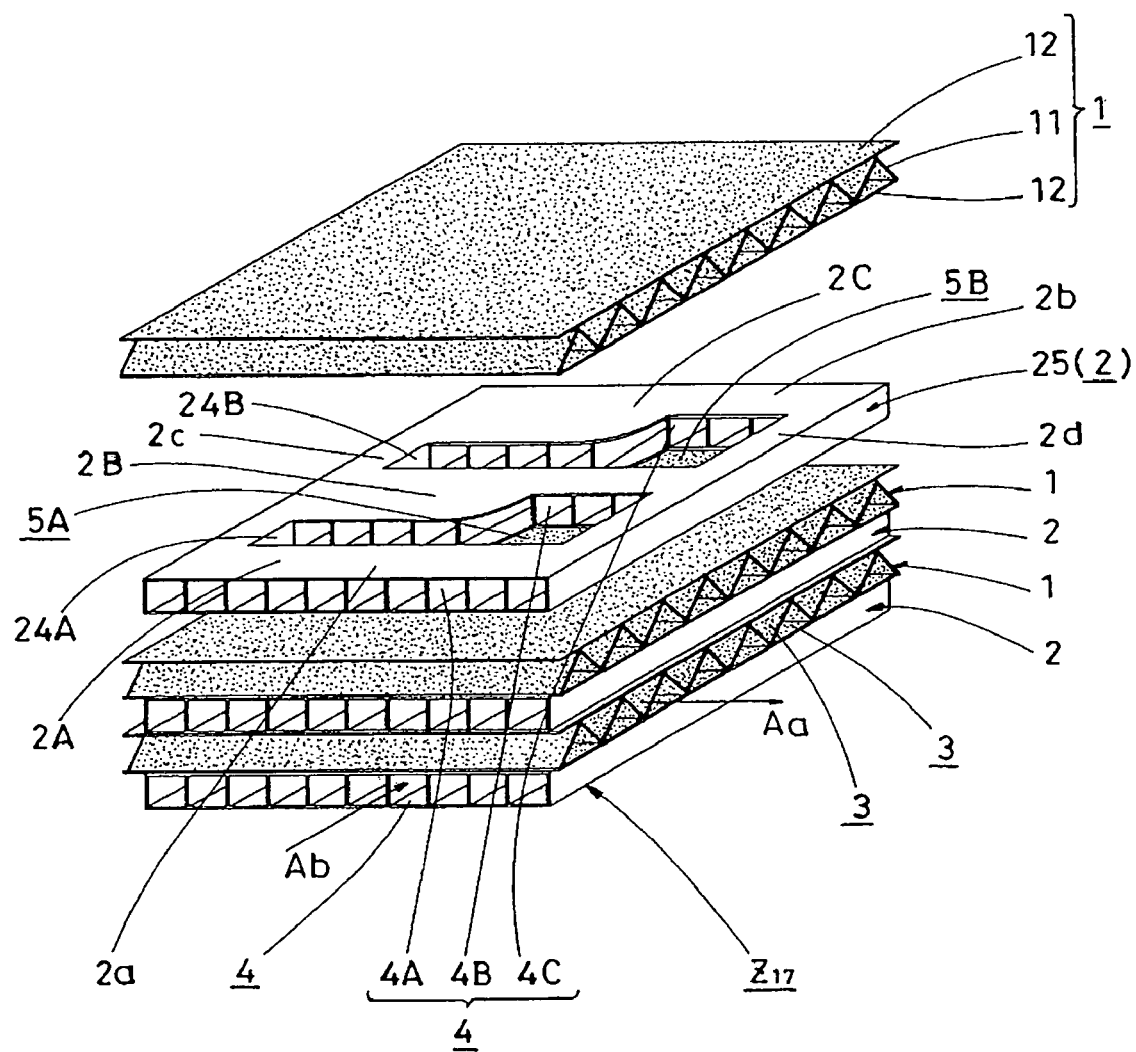
FIG. 29 is a perspective view showing in an exploded manner a dehumidification unit according to a seventeenth embodiment of the present invention.

Referring to FIG. 29, there is illustrated a dehumidification unit $Z_{17}$ formed in accordance with a seventeenth embodiment of the present invention. The dehumidification unit $Z_{17}$ is regarded as a modification example of the dehumidification unit $Z_{16}$ of the sixteenth embodiment.

More specifically, in the dehumidification unit $Z_{16}$ of the sixteenth embodiment, the approximately central portion of the upstream end edge of each of the intermediate and downstream-side passage portions 2B and 2C provided in the cooling element 2 is so formed as to slope linearly. The dehumidification unit $Z_{17}$ is configured differently from the dehumidification unit $Z_{16}$ of the sixteenth embodiment in that the approximately central portion of the upstream end edge of each of the intermediate and downstream-side passage portions 2B and 2C of the cooling element 2 is formed into a curved shape projecting outwardly.

As a result of such arrangement, also in the cooling element 2 of the present embodiment, both the passage resistance of the first flow paths 4A, 4A, . . . of the intermediate passage portion 2B and the passage resistance of the third flow paths 4C, 4C, . . . of the downstream-side passage portion 2C smoothly vary from a high resistance value region situated on the side nearer to the one side end 2c to a low resistance value region situated on the side nearer to the other side end 2d in the cooling element 2, as in the cooling element 2 of the sixteenth embodiment. In the light of the cooling capability, the cooling element 2 of the present embodiment is advantageous.

Since the remaining arrangements and operation/working effects other than the above are the same as the fifteenth embodiment, their respective descriptions are omitted here by using the corresponding explanations made in the fifteenth embodiment.

XVIII. Embodiment 18

Figure 30:
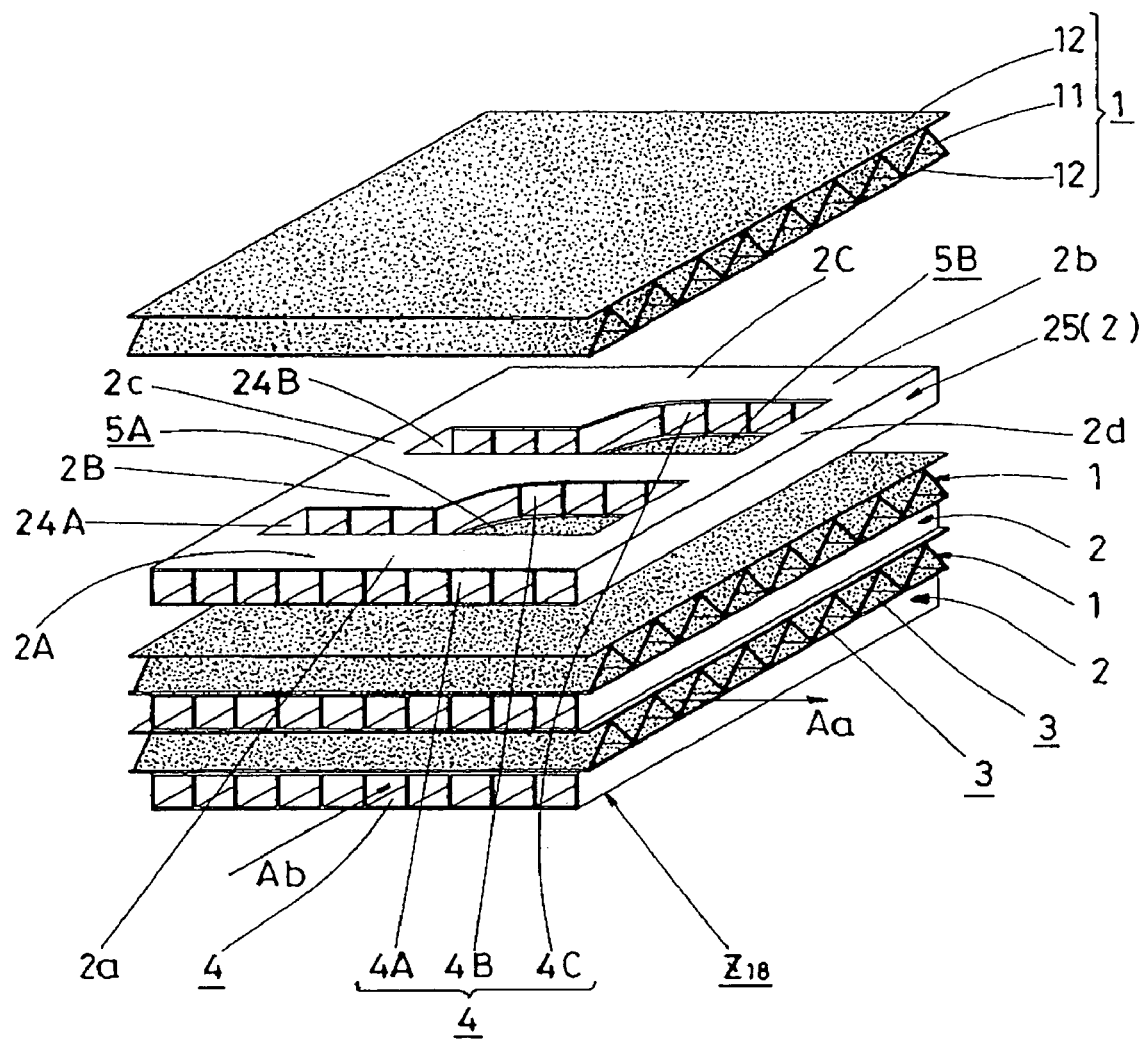
FIG. 30 is a perspective view showing in an exploded manner a dehumidification unit according to an eighteenth embodiment of the present invention.

Referring to FIG. 30, there is illustrated a dehumidification unit $Z_{18}$ formed in accordance with an eighteenth embodiment of the present invention. Like the dehumidification unit $Z_{17}$ of the seventeenth embodiment, the dehumidification unit $Z_{18}$ is regarded as a modification example of the dehumidification unit $Z_{16}$ of the sixteenth embodiment.

More specifically, in the dehumidification unit $Z_{16}$ of the sixteenth embodiment, the approximately central portion of the upstream end edge of each of the intermediate and downstream-side passage portions 2B and 2C provided in the cooling element 2 is so formed as to slope linearly. The dehumidification unit $Z_{18}$ is configured differently from the dehumidification unit $Z_{16}$ in that the approximately central portion of the upstream end edge of each of the intermediate and downstream-side passage portions 2B and 2C of the cooling element 2 is formed into a curved shape projecting inwardly.

As a result of such arrangement, also in the cooling element 2 of the present embodiment, both the passage resistance of the first flow paths 4A, 4A, . . . of the intermediate passage portion 2B and the passage resistance of the third flow paths 4C, 4C, . . . of the downstream-side passage portion 2C smoothly vary from a high resistance value region situated on the side nearer to the one side end 2c towards a low resistance value region situated on the side nearer to the other side end 2d in the cooling element 2, as in the cooling element 2 of the sixteenth embodiment. In the light of the cooling capability, the cooling element 2 of the present embodiment is advantageous.

Since the remaining arrangements and operation/working effects other than the above are the same as the fifteenth embodiment, their respective descriptions are omitted here by using the corresponding explanations made in the fifteenth embodiment.

XIX. Embodiment 19

Figure 31:
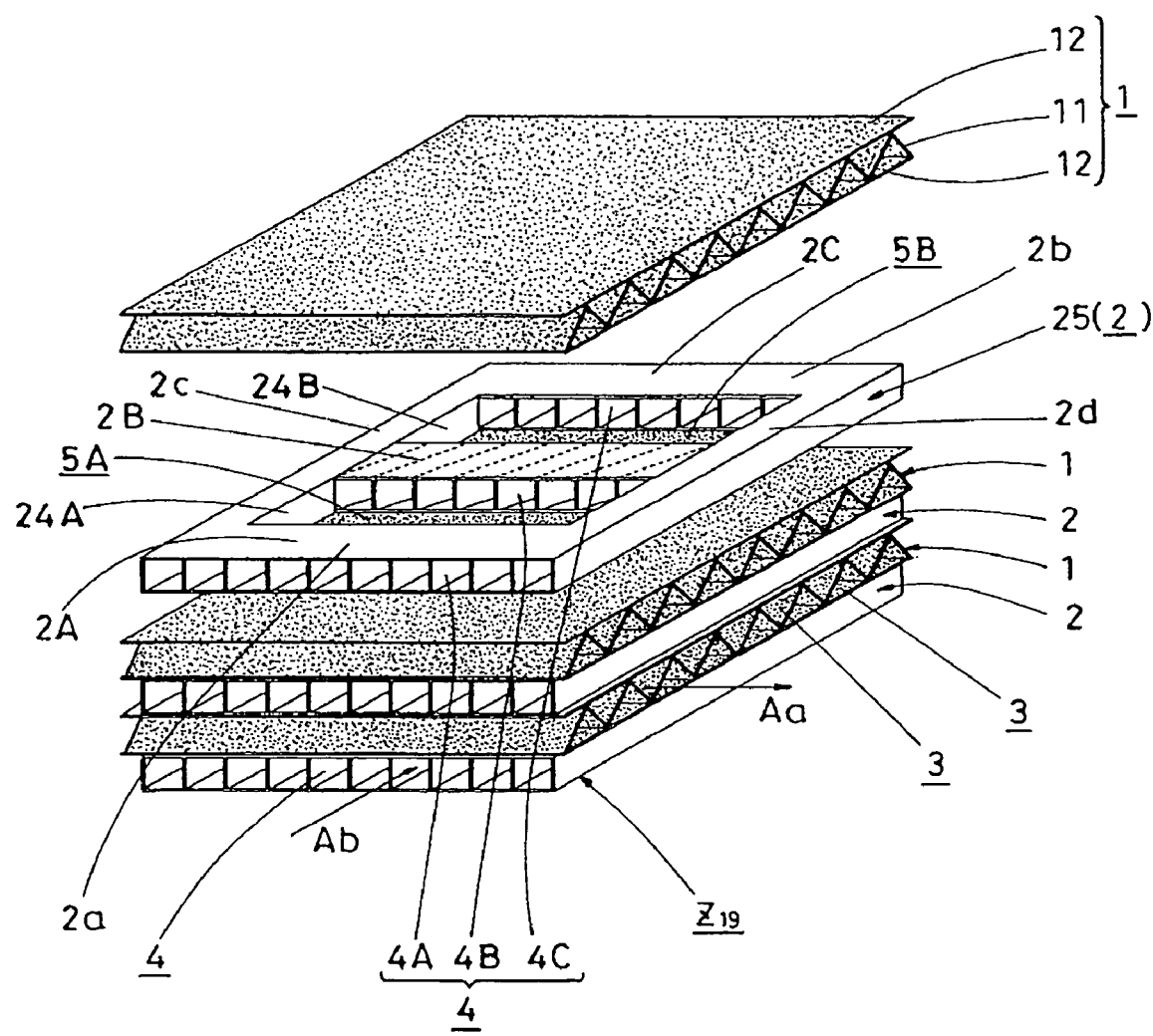
FIG. 31 is a perspective view showing in an exploded manner a dehumidification unit according to a nineteenth embodiment of the present invention.

Referring to FIG. 31, there is illustrated a dehumidification unit $Z_{19}$ formed in accordance with a nineteenth embodiment of the present invention. Like each of the dehumidification units $Z_{15}$-$Z_{18}$ of the fifteenth to eighteenth embodiments, the dehumidification unit $Z_{19}$ is characterized by the constmetion of the cooling element 2.

More specifically, in the cooling element 2 of the dehumidification unit $Z_{19}$ of the present embodiment, two openings 24A and 24B are arranged front to rear relative to the passage direction of second air ventilation passages 4, 4, . . . and, as a result of such arrangement, each of the second air ventilation passages 4, 4, . . . consists of a first flow path 4A provided in the upstream-side passage portion 2A, a second flow path 4B provided in the intermediate passage portion 2B, and a third flow path 4C provided in the downstream-side passage portion 2C, which is the same as in the cooling element 2 of each of the dehumidification units $Z_{15}$-$Z_{18}$ according to the fifteenth to eighteenth embodiments. The dehumidification unit $Z_{19}$ of the present embodiment differs from the dehumidification units $Z_{15}$-$Z_{18}$ of the fifteenth to eighteenth embodiments as follows: in the present embodiment, the intermediate passage portion 2B is formed so as to have approximately the same width from the one side end 2c to the other side end 2d of the cooling element 2, in other words the second flow paths 4B, 4B, . . . have approximately the same passage length. In addition, the passage direction of the second flow paths 4B, 4B, . . . is made to slope so as to get closer to the other side end 2d of the cooling element 2 with approach towards the downstream side thereof.

Since the passage direction of the second flow paths 4B, 4B, . . . of the intermediate passage portion 2B is inclined as described above, the integral forming of the intermediate passage portion 2B with the upstream-side passage portion 2A and the downstream-side passage portion 2C (for example, by punching) becomes impossible to carry out. To cope with this, the intermediate passage portion 2B is preformed as a separated member from the passage structure body 25 constituting the cooling element 2 and, thereafter, is attached to the passage structure body 25.

The passage direction of the second flow paths 4B, 4B, . . . of the intermediate passage portion 2B is inclined towards the other side end 2d of the cooling element 2 (i.e., towards the downstream side of the first air ventilation passages 3, 3, . . . of the adsorption element 1). As a result of such arrangement, when the cooling air (Ab) passes through the second flow paths 4B, 4B, . . . of the intermediate passage 2B from the upstream-side empty space 5A and then flows towards the downstream-side empty space 5B, the cooling air (Ab) is forced to deviate towards the other side end $2d$ in the second flow paths 4B, 4B, ..., and the flow rate on the side of the other side end $2d$ becomes higher than that on the side of the one side end $2c$. In the cooling element 2 of each of the fifteenth to eighteenth embodiments, the deviating of the flow of the cooling air (Ab) is realized by making differences in passage resistance between the second air ventilation passages 4, 4, .... Unlike these embodiments, in the cooling element 2 of the present embodiment the deviating of the flow of the cooling air (Ab) is realized by inclining the passage direction of the second flow paths 4B, 4B, ... of the intermediate passage portion 2B.

Accordingly, also in the dehumidification unit $Z_{19}$ of the present embodiment provided with the above-described cooling element 2, the same operation/working effects as obtained in the dehumidification units $Z_{15}$-$Z_{18}$ of the fifteenth to eighteenth embodiments are obtained.

XX. Embodiment 20

Figure 32:
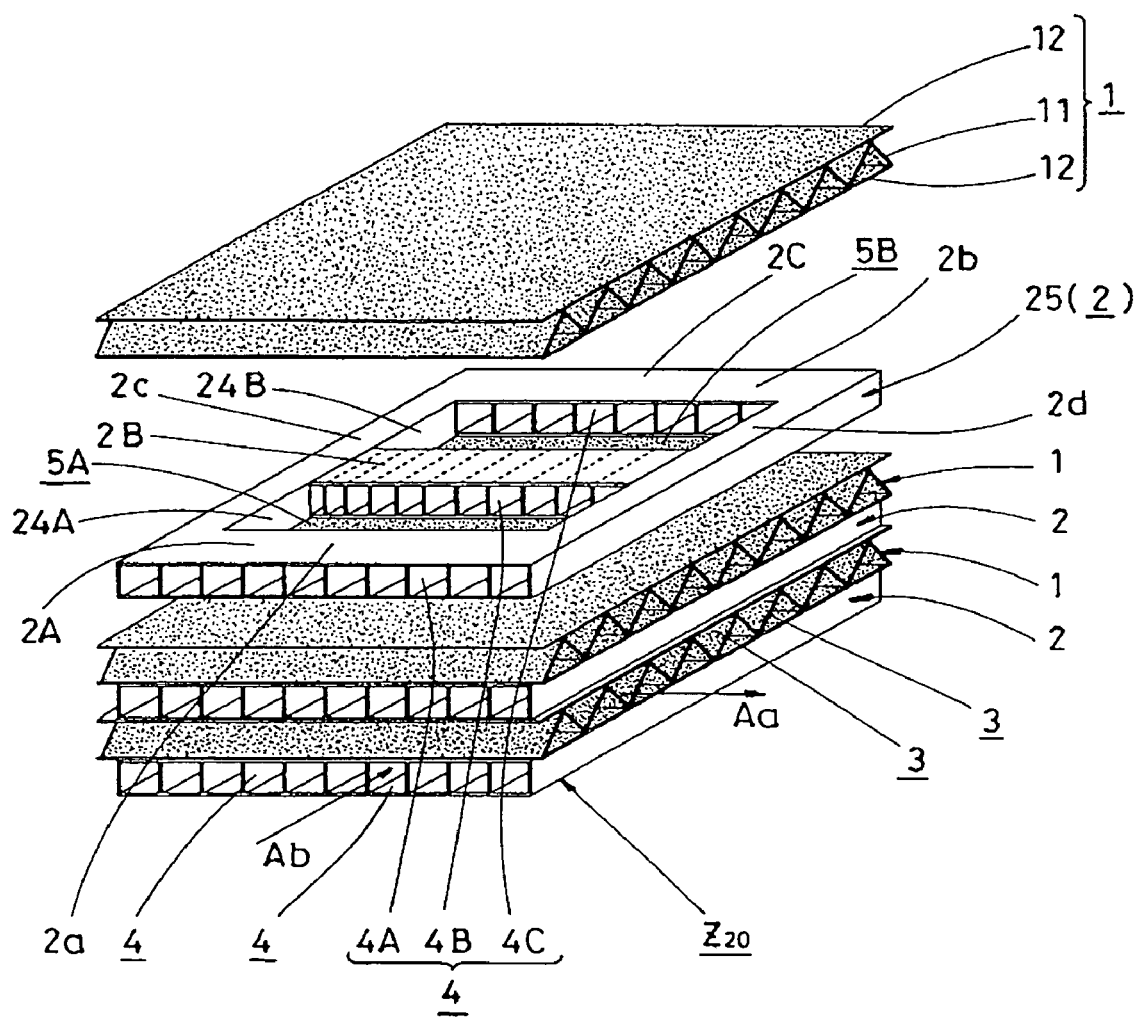
FIG. 32 is a perspective view showing in an exploded manner a dehumidification unit according to a twentieth embodiment of the present invention.

Referring to FIG. 32, there is illustrated a dehumidification unit $Z_{20}$ formed in accordance with a twentieth embodiment of the present invention. The dehumidification unit $Z_{20}$ is a modification example of the dehumidification unit $Z_{19}$ according to the nineteenth embodiment.

More specifically, in the dehumidification unit $Z_1$ according to the nineteenth embodiment, in order to cause the flow of the cooling air (Ab) to deviate, it is arranged such that the second flow paths 4B, 4B, ... provided in the intermediate passage portion 2B of the cooling element 2 have the same passage cross-sectional area and, in addition, the passage direction of the second flow paths 4B, 4B, ... is inclined towards the other side end $2d$ of the cooling element 2. Unlike the dehumidification unit $Z_{19}$, in the dehumidification unit $Z_{20}$ of the present embodiment, the passage cross-sectional area of the second flow paths 4B, 4B, ... of the intermediate passage portion 2B of the cooling element 2 is made to become gradually greater from the one side end $2c$ towards the other side end $2d$ of the cooling element 2, whereby the second flow paths 4B, 4B, ... have different passage resistance values. In this way, the deviating of the flow of the cooling air (Ab) is realized.

Since the passage cross-sectional area of the second flow paths 4B, 4B, ... of the intermediate passage portion 2B in the cooling element 2 is varied, the integral forming of the intermediate passage portion 2B with the upstream-side passage portion 2A and the downstream-side passage portion 2C (for example, by punching) becomes impossible to carry out. To cope with this, the intermediate passage portion 2B is preformed as a separated member from the passage structure body 25 constituting the cooling element 2 and, thereafter, is attached to the passage structure body 25.

Also in the dehumidification unit $Z_{20}$ of the present embodiment, the same operation/working effects as obtained in the dehumidification units $Z_{15}$-$Z_{18}$ of the fifteenth to eighteenth embodiments are obtained.

XXI. Embodiment 21

Figure 33:
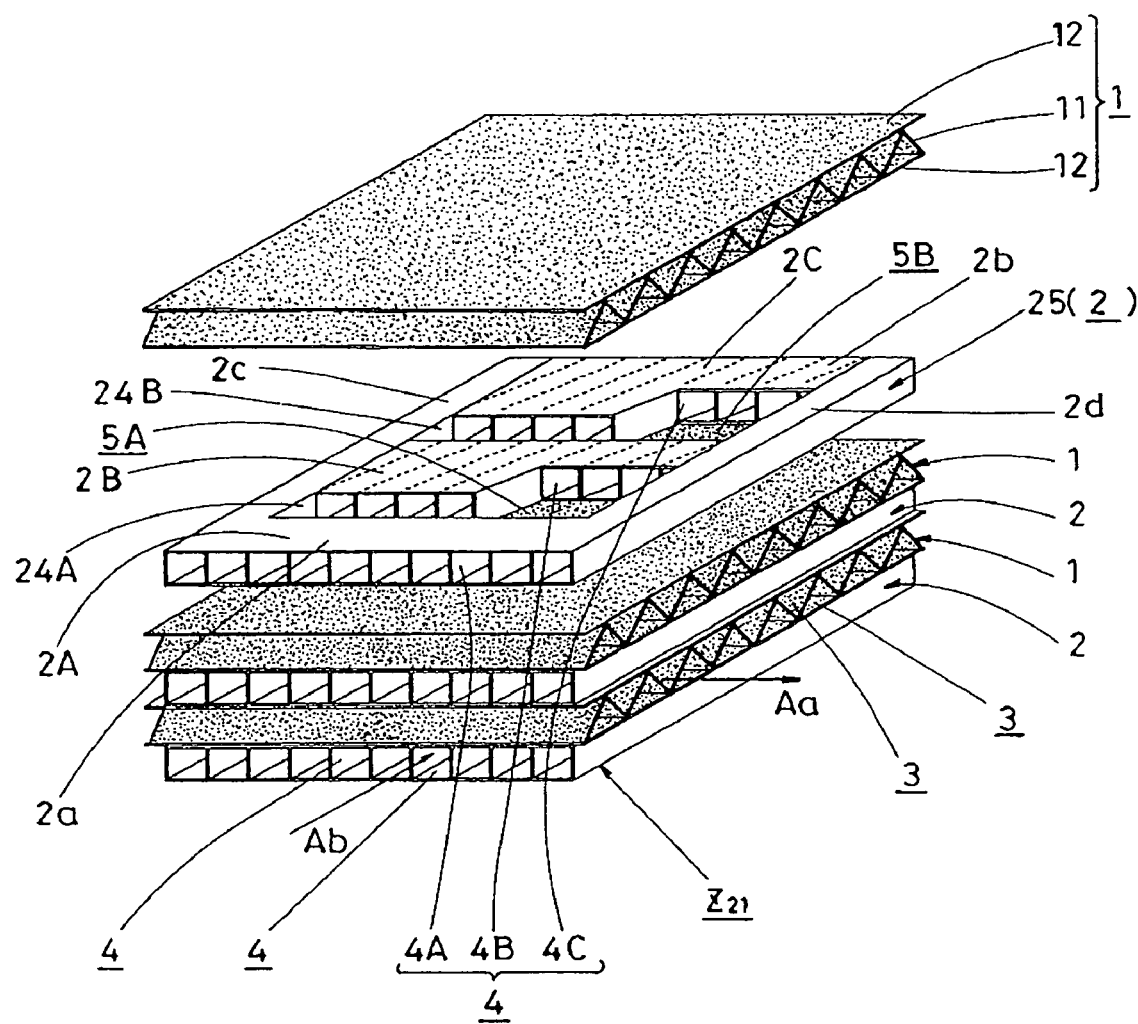
FIG. 33 is a perspective view showing in an exploded manner a dehumidification unit according to a twenty-first embodiment of the present invention.

Referring to FIG. 33, there is illustrated a dehumidification unit $Z_{21}$ formed in accordance with a twenty-first embodiment of the present invention. The dehumidification unit $Z_{21}$ has a construction formed by a combination of the construction of the cooling element 2 of the dehumidification unit $Z_{15}$ of the fifteenth embodiment and the construction of the cooling element 2 of the dehumidification unit $Z_{19}$ of the nineteenth embodiment. Therefore, the dehumidification unit $Z_{21}$ has both the characteristics of the cooling element 2 of the dehumidification unit $Z_{15}$ and the characteristics of the cooling element 2 of the dehumidification unit $Z_{19}$.

More specifically, the cooling element 2 of the present embodiment is constructed as follows. The plane shape of each of the intermediate and downstream-side passage portions 2B and 2C is formed into a two-stage stepped shape. As a result of such arrangement, the passage length of the second and third flow paths 4B, 4B, ... and 4C, 4C, ... becomes longer on the side nearer to the one side end $2c$ but shorter on the side nearer to the other side end $2d$ in the cooling element 2. In addition, the passage direction of the second and third flow paths 4B, 4B, ... and 4C, 4C, ... is made to slope so as to get gradually closer to the other side end $2d$ with approach towards the passage downstream side.

Because of the provision of the above-described cooling element 2 in the dehumidification unit $Z_{21}$, the cooling air (Ab) flowing through the second air ventilation passages 4, 4, ... of the cooling element 2 undergoes: (i) forcible flow deviating actions resulting from inclining the passage direction of the second flow paths 4B, 4B, ... and the passage direction of the third flow paths 4C, 4C, ..., and (ii) flow deviating actions resulting from varying the passage resistance of the second flow paths 4B, 4B, ... and the passage resistance of the third flow paths 4C, 4C, ... by making differences in passage length between the second flow paths 4B, 4B, ... and between the third flow paths 4C, 4C, ..., at two different regions, i.e., on the side of the intermediate passage portion 2B and on the side of the downstream-side passage portion 2C. This further ensures the effect of expanding the effective heat-exchange region by the flow deviating of the cooling air (Ab) towards the other side end $2d$ of the cooling element 2. On the whole, the dehumidification unit $Z_{21}$ demonstrates its dehumidification capability at higher levels.

Since the remaining arrangements and operation/working effects other than the above are the same as the fifteenth embodiment, their respective descriptions are omitted here by using the corresponding explanations made in the fifteenth embodiment.

XXI. Embodiment 22

Figure 34:
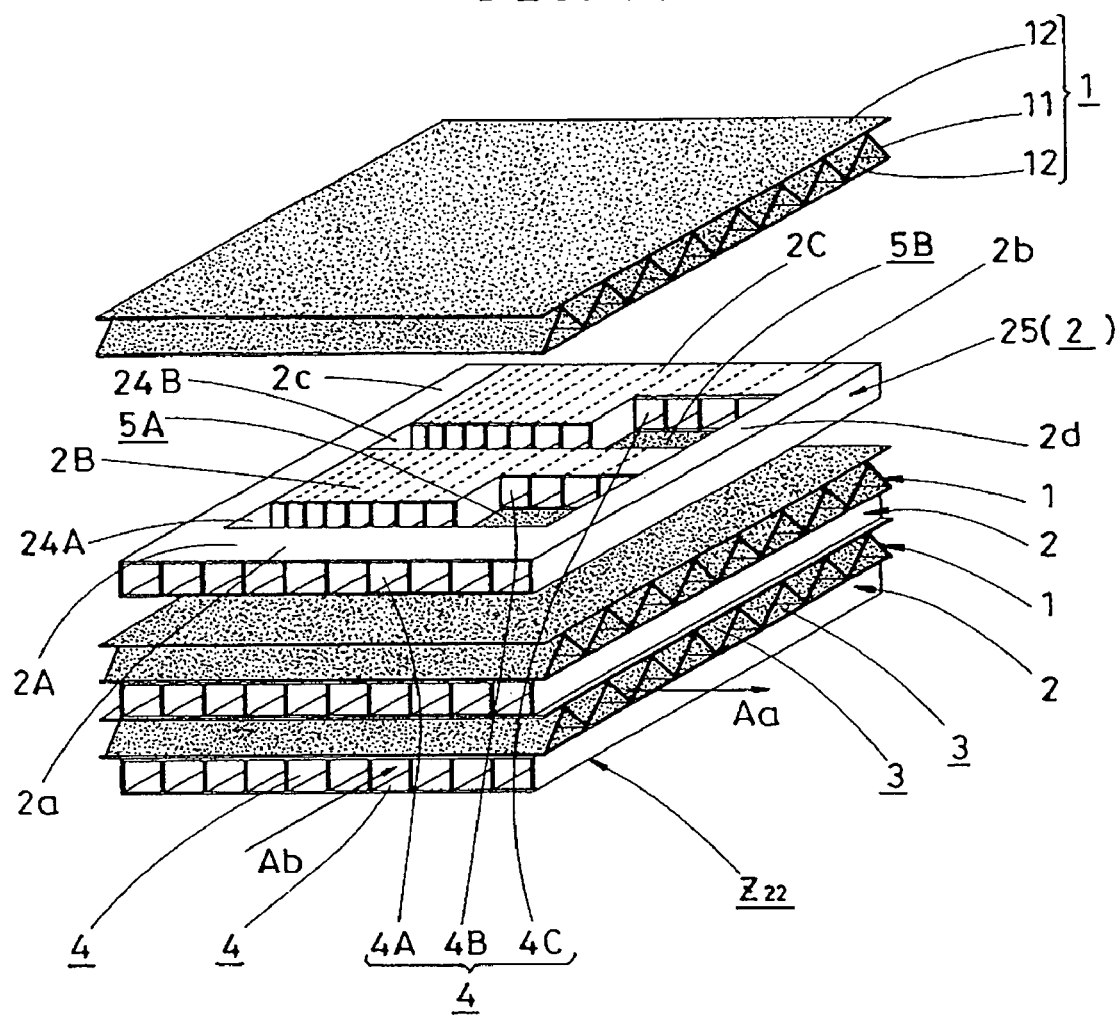
FIG. 34 is a perspective view showing in an exploded manner a dehumidification unit according to a twenty-second embodiment of the present invention.

Referring finally to FIG. 34, there is illustrated a dehumidification unit $Z_{22}$ formed in accordance with a twenty-second embodiment of the present invention. The dehumidification unit $Z_{22}$ has a construction as a result of a combination of the construction of the cooling element 2 of the dehumidification unit $Z_{15}$ of the fifteenth embodiment and the construction of the cooling element 2 of the dehumidification unit $Z_{20}$ according to the twentieth embodiment. Therefore, the dehumidification unit $Z_{22}$ has both the characteristics of the cooling element 2 of the dehumidification unit $Z_{15}$ and the characteristics of the cooling element 2 of the dehumidification unit $Z_{20}$.

More specifically, the cooling element 2 of the present embodiment is constructed as follows. The plane shape of each of the intermediate and downstream-side passage portions 2B and 2C is formed into a two-stage stepped shape. As a result of such arrangement, the passage length of the second and third flow paths 4B, 4B, ... and 4C, 4C, ... becomes longer on the side nearer to the one side end $2c$ but shorter on the side nearer to the other side end $2d$ in the cooling element 2. In addition, the passage cross-sectional area of the second and third flow paths 4B, 4B, ... and 4C, 4C, ... is made smaller on the side nearer to the one side end 2c but larger on the side nearer to the other side end 2d of the cooling element 2.

Because of the provision of the above-described cooling element 2 in the dehumidification unit $Z_{22}$, the cooling air (Ab) flowing through the second air ventilation passages 4, 4, . . . of the cooling element 2 undergoes (i) flow deviating actions resulting from varying the passage resistance of the second flow paths 4B, 4B, . . . and the passage resistance of the third flow paths 4C, 4C, . . . by making differences in passage length between the second flow paths 4B, 4B, . . . and between the third flow paths 4C, 4C, . . . and (ii) flow deviating actions resulting from varying the passage resistance of the second flow paths 4B, 4B, . . . and the passage resistance of the third flow paths 4C, 4C, . . . by making differences in cross-sectional area between the second flow paths 4B, 4B, . . . and between the third flow paths 4C, 4C, . . . , at two different regions, i.e., on the side of the intermediate passage portion 2B and on the side of the downstream-side passage portion 2C. This further ensures the effect of expanding the effective heat-exchange region by the flow deviating of the cooling air (Ab) towards the other side end 2d of the cooling element 2. On the whole, the dehumidification unit $Z_{22}$ demonstrates its dehumidification capability at higher levels.

Since the remaining arrangements and operation/working effects other than the above are the same as the fifteenth embodiment, their respective descriptions are omitted here by using the corresponding explanations made in the fifteenth embodiment.

INDUSTRIAL APPLICABILITY

As has been described above, the present invention is useful for dehumidification units.

What is claimed is:

1. A dehumidification unit comprising alternate laminations of an adsorption element which supports an adsorbent and in which a plurality of first air ventilation passages through which air to be processed flows are formed planewise in rows, and a cooling element comprising a plurality of bended second air ventilation passage forming member in which a plurality of second air ventilation passages through which cooling air flows are formed planewise in rows,
wherein:
said cooling element is provided, at a planewise inner area thereof, with an opening, thereby being shaped like a frame, and wherein
a plurality of said second air ventilation passages is separated by said opening into an entry opening and an exit opening situated respectively on one passagewise side of the plurality of bended second air ventilation passage forming member and on an opposite passagewise side of the bended second air ventilation passage forming member thereof, wherein passage lengths of the entry opening and the exit opening do not extend the full length of the cooling element such that the cooling air flowing in the opening is brought into direct contact with the adsorption element.

2. The dehumidification unit of claim 1, wherein each of said second air ventilation passages of said cooling element has an approximately rectangular cross-sectional shape.

3. The dehumidification unit of claim 1, wherein each of said second air ventilation passages of said cooling element has an approximately triangular cross-sectional shape.

4. The dehumidification unit of any one of claims 1, 2, and 3, wherein air stream regulating means, configured to inhibit the flow of said cooling air from deviating in the inside of said opening part, is disposed in said opening of said cooling element.

5. The dehumidification unit of any one of claims 1, 2, and 3 further comprising flow rate regulating means disposed on the side of said entry openings of said second air ventilation passages,
whereby the flow rate of said cooling air entering the inside of said opening through each of said entry openings is so regulated as to become higher the nearer to the downstream side of said first air ventilation passages of said adsorption element.

6. The dehumidification unit of claim 5, wherein said flow rate regulating means is formed by setting the passage length of said entry openings of said second air ventilation passages to become shorter the nearer to the downstream end of said first air ventilation passages.

7. A dehumidification unit comprising alternate laminations of an adsorption element which supports an adsorbent and in which a plurality of first air ventilation passages through which air to be processed flows are formed planewise in rows, and a cooling element comprising a plurality of bended second air ventilation passage forming member in which a plurality of second air ventilation passages through which cooling air flows are formed planewise in rows,
wherein:
said cooling element is provided with openings which overlap with said second air ventilation passages such that said second air ventilation passages of the plurality of bended second air ventilation passage forming member are each separated passagewise so as to include an entry opening and an exit opening, wherein passage lengths of the entry opening and the exit opening do not extend the full length of the cooling element such that the cooling air flowing in the openings is brought into direct contact with the adsorption element, and wherein
the passage resistance of said second air ventilation passages on the downstream side of said openings is set such that the passage resistance of second air ventilation passages nearer to an area of said cooling element corresponding to the upstream side of said first air ventilation passages of said adsorption element is greater than the passage resistance of second air ventilation passages nearer to an area of said cooling element corresponding to the downstream side of said first air ventilation passages of said adsorption element.

8. The dehumidification unit of claim 7, wherein the passage length of said second air ventilation passages on the downstream side of said openings is set such that the passage length of second air ventilation passages nearer to said area corresponding to the upstream side of said first air ventilation passages of said adsorption element is greater than the passage length of second air ventilation passages nearer to said area corresponding to the downstream side of said first air ventilation passages of said adsorption element.

9. The dehumidification unit of claim 8, wherein the passage length of said second air ventilation passages is set so as to become gradually shorter from the side nearer to said area corresponding to the upstream side of said first air ventilation passages of said adsorption element towards the side nearer to said area corresponding to the downstream side of said first air ventilation passages of said adsorption element.

10. The dehumidification unit of claim 8, wherein the passage length of said second air ventilation passages is set so as to become linearly shorter from the side nearer to said area corresponding to the upstream side of said first air ventilation passages of said adsorption element towards the side nearer to said area corresponding to the downstream side of said first air ventilation passages of said adsorption element.

11. The dehumidification unit of claim 8, wherein the passage length of said second air ventilation passages is set so as to become curvedly shorter from the side nearer to the area corresponding to the upstream side of said first air ventilation passages of said adsorption element towards the side nearer to said area corresponding to the downstream side of said first air ventilation passages of said adsorption element.

12. The dehumidification unit of claim 7, wherein the passage cross-sectional area of said second air ventilation passages on the downstream side of said openings is set such that the passage cross-sectional area of second air ventilation passages nearer to said area corresponding to the upstream side of said first air ventilation passages of said adsorption element is smaller than the passage cross-sectional area of second air ventilation passages nearer to said area corresponding to the downstream side of said first air ventilation passages of said adsorption element.

13. The dehumidification unit of claim 8, wherein the passage cross-sectional area of said second air ventilation passages on the downstream side of said openings is set such that the passage cross-sectional area of second air ventilation passages nearer to said area corresponding to the upstream side of said first air ventilation passages of said adsorption element is smaller than the passage cross-sectional area of second air ventilation passages nearer to said area corresponding to the downstream side of said first air ventilation passages of said adsorption element.

14. A dehumidification unit comprising alternate laminations of an adsorption element which supports an adsorbent and in which a plurality of first air ventilation passages through which air to be processed flows are formed planewise in rows, and a cooling element comprising a plurality of bended second air ventilation passage forming member in which a plurality of second air ventilation passages through which cooling air flows are formed planewise in rows, wherein:

said cooling element is provided with openings which overlap with said second air ventilation passages such that said second air ventilation passages of the plurality of bended second air ventilation passage forming member are each divided passagewise so as to include an entry opening and an exit opening, wherein passage lengths of the entry opening and the exit opening do not extend the full length of the cooling element such that the cooling air flowing in the openings is brought into direct contact with the adsorption element, and wherein the passage direction of said second air ventilation passages on the downstream side of said openings as viewed in plane view is inclined so as to get closer to an area of said cooling element corresponding to the downstream side of said first air ventilation passages of said adsorption element with approach towards the downstream side.

15. The dehumidification unit of any one of claims 7, 8, 12, and 13, wherein the passage direction of said second air ventilation passages on the downstream side of said openings as viewed in plane view is inclined so as to get closer to said area of said cooling element corresponding to the downstream side of said first air ventilation passages of said adsorption element with approach towards the downstream side.

16. The dehumidification unit of any one of claims 7, 8, 12, 13, and 14, wherein a plurality of sets of said openings and said second air ventilation passages situated downstream of said openings are provided in a back-and-forth arrangement relative to the flow direction of said cooling air in said cooling element.

17. The cooling element of claim 1, wherein said cooling element comprises at least one flat side-plate member.

18. The cooling element of claim 17, wherein said cooling element further comprises a second flat side-plate member.

* * * * *